(12) United States Patent
Haley et al.

(10) Patent No.: US 11,545,187 B2
(45) Date of Patent: *Jan. 3, 2023

(54) SYSTEM AND METHOD FOR COMPILING USER-GENERATED VIDEOS

(71) Applicant: Vertigo Media, Inc., Charlotte, NC (US)

(72) Inventors: Nathan C. Haley, Leawood, KS (US); Gregory H. Leekley, Charlotte, NC (US); Alexander Savenok, Grandview, MO (US); Rose J. Yen, Charlotte, NC (US)

(73) Assignee: Vertigo Media, Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/353,706

(22) Filed: Jun. 21, 2021

(65) Prior Publication Data

US 2021/0312948 A1 Oct. 7, 2021

Related U.S. Application Data

(63) Continuation-in-part of application No. 16/289,443, filed on Feb. 28, 2019, now Pat. No. 11,043,245.

(51) Int. Cl.
| | |
|---|---|
| *G11B 27/036* | (2006.01) |
| *G11B 27/10* | (2006.01) |
| *H04N 21/43* | (2011.01) |
| *H04N 21/8549* | (2011.01) |
| *H04N 21/81* | (2011.01) |
| *G11B 27/034* | (2006.01) |

(52) U.S. Cl.
CPC .......... *G11B 27/036* (2013.01); *G11B 27/034* (2013.01); *G11B 27/10* (2013.01); *H04N 21/4307* (2013.01); *H04N 21/8113* (2013.01); *H04N 21/8549* (2013.01)

(58) Field of Classification Search
CPC .............. G11B 27/10; G11B 20/10527; G11B 2020/10537; G11B 27/105
See application file for complete search history.

(56) References Cited

U.S. PATENT DOCUMENTS

| | | | |
|---|---|---|---|
| 11,043,245 B2* | 6/2021 | Leekley | ........... G11B 20/10527 |
| 2012/0004960 A1 | 1/2012 | Ma et al. | |

(Continued)

*Primary Examiner* — Girumsew Wendmagegn
(74) *Attorney, Agent, or Firm* — Christopher J. Scott

(57) ABSTRACT

A system and method are operable within a computer network environment for compiling videos into a compilation, where each video is programmatically inserted into the compilation, and the resulting video compilation plays alongside an audio track preferably sourced using a unique identifier for the audio track. The system includes a solution stack comprising a remote service system and at least one client, which may be operable to generate at least one video to be associated with an audio track section, with such section determined by select start/end times, programmatically identified, or programmatically associated based on selected metadata. The system then operates to compile at least one user-generated video into an audiovisual set which may be presented as a social post, and further into a video compilation which may include additional filler content, to play alongside a section or the entirety of an audio track.

24 Claims, 31 Drawing Sheets

(56) References Cited

U.S. PATENT DOCUMENTS

| | | |
|---|---|---|
| 2013/0125000 A1 | 5/2013 | Fleischauer et al. |
| 2013/0163963 A1* | 6/2013 | Crosland .............. H04N 9/8227 386/E5.028 |
| 2014/0164563 A1 | 6/2014 | Leekley et al. |
| 2017/0041280 A1* | 2/2017 | Savenok ............. H04L 12/1818 |
| 2017/0289220 A1 | 10/2017 | Bloch et al. |

* cited by examiner

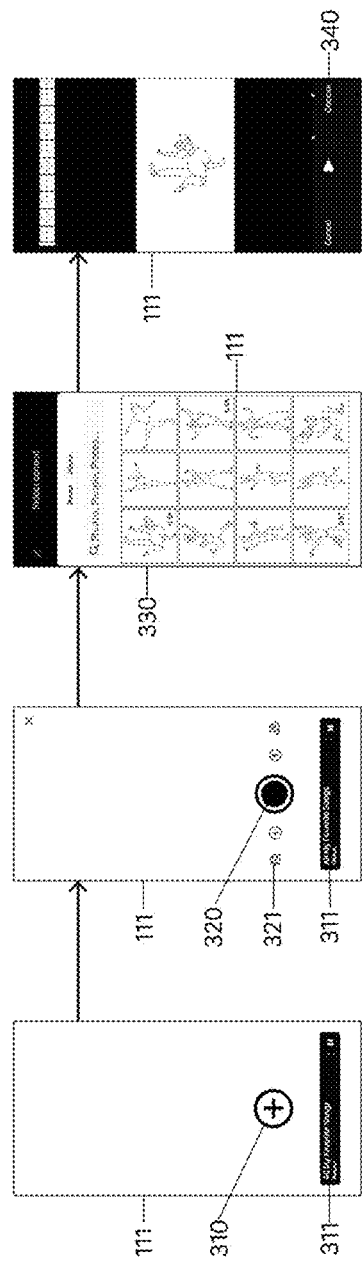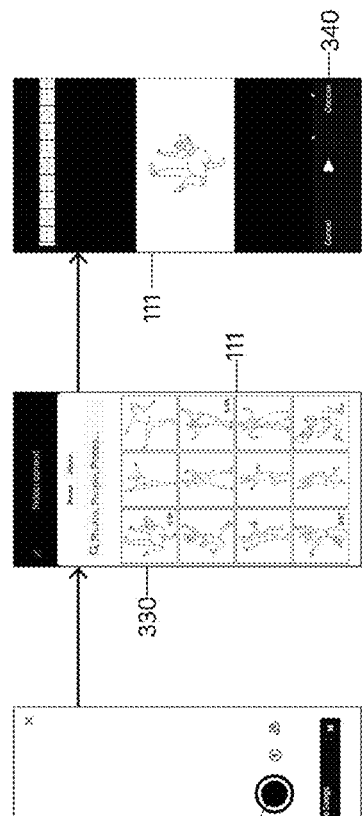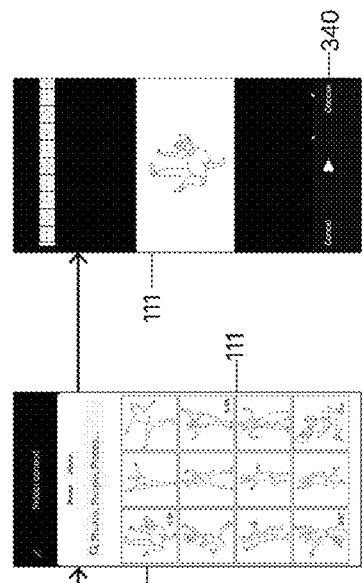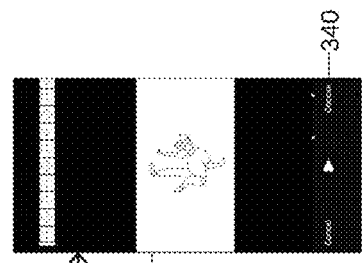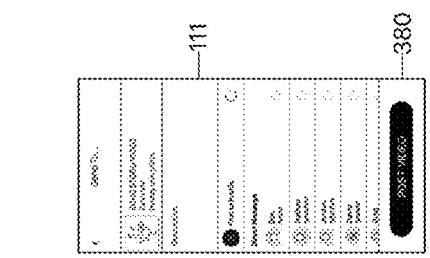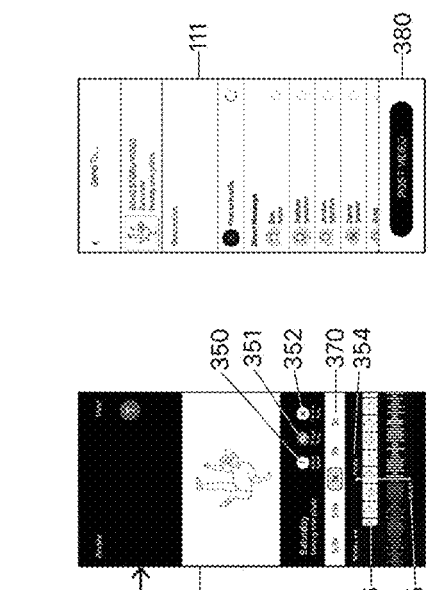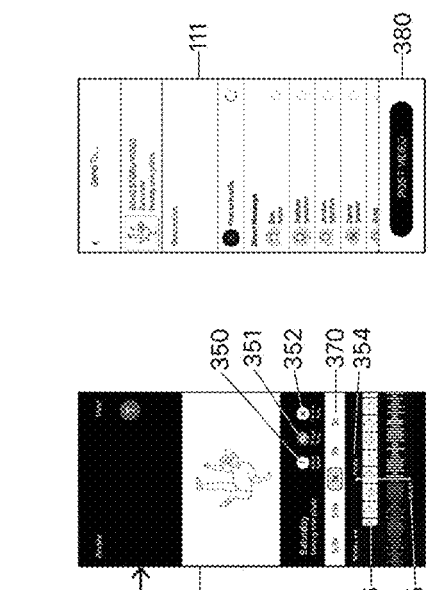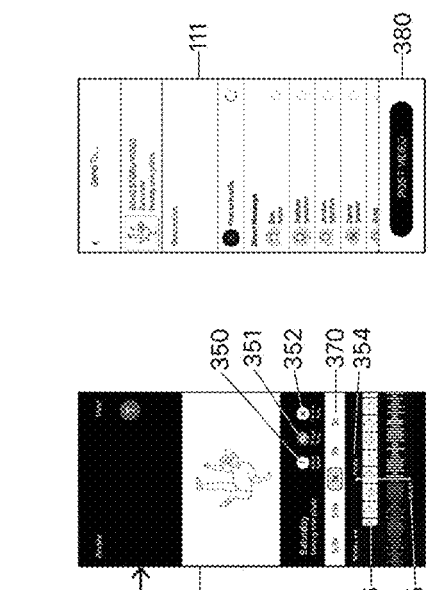
Figure 3

Figure 11
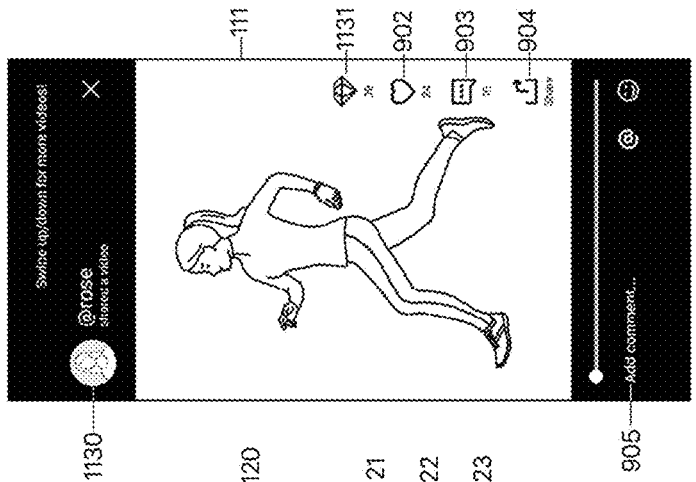
Figure 11A
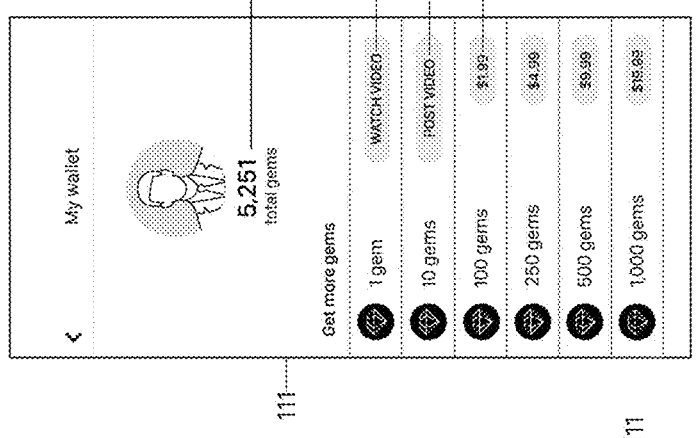
Figure 11B
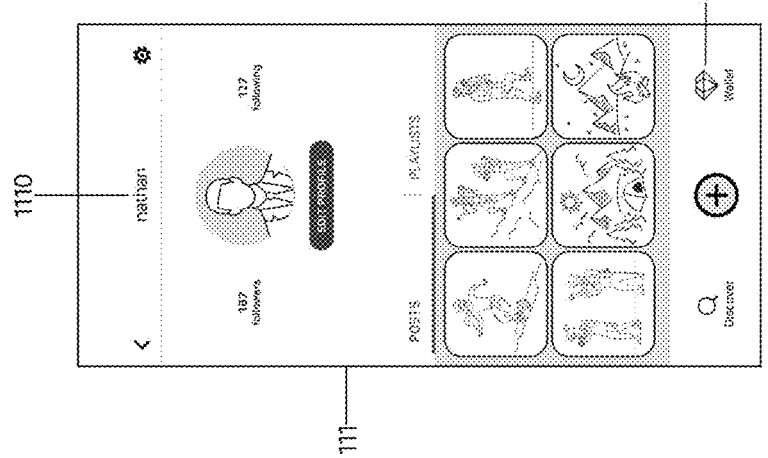
Figure 11C

SYSTEM AND METHOD FOR COMPILING USER-GENERATED VIDEOS

PRIOR HISTORY

This is a Continuation-in-Part patent application claiming the benefit of pending U.S. patent application Ser. No. 16/289,443 filed in the United States Patent and Trademark Office (USPTO) on 28 Feb. 2019, which application claimed the benefit of U.S. Provisional Patent Application No. 62/636,298 filed in the USPTO on 28 Feb. 2018, the specifications of which applications are hereby incorporated by reference thereto.

BACKGROUND OF THE INVENTION

Field of the Invention

The present invention generally relates to a system and method for compiling user-generated videos associated with sections of an audio track, whereby the resulting video compilation plays alongside a separate audio track.

Background

User-generated content ("UGC") has become the dominant form of entertainment, marketing, and news for Millenial and Generation Z consumers. Market research indicates that Millennials spend 18 hours per day with media, and that 30% of that time is spent looking at UGC. Additionally, consumers watch UGC content, on average, ten times more than content created by brands; and 84% of Millennials claim user-generated content or UGC influences their buying decisions more so than any other form of advertising.

Short-videos have quickly emerged as the fastest-growing category in digital media and the preferred source for news, entertainment, and other information for Generation Z and Millennial consumers. Current research studies indicate that consumers between the ages of 18-24 rely on short-form videos as their primary source of political news, making short-form video platforms such as TikTok a place for young people to form their political identities, find like-minded allies, and engage in activism. Short-form video platforms have become an outlet for self- and collective-expression, as well as a trove of bingeable entertainment—with videos that span a vast spectrum of content, from the ordinary (e.g., a cat pawing at a camera or a person peeling a banana) to the truly awe-inspiring (e.g. elaborately staged illusions).

Short-form videos are usually no more than three minutes long (but generally can be up to ten minutes in duration) and feature users performing stunts, dancing, singing, lip-syncing, or otherwise engaging in some type of entertaining activity. Most social media platforms allow users to record a short-form video using the video camera on the user's mobile device or else upload a pre-recorded video from the device's saved video content. Many platforms provide an array of editing and creative tools that allow a user to enhance raw video content by adding filters, text, stickers, emojis, sound effects, video effects, and music. For example, a user may select a short segment of music, usually no more than fifteen seconds, to embed into the video prior to uploading the finished short-form video to the platform.

In keeping with the short-form video trend, nearly all of the major social media platforms including TikTok, YouTube, Instagram, Snapchat, and Triller provide their users tools to create, share, and watch short-form videos. Certain social media companies have added social enhancements to the creation and consumption of short-form videos, thereby allowing users to create new and unique content in collaboration with other creators across their platforms. For example, some video applications allow users to re-use snippets of other users' videos, in order to create reaction videos and remixes. TikTok's Stitch feature provides a mechanism for a user to clip and integrate scenes from another user's video into their own as a way to reinterpret and build upon other users' content. TikTok's Duet tool similarly enables users to create a video that plays side-by-side with another user's video, thus allowing users to add reaction videos or simulated collaborations with other users on the platform.

Thus far, however, no video platform enables users to stitch together user-generated videos into a compilation (which the inventors of the present system and method refer to as a "Song Story") that plays alongside separate audio content. A "Song Story" is intended to visually illustrate the meaning of a song, oftentimes as the song is interpreted and by its fans. By compiling fan-created videos that are inspired by a song, a viewer can experience the song in a new and multi-dimensional and immersive way. A "Song Story" may also include videos, text, or visual content that depict interesting information about the song, such as how the songwriter was inspired to write the lyrics or music. Thus, the present invention gives video platforms a mechanism to reinvent existing content and provide users a new way to interact with videos (particularly short-form videos) and music.

BRIEF DESCRIPTION OF PRIOR ART

United States Patent Application Publication No. 2012/0004960, authored by Ma et al. describes a streaming media system employing dynamic rate adaptation. The method includes a file format compatible with legacy HTTP infrastructure to deliver media over a persistent connection. The method further includes the ability for legacy client media players to dynamically change the encoded delivery rate of the media over a persistent connection. The method provided works transparently with standard HTTP servers, requiring no modification and leverages standard media players embedded in mobile devices for seamless media delivery over wireless networks with high bandwidth fluctuations. A system is also specified for implementing a client and server in accordance with the method.

United States Patent Application Publication No. 2013/0125000, authored by Fleischauer et al. describes a media-editing application. The application receives a selection of several media clips for creating a multi-camera media clip. Based on metadata stored with the media clips that identifies sources of the media clips, the application automatically assigns the clips to at least two different groups in the multi-camera media clip. For each group of the multi-camera media clip, the application automatically orders the assigned clips along a timeline using timing data. The application uses the timing data to automatically initially synchronize the different groups of the multi-camera media clip. The application automatically adjusts the initial synchronization of the groups by comparing audio data of media clips assigned to different groups.

United States Patent Application Publication No. 2013/0163963 ('963 Publication), authored by Crosland et al., describes a System and Method for Generating Music Videos from Synchronized User-Video Recorded Content. The methodology of the '963 Publication automatically generates a master music video comprising a plurality of user-generated videos synchronized against a segment of an audio track. The method includes dividing an audio track into a plurality of segments.

A user-recorded video is automatically selected for each of the plurality of segments, where each selected user-recorded video includes a video recording of a user, synchronized against an audio clip of a unique one of the plurality of segments. The method further includes concatenating the user-recorded videos in a sequence and into a master music video featuring the user-recorded videos all placed in synchronization against the entire audio track such that playback of the plurality of segments associated with the user-recorded videos in the sequence corresponds to an original sequence of the audio track in its entirety.

United States Patent Application Publication No. 2014/0164563, authored by Leekley et al., describes a content delivery network for delivering select data files to an end user. The content delivery network provides a client, a P2P gateway server, and a Resource Name Server (RNS) within a computer-populated network. The RNS caches data resource locations within the computer-populated network and resolves resource requests with optimal data resource locations within the computer-populated network.

The gateway server requests and receives optimal data resource locations via the RNS; requests and receives data files from the computer-populated network via the optimal data resource locations; and processing received data files for data file delivery to the client. The network thus enables an origin-agnostic data delivery method for optimally delivering select data files to an end user. A data-routing governance or management utility governs/manages the content delivery network and associated methodology for providing industry rights management, compliance monitoring, and/or compliance reporting of data file transmissions.

United States Patent Application Publication No. 2017/0041280, authored by Savenok et al., describes certain smart routing synchronization systems for socializing a synthetic rebroadcast or group stream for enabling members of a user group to (re)broadcast select content to other members of the user group and collaboratively curate content delivery. The systems are based on a content-identification process and further a process for (re)broadcasting content.

These processes are cooperable among a group of member clients each of which are in communication with at least one content source. The synchronization process identifies select content and directs delivery of the content from an optimal resource for each member client via a smart routing protocol. The (re)broadcast process prompts delivery of the select content to members of the user group from a content origination member of the group, and group members are thereby able to simultaneously access the content for the purpose of providing a content-based platform for social interaction.

United States Patent Application Publication No. 2017/0289220, authored by Bloch et al. describes media streams or files, such as audio and video streams, within a media presentation are synchronized by dynamically adjusting the playback rate of one or more of the streams relative to a reference (clock) stream. In one implementation, a video presentation including a plurality of media streams is received, with each media stream having a respective playback rate. One of the media streams is selected as a clock stream. The media streams are simultaneously played according to their respective playback rates, and a second media stream is synchronized with the clock stream.

The system and method according to the present invention operates with reference to the context of the system and method compiling a singular video file from user-generated video fragments, described in U.S. patent application Ser. No. 16/289,443, authored by Leekley et al., parent to this Continuation-in-Part patent application.

SUMMARY OF THE INVENTION

The system and method according to the present invention gives online platforms a mechanism for providing their users a collaborative and social experience around videos and music. The so-called "Song Story" feature enabled by the system and method according to the present invention basically compiles videos into a video composition, where each user-generated video is inserted into a section of the compilation as determined by various criteria, and then plays back the video compilation alongside, or generally at the same time, as the playback of a context-providing musical composition.

The system and method according to the present invention describe a system and/or method operable within a computer network environment which may include but is not limited to the computer network environments more exhaustively described in United States Patent Application Publication No. 2014/0164563, authored by Leekley et al. and United States Patent Application Publication No. 2017/0041280, authored by Savenok et al. as hereby incorporated by reference thereto. The system and method according to the present invention basically functions to compile videos into a compilation that plays alongside a context-providing audio track.

The system and/or method according to the present invention may be said to comprise a solution stack, which may include a remote service system and at least one client exemplified by a mobile communications device, but preferably a series of clients, each of which may be operable to capture or generate at least one video. Each video may be generated by the client device simultaneously with a section of an audio track, as (a) determined by a specific start time and end time selected by a user during playback of the audio track on the client; (b) identified by at least one member of the solution stack; or (c) matched by at least one member of the solution stack based on a user's selected metadata.

The system and/or method according to the present invention preferably comprises a solution stack that basically operates to identify at least one audio track section associated with each user-generated video, the audio track having a unique identifier; and moreover, to determine a start time and end time of the segment of the audio track that corresponds with the start and end times of the video fragment. Optionally, if an uploaded video contains an audio track embedded or otherwise associated with it, that contains a section of an audio track, then at least one member of the solution stack may employ an algorithm for identifying or recognizing the audio track content associated with the video fragment.

The solution stack preferably compiles at least one user-generated video into an audiovisual set and further into a video compilation that is played alongside at least one section or the entirety of an audio track, based on the start and end times of each video as determined by (a) the user's selected input; (b) the start and end times of the embedded or associated audio track section contained in the uploaded video, as identified by at least one member of the solution stack; or (c) metadata selected by the user, which may correspond to certain start and end times. Moreover, the remote service system preferably plays back the audio track from a preferred source, with the audio track identified by a unique identifier.

The unique identifier is preferably abstract and resolvable for allowing the remote service system and the at least one client to associate the at least one video with corresponding audio track content as sourced to each respective client from at least one content provider by a variety of methods, including but not limited to those discussed in more detail in United States Patent Application Publication No. 2014/0164563, authored by Leekley et al. and United States Patent Application Publication No. 2017/0041280, authored by Savenok et al. prefaced hereinabove.

The system according to the present invention preferably compiles at least one user-generated video into a video compilation either through random computer-generated means or by various ranking methods. For example, the system can employ a randomized algorithm to select videos from among multiple videos that are associated with a select audio track section, to be inserted into the video compilation. Alternatively, the remote service system can rank each video against other videos associated with the same, similar, or overlapping audio track sections, based on the number of the views, downloads, likes, flags, shares, comments, or other social interactions related to the video clip.

The system according to the present invention may further operate to present at least one user-generated video and the select audio track section together as a social media post for allowing peripheral users to interact with the video. Additionally, the remote service system can present competing videos in a list format for allowing peripheral users to view and otherwise interact with the videos. In this regard, the remote service system allows the peripheral users to view and respond to each video with likes, flags, votes, shares, downloads, comments, or other user interactions, and these social interactions can be used for ranking the video against other videos associated with the same, similar, or overlapping audio track sections. A higher ranking video may thus displace a lower ranking video for any given or selected audio track section.

Each participating client may then send a playback request for the video compilation by sending the unique identifier to the remote service system. The remote service system then responds to the playback request by playing the video compilation alongside an audio track, whether a section or the entirety thereof, that is associated with a unique identifier. The audio track may be played at each respective client from a preferred source by a variety of methods and/or systems, including those made the subject of United States Patent Application Publication No. 2014/0164563, authored by Leekley et al. and United States Patent Application Publication No. 2017/0041280, authored by Savenok et al. as prefaced hereinabove.

Each client then plays the audiovisual set and/or video compilation and the identifier-affiliated audio track at or from a given playback position, in a synchronized manner, with same speed playback as controlled via the use of dynamic playback rates and a rate-governing algorithm. In one embodiment, the user can select an alternative speed of playback for the audio track section associated with the video. When the user selects an alternative speed for audio playback associated with the video content, the remote service system can adjust the playback speed for that section of the audio track to account for the user's selection.

The remote service system may further operate to pad any sections of the video compilation with additional filler content, for allowing the video compilation to play seamlessly between positioned fragmentary content and/or for the purpose of providing advertising or other related content. Further, either the client or the remote service system according to the present invention may preferably pad raw video fragments with filler content, said filler content being added at either the beginning and/or the end of the raw video fragments for creating filler-added video fragments and ensuring that the filler-added video fragments start and end at precise time markers for enhancing stream delivery. The filler content can be empty content, text, visual media, videos, or any combination thereof.

BRIEF DESCRIPTION OF THE DRAWINGS

Other features of the invention will become more evident from a consideration of the following brief descriptions of patent drawings:

FIG. 3 illustrates example screens of an application showing how a user selects a video to upload, selects an audio track to associate with the video, then selects start times for the video and audio content, adjusts the speed of the audio content, and then generates the video and content as a compilation.

FIG. 11 illustrates example screens of an application showing how a user can earn currency units by, inter alia, posting or interacting with videos, and transfer currency units to another user in relation to a video.

DETAILED DESCRIPTION OF THE PREFERRED SYSTEM AND METHODOLOGY

In the following description of the preferred system and associated methodology, as well as various example embodiments in which the invention may be practiced, reference is made to the accompanying drawings with more specificity. It is to be understood that embodiments may be utilized and that structural changes may be made without departing from the scope of the present invention.

I. Components of the Invention; Definitions of Terms

A. Components of the System and Associated Methodology

Figure 1:
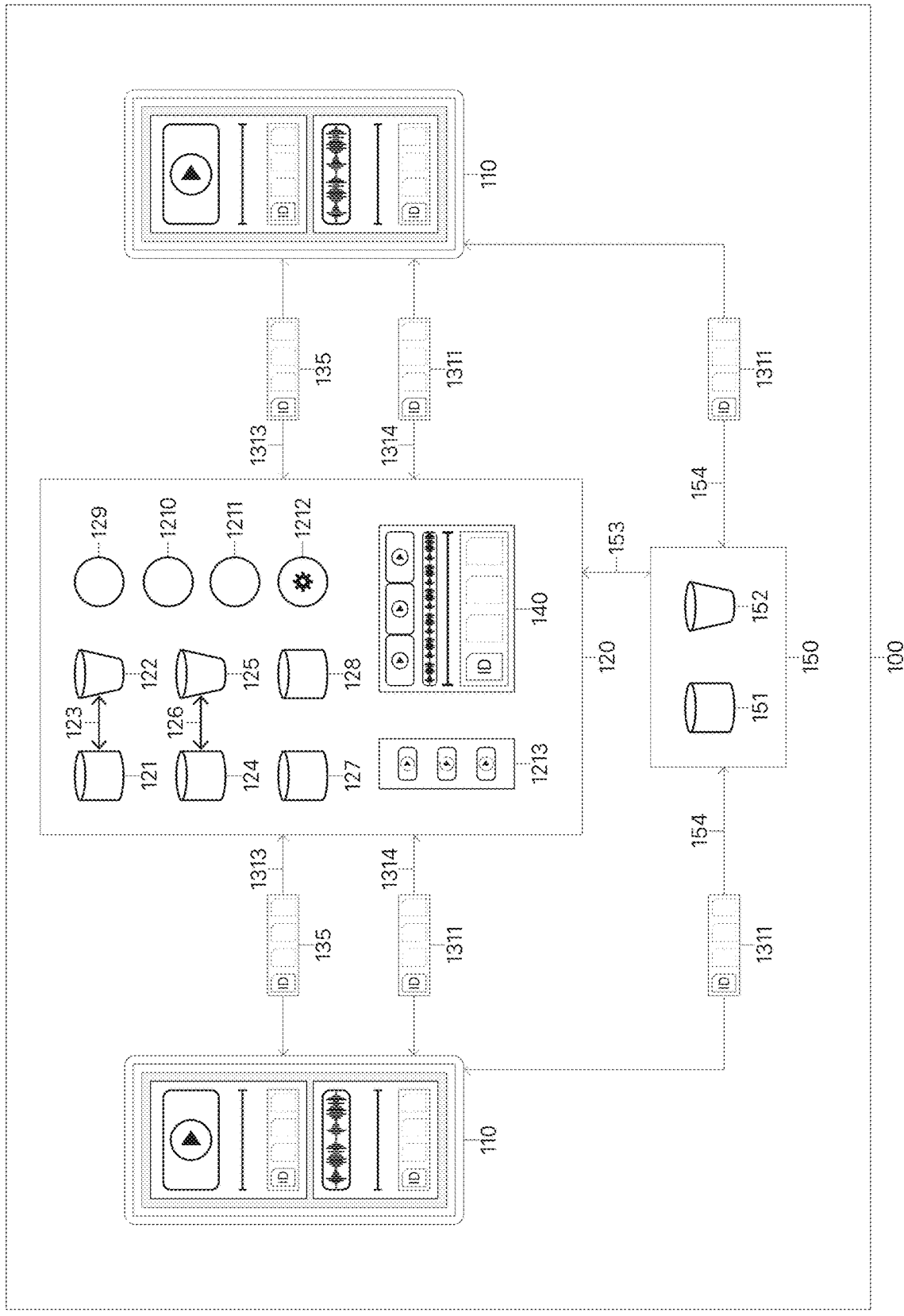
FIG. 1 is a flowchart diagram of the systemic components according to the present invention, depicting a client in communication with a remote service system containing a storage database for contributing videos that will presented as social posts and thereafter be selected, based on social inputs or other criteria, for inclusion in a video compilation that plays alongside an audio track.
Figure 1A:
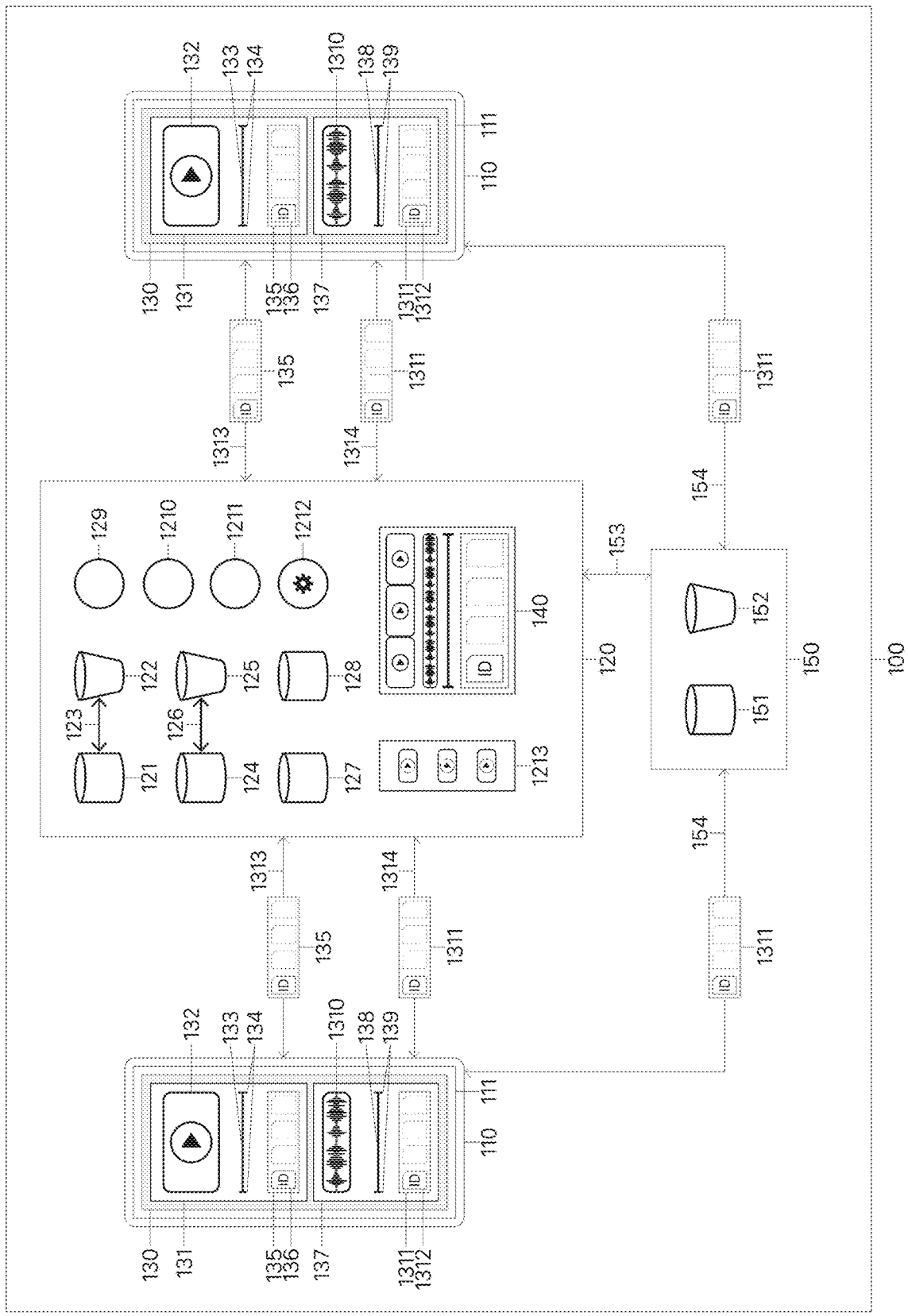
FIG. 1A is a flowchart diagram of the systemic components according to the present invention, depicting a client in communication with a remote service system containing a storage database for contributing videos that will presented as social posts and thereafter be selected, based on social inputs or other criteria, for inclusion in a video compilation that plays alongside an audio track, with greater specificity as to the client.
Figure 1B:
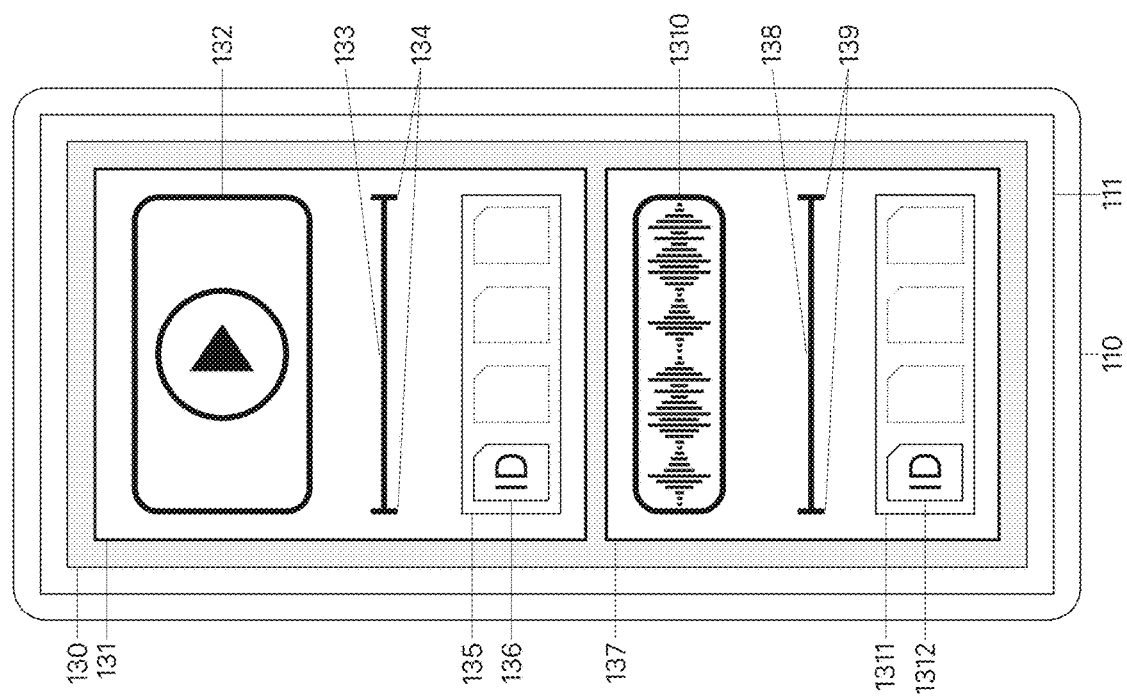
FIG. 1B is a diagram of the client which contains a user interface, and is operable to create, present, and/or view an audiovisual set that contains a video compilation that plays alongside an audio track.
Figure 1C:
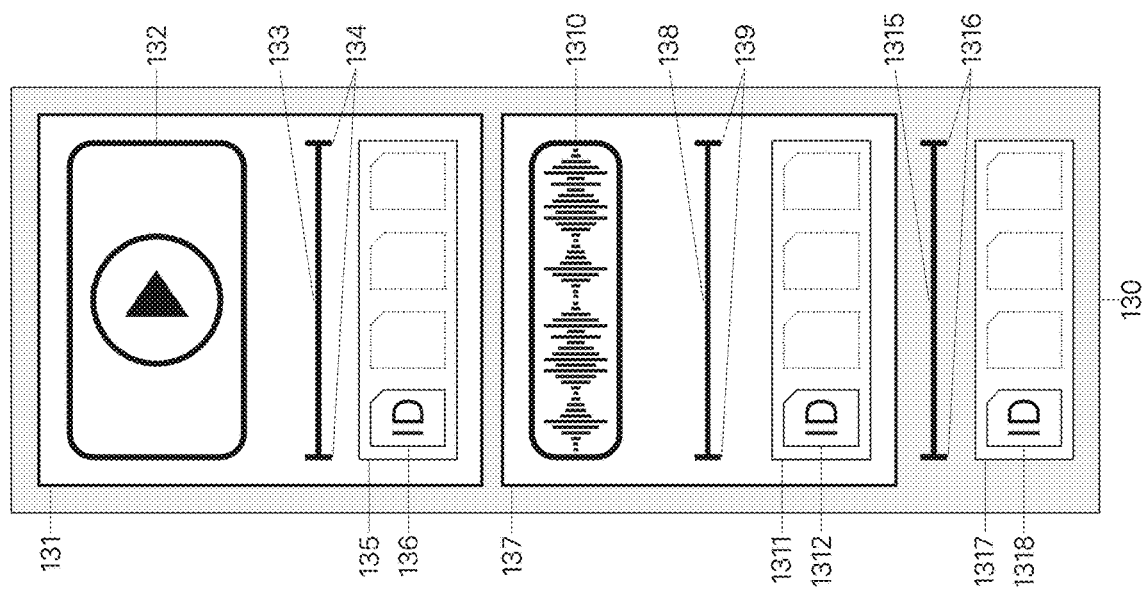
FIG. 1C is a diagram of an audiovisual set showing a video compilation that plays alongside an audio track, where the video compilation, audio content, and audioset each have their own unique identifiers and other metadata.

Referring now to the FIG. 1 with more specificity, the preferred system and associated methodology according to the present invention primarily comprises or is supported by the following major components: a solution stack 100 that comprises at least one client as depicted and referenced at 110 and a remote service system as generally depicted and referenced at 120. Each client 110 is typified by a mobile communications device and outfitted with non-transitory computer-implementable software, so as to enable the user to generate at least one audiovisual set, depicted and referenced at 130. FIG. 1A provides greater detail as to the components of a client 110; and FIG. 1B shows an enlarged representation of the client 110. FIG. 1C shows an audiovisual set 130 in greater specificity, to illustrate the inclusion of three timelines for the video compilation 131, audio content 137, and the audiovisual set 130 itself, as well as the incorporation of three groups of metadata for the video compilation 131, audio content 137, and the audiovisual set 130 itself.

The solution stack 100 provides for management of relationships among various elements of an audiovisual set 130, depicted in FIGS. 1A and 1B. Each audiovisual set 130 comprises two parts: video content in the form of a video compilation 131 and an audio content portion or piece 137. The video compilation 131 comprises at least one of the following: at least one video fragment 132; a video timeline 133; audiovisual set range(s) 134 (start time(s) and end time(s) along the video timeline 133); and video metadata 135 (including a video unique identifier 136, duration, and bitrate). The audio content piece 137 comprises at least one of the following: an audio timeline 138; audiovisual set range(s) 139 (start time(s) and end time(s)) along the audio timeline 138; audio data ("waveform" data) 1310 which is further referenced and depicted in FIGS. 2, 4, 6, and 8; and audio metadata 1311 (including an audio unique identifier 1312, duration, and bitrate).

Conceptually, each audiovisual set 130 takes into account three timelines: (1) a video timeline 133 for the video fragment 132 (which may be trimmed from raw user-generated video content); (2) an audio timeline 138 for the section of the audio track; and (3) the audiovisual set timeline 1315 for the resulting set containing the video and audio content. The audiovisual set 130 is not necessarily a singular file, but the set can, conceptually, be considered to have its own timeline 1315 with an audiovisual set range 1301 that always starts at 0:00. FIG. 1C illustrates an audiovisual set 130 with three distinct timelines, for the video compilation 131, audio content 137, and the audiovisual set 130 itself.

Figure 13:
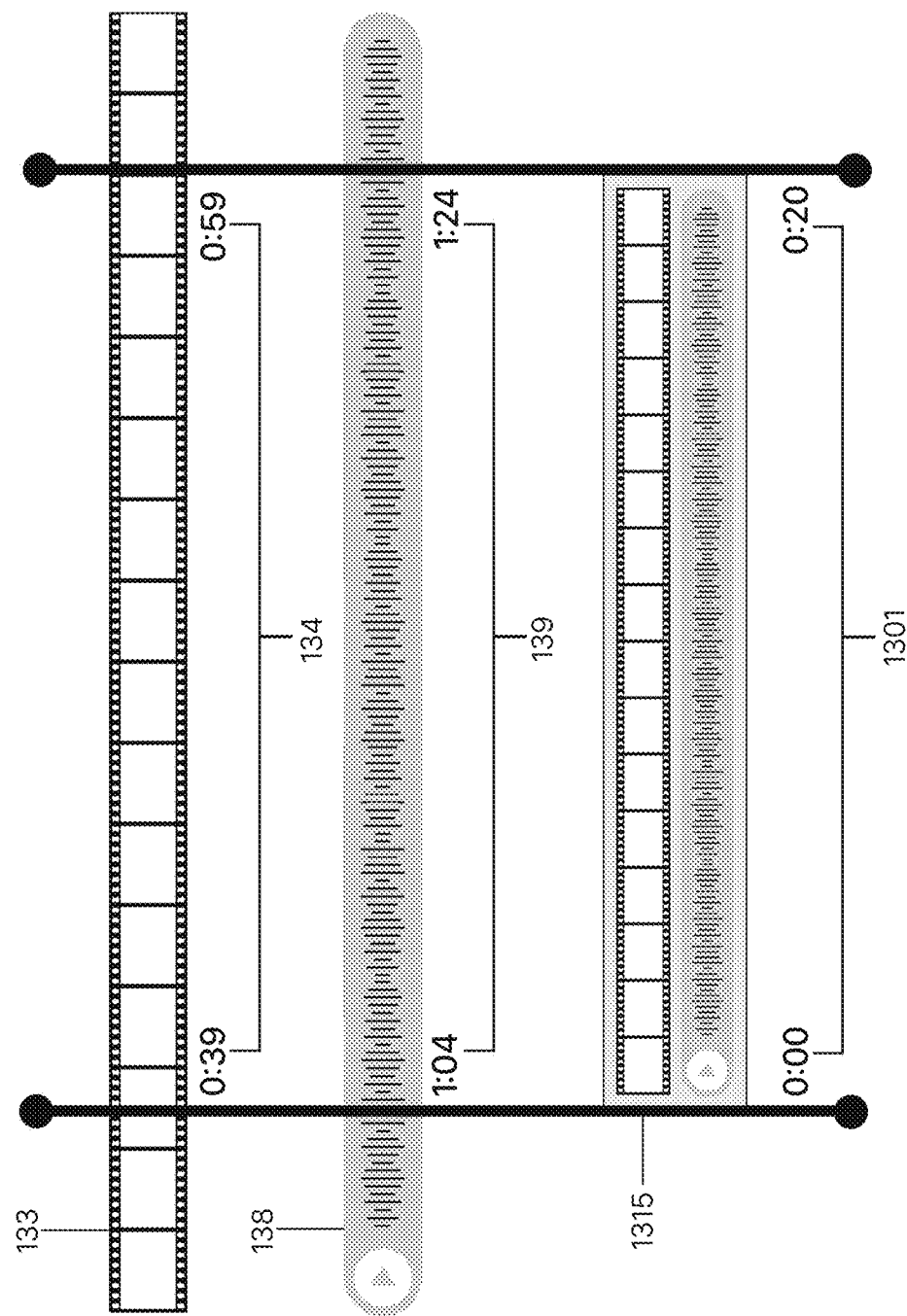
FIG. 13 is a diagram showing the relationship between an audio timeline, video timeline, and audiovisual set timeline.

The relationships among the video timeline 133, audio timeline 138, and resulting audiovisual set timeline 1315, for an audiovisual set 130 containing one visual fragment 132, are further represented in FIG. 13. In this example, a user has trimmed a 41-second video into a 30-second clip with an audiovisual set range 134 along the video timeline 133 starting at the 0:05 mark of the original video timeline 133 and ending at the 0:35 mark. The video clip is then associated with a section of an audio track 1310 whose entire duration is 49 seconds. The audiovisual set range 139 along the audio timeline 138 has a start time at the 0:12 mark and ending at the 0:42 mark of the original audio timeline 138. The resulting audiovisual set 130 has a range 1301 of 30 seconds, starting at 0:00 and ending at 0:30.

Turning back to FIG. 1, the solution stack 100 enables transmission 1313 of video compilations 131 (including the video compilation 131 and its subcomponents) as well as the transmission 1314 of audio-related subcomponents. Both types of transmission involve bidirectional communication between each client 110 and the remote service system 120 (that is, communication from the client 110 to the remote service system 120, and vice versa). Specifically, the client 110 and remote service system 120 transmit at least the video compilation 131 and video metadata 135, and at least the audiovisual set range(s) 139 and audio unique identifier 1312.

The video content metadata 135 is stored in a video content database 121, and any video file(s) 132 are stored in a video object storage system 122, within the remote service system 120. The remote service system 120 employs a management process 123 to manage video fragments 132 and additional video content 141, with the video content database 121 and video object storage system 122 working in concert. Similarly, the audio content metadata 1311 is stored in an audio content database 124, and any audio file(s) are stored in an audio object storage system 125, by the remote service system 120.

For an audiovisual set 130, the remote system may store and manage the relationship(s) of audiovisual set ranges 134, 139, including their respective video timeline(s) 133 and audio timeline(s) 138, to at least one other set range 134, 139 and timelines 133, 138 within the audiovisual set 130 or to another set 130. This allows the concurrent playback of at least two media files 132, 137 of any type, each with discrete timelines as defined by their respective audiovisual set ranges 134, 139 (and, therefore, discrete durations) with each timeline relative to the other(s), preferably within the same audiovisual set 130, as indicated by the client 110 or, alternatively, by a programmatic process within the solution stack 100. Thus, the video content database 121 and video object storage system 122 work in concert with the audio content database 124 and audio object storage system 125 in order to provide a timeline of timelines 1315, comprised of at least two video timeline(s) 133 and/or audio timeline(s) 138, which are thus relative to each other within the audiovisual set 130. The remote service system 120 may store and manage audiovisual set metadata 1317 about these relationships in a series of databases 121, 124.

The remote service system 120 may preferably present at least one audiovisual set 130 for user consumption. The remote service system 120 further enables users to socially interact with the videos 132 played alongside audio track content 1310. Social interactions may comprise but are not limited to viewing, liking, voting for, tagging, downloading, sharing, or commenting on the videos. The remote service system 120 may further preferably operate to register inputs from those social interactions ("social inputs") in a generation of rankings 1213 (whether ordered or unordered, and whether determined algorithmically or randomly).

Figure 1D:
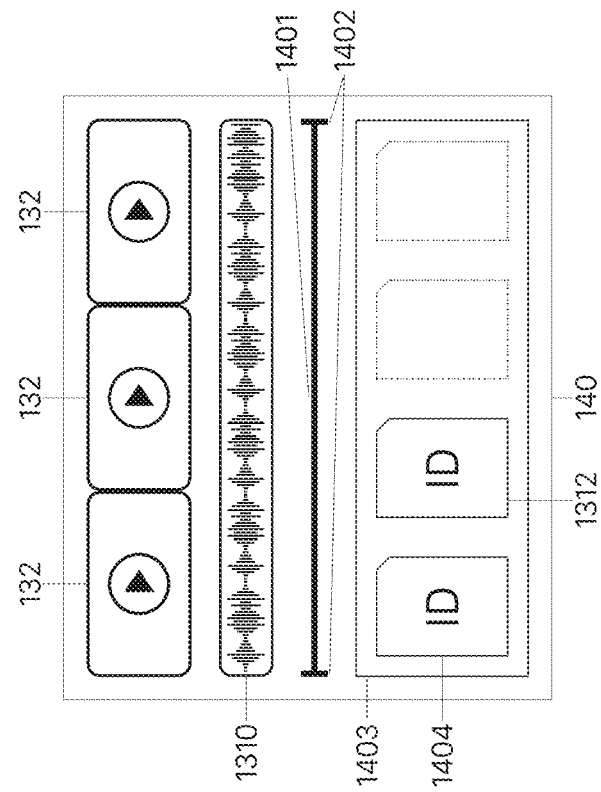
FIG. 1D is a diagram of a "compilation of compilations" which contains at least one video compilation that plays alongside an audio track, and one or more pieces of metadata including at least one unique identifier, where the video compilation is comprised of one or more video fragments.
Figure 12:
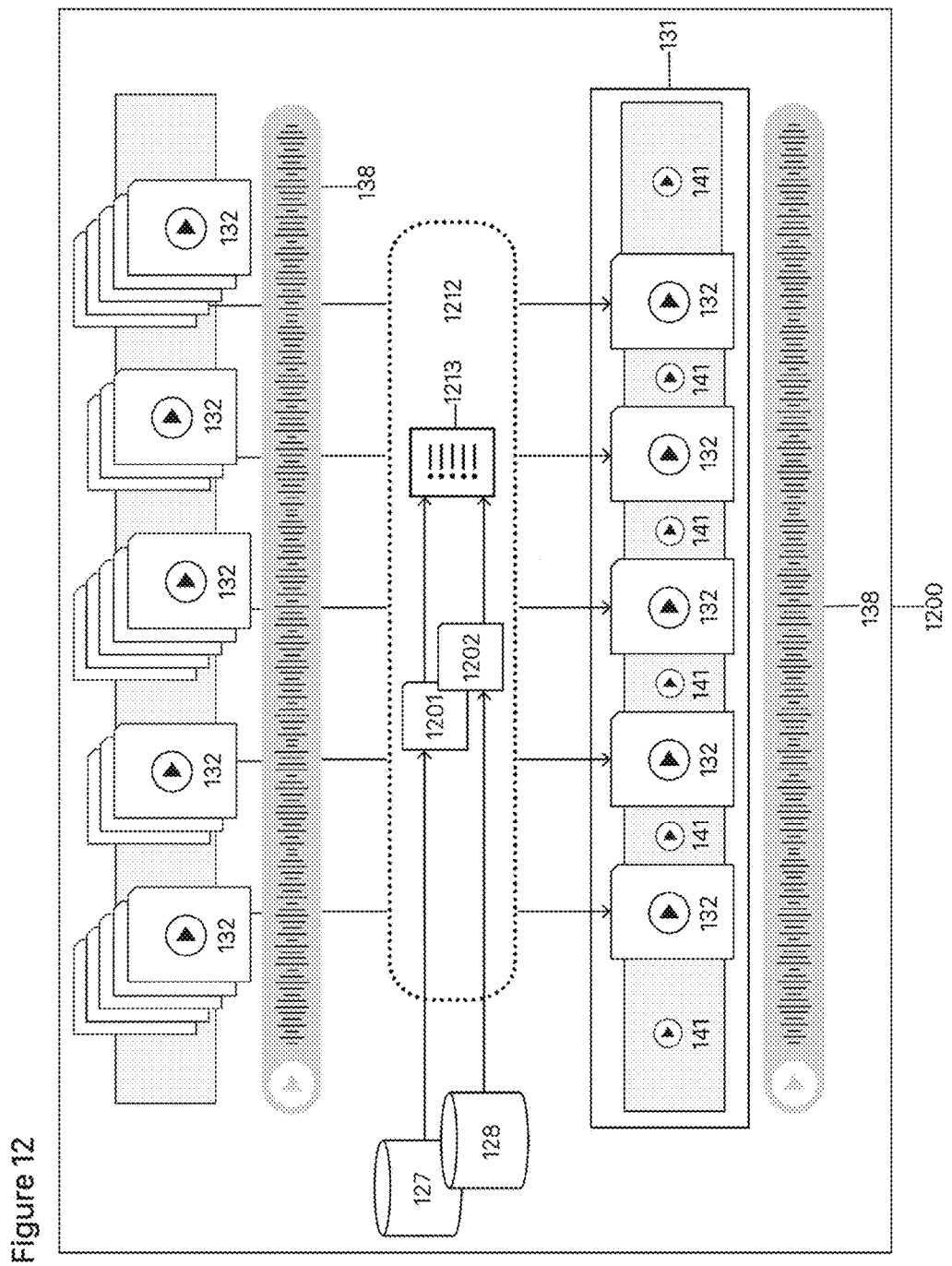
FIG. 12 is a flowchart diagram depicting the selection of videos for a video compilation and the insertion of additional filler content between raw videos, such that the resulting compilation containing videos and additional content plays alongside an audio track.

Preferably, the remote service system 120 may employ a process 1212 to generate rankings 1213 from which a selection of video fragments 132 may be included in a resulting compilation of compilations 140, as comparatively depicted in FIGS. 1C, 1D, and 12. The resulting compilation 140 may, but does not necessarily also include, additional video content, as at 141, inserted between or appended to at least one end of a video fragment 132. The video compilation 131, comprising video fragments 132, with or without additional content 141, plays alongside at least one audio track 1310, or alternatively, alongside audio track sections, as indicated within the audio content 137 audiovisual set ranges 139. The audiovisual set ranges 139 use start time and end time positions relative to the audio timeline 138. The remote service system 120 sends the video compilation 131 to the client 110 for playback.

The remote service system 120 preferably includes at least one methodology for identifying audio content (that is, recognizing audio content and matching audio content against known audio files). These methods include but not are not limited to file signature matching (hash function) 129, metadata-based matching 1210, and fingerprint (waveform) matching 1211.

Finally, the solution stack 100 preferably, but does not necessarily, include an "other content source" (which may be a third-party content source) 150, potentially comprising its own content database 151 and object storage system 152. The other content source 150 may be an "audio provider" including a digital service provider (DSP) such as Amazon Music, Apple Music, Deezer, Pandora, SoundCloud, or Tidal. The solution stack 100 enables bidirectional transmission 153 between the other content source 150 and the remote service system 120, as well as bidirectional transmission 154 between the client 110 and other content source 150.

B. Definitions

The system and method of the present invention—and the parts, elements, limitations, components, protocols, and processes that comprise them—should be understood using the broadest possible meanings of the terms as defined herein. If the ordinary or customary meaning of a term is narrower than a definition used in this section, the term should be redefined and expanded to encompass the meaning set forth herein.

The present invention primarily comprises or is supported by a "solution stack" 100 (sometimes referred to as a "software stack"). A solution stack 100 generally refers to a set of software subsystems or components needed to create a complete platform on which applications can run. For example, a web application generally requires a solution stack 100 that comprises a target operating system, web server, database, and programming language. Another version of a solution stack 100 comprises an operating system, middleware, database, and applications. Historically, the term "solution stack" has occasionally included hardware components as part of a final product, mixing both the hardware and software in layers of support.

Each component ("member") of a solution stack 100 may work independently or cooperatively with at least one other member to support the execution of an application. For example, certain software components power remote service processes, while others are used in the presentation layer to enable the user interface 111 of an application. In any case, the members of a solution stack 100 may work in tandem to deliver application services to an end-user.

Referring back to FIG. 1, the preferred system and associated methodology according to the present invention comprises a solution stack 100 that may include the following major components: at least one client 110 and a remote service system 120.

A "client" 110 generally refers to any piece of computer hardware or software that accesses a service made available by a server as part of the client-server model of computer networks. In client-server architecture, many remote processors request and receive services from a centralized server, such as a host computer. Each remote processor—whether a device, system, or user—may also be considered a client 110 of another remote processor. Thus, a client broadly means a consumer of any service. Each client 110 may be typified by a mobile communications device and outfitted with non-transitory computer-implementable software (e.g., operating systems, device interfaces, application programmatic interfaces ("APIs"), or networking) that enables the user to upload, capture, or otherwise generate video content in the form of a video fragment 132.

The "user interface" 111, which is the means by which a user interacts with or controls a software application or hardware device, is assumed to be part of the client 110 in the drawings and descriptions provided herein. The screens provided in the drawings (FIGS. 3, 3A, 3B, 3C, 3D, 3E, 3F, 3G, 3H, 5, 7, 9, 10, 11, 11A, 11B, 11C) depict example graphical user interfaces 111 for an exemplary software application that might employ the system and methods described in the present invention. Any references to the "client" 110 necessarily encompass the user interface 111 for the client device and any software applications running on the client 110.

A "remote service system" 120 (referred to colloquially as the "back-end") refers to any structures, servers, mainframes, and/or other computing systems. These may include hardware, software, network layers, application layers, infrastructure/management layers (cloud services), databases (engines and storage layers for databases), micro services, APIs, WebSockets, and/or data or signaling channels. Additionally, components of a solution stack 100, and preferably a remote service system 120, that manage the storage and retrieval of files or other data may include sub-systems that may be characterized as "object" or "block" storage in place of or alongside typical "file" storage systems.

Database components of the solution stack 100 may be of any type, such as relational, document-based, or graph, with each database potentially capable of interacting with any other member of the solution stack 100, preferably within the remote service system 120. For the purposes of this document, modifiers may be added to references of databases, such as "video" database 121 or "audio" database 124, for the purpose of convenience for the reader and not as a statement of a technical or contextual limitation.

In file-based storage, data is stored as a single piece of information organized inside a folder and retrieved via a path that can be determined by metadata. Block storage may segment data into blocks, which may be stored as separate pieces on Storage Area Networks (SANs) or cloud-based storage environments. That is, block storage allows for data to be decoupled from user environments and spread across multiple environments. When data is requested, the underlying storage software reassembles the blocks and presents them back to the user. Finally, object storage systems may store files in a flat organization of containers ("buckets") instead of organizing files in a directory hierarchy. Object storage uses unique identifiers ("keys") and a limited amount of metadata to retrieve data files. Object storage systems of the solution stack 100 may be of any type, with each system potentially capable of interacting with any other member of the solution stack 100, preferably within the remote service system 120. For the purposes of this document, modifiers may be added to references of databases, such as "video" object storage system 122 or "audio" object storage system 125, for the purpose of convenience for the reader and not as a statement of a technical or contextual limitation.

It is important to note that a remote service system 120 can be a consumer of a service and therefore a client 110 of another remote service system 120. Moreover, a client 110 and remote service system 120 may be interchangeable within a solution stack 100: each may perform the same steps of a method in one role or the other, either independently or in conjunction with one another.

The present invention covers the compilation of all video fragments 132. A video may be "user-generated" when it is selected, provided, created, generated, shared, posted, uploaded, or otherwise transmitted, by a user via a client 110. The video content can either be captured by a video camera on the client device 110 or be pre-existing video content accessible to the client 110. Moreover, the video content broadly encompasses a wide range of quality—from amateur content created by ordinary end-users to professional content produced by entertainment studios.

Although particular mention is made for short-form videos, the system and method described herein is not limited to short-form videos. A "short-form video" refers to any video that is generally not more than ten minutes in duration. While short-form videos have become the leading form of user-generated video content, the present invention can be practiced with videos of any length, including long-form videos lasting more than ten minutes in duration.

A "video fragment" (or simply, a "video", as a noun) as used herein means at least one video frame, that is inclusive of an entire work, and collectively may be also known, colloquially, as a "video clip", "video reel", "video snippet", or "video short". The invention is not limited to any type, quality, resolution, aspect ratio, orientation, or encoding of video. In the context of this invention, the term "video fragment" may be distinguished from a "video chunk" or "chunk", which can be relevant or specific to a technical implementation. A video fragment generally can be broken into chunks if the present invention is practiced with HTTP Live Streaming ("HLS") or any other streaming protocol that processes video content as a series of small files (typically of a few seconds in duration). Each small file may be referred to as a "video chunk" or "chunk". That is, a video fragment of any duration may be converted into video chunks during a segmentation process associated with certain streaming protocols such as HLS. However, the present invention contemplates that video content may be processed, stored, or transmitted through other methods such as various streaming or communications protocols, non-fragmenting media processors or encoders, or systems configured such that a video file 132 may be contained within one fragment ("chunk").

Individual groupings of video compilations 131 alongside audio content are referred to herein as "audiovisual sets" 130. That is, each audiovisual set 130 is, at its most basic sense, a compilation of at least one video fragment 132 that plays alongside at least one audio track 1310 section. An "audiovisual set" 130 as used herein means any combination of video content with audio content and any respective metadata. In the context of the present invention, an audiovisual set 130 comprises a piece of video fragment 132 and a piece of audio track 1310 content, and all data associated with those pieces that allows the solution stack to present the two pieces for playback alongside one another. Thus, an audiovisual set 130, as defined for purposes of the system and methods described in the present invention, includes a video compilation 131, video fragments 132, video timeline 133, audiovisual set range(s) 134 (the start time(s) and end time(s)) along the video timeline 133, video metadata 135 (including the video's unique identifier 136, duration, frame rate, and bitrate), audio content 137, audio timeline 138, audiovisual set range(s) 139 (start time(s) and end time(s)) along the audio timeline(s) 138, audio (waveform) data 1310, and audio metadata 1311 (including the audio track section's unique identifier 1312, duration, and bitrate on the line). Colloquially, an audiovisual set 130 may be referred to as a "music video" which means a video 132 set to music 1310.

A "video compilation" 131 means either (a) a singular, cohesive file that contains one or more short-form video files or video fragments 132; or (b) a playlist that orders the sequential playback of individual short-form videos 132, video fragments 132, or video chunks in addition to any additional content ("filler") 141 and metadata. The latter definition is used if the invention is practiced with HTTP Live Streaming ("HLS") or any other streaming protocol that sends video content 132 as a series of chunks. The video chunks are listed in an index file ("playlist") that provides an ordered list or manifest of the uniform resource locators ("URLs") of the video chunks. For HLS, an index file is saved as a M3U8 playlist, an extension of the M3U format used for MP3 playlists. The URL of the playlist is accessed by each client 110, which then requests the indexed video chunks in sequence. Playlist content, including manifests and metadata, may be static or generated dynamically.

Theoretically, a video compilation 131 may be a compilation of compilations (that is, a resulting so-called "Song Story") 140, wherein content may have been contained within another audiovisual set 130, including at least one other video compilation 131 or audio content 137. When multiple video fragments 132 are compiled along a video timeline 133, the result is a "video compilation" 131 that may be played alongside a larger section or the entirety of the context-providing audio track 1310.

Further, each video compilation 131 can be static or dynamic, meaning the selection and/or order of the videos 132 featured in a compilation 131 can be fixed or ever-changing. That is, a compilation 131 may comprise a fixed arrangement of users' videos such that each viewing of the compilation 131 is the same for all users, at all times. Alternatively, the solution stack 100 can utilize any number of users' videos 132 that have been posted to an application, to create a virtually infinite number of permutations. In the latter case, each request for a "Song Story" video compilation 140 may present a viewer with a different mosaic of users' videos 132.

An "audio track" 1310 means any discrete piece of audio data that can be presented along a timeline, not necessarily limited to a recording of an individual song or musical composition. That is, the audio track 1310 is synonymous herein with audio data ("waveform" data), as depicted, for example, in FIG. 2. An audio track 1310 may comprise a variety of storage mediums and formats and may be transported as a file or stream. The system and method according to the present invention contemplates that at least one audio track 1310 will play alongside a video compilation 131, and there may be multiple audio tracks 1310 that can be associated with one video compilation 131.

The present invention covers all varieties of digital audio formats, including but not limited to uncompressed audio formats, such as Waveform audio track Format ("WAV"), Audio Interchange File Format ("AIFF"), Interchange File Format ("IFF"), Au File Format (AU), Pulse-Code Modulation ("PCM"), Linear Pulse-Code Modulation (LPCM), Broadcast Wave Format ("BWF"); formats with lossless compression, such as Free Lossless Audio Codec (FLAC), Monkey's Audio (filename extension .ape), WavPack (filename extension .wv), TTA, ATRAC Advanced Lossless, Apple Lossless Audio Codec ("ALAC") (filename extension .m4a), MPEG-4 SLS, MPEG-4 ALS, MPEG-4 DST, Windows Media Audio Los sless ("WMA Lossless"), and Shorten ("SHN"); and formats with lossy compression, such as Opus, MP3, Vorbis (filename extensions .ogg, .oga, .mogg), Musepack (MPC) (filename extension .mpc), Advanced Audio Coding ("AAC"), ATRAC, and Windows Media Audio Lossy ("WMA lossy").

The present invention requires a process that results with the audio data (and, possibly, other media data) being represented by a "unique identifier" that is preferably abstract and resolvable for sourcing the audio track 1310 (or media content) from a content source or provider. As the term implies, a unique identifier simply means any identifier that uniquely or discretely identifies a media resource such as an audio track 1310, video fragment 132, or video compilation 131. Thus, the system and method of the present invention refers to audio unique identifiers 1312, video unique identifiers 136, audiovisual set unique identifiers 1318, and compilation of compilation unique identifiers 1404.

Generally speaking, unique identifiers allow the control and interaction of different objects or abstract datasets within a computer network. In the context of the present invention, a unique identifier 1312 includes but is not limited to a "universally unique identifier" ("UUID"), a 128-bit label used for information in computer systems, and a "globally unique identifier" ("GUID"), which is sometimes used interchangeably, but may be distinguishable from, a UUID.

Various identification systems that produce other types of unique identifiers have been contemplated, and the term "unique identifier" is intended to broadly encompass any identifier that is globally unique or discrete within the context of at least one identification system's digital resources. For example, an organization may maintain its own archive of media files, with each file assigned a machine-generated filename that consists of a unique combination of letters, numbers, and characters. The organization may utilize any variety of algorithms, rules, or methodologies for creating computer-generated and computer-readable filenames, so long as the resulting identification system guarantees unambiguous recognition of those filenames within the system. Ideally, the filename is persistent, meaning the organization is committed to maintaining the association of the current location of the media content file with the filename. In this example, each filename allows the identification of a particular media file within the organization's archive; that is, it indicates where the media file is located and how it can be reached. Thus, the filename may serve as a unique identifier in the context of the particular archive.

Additionally, the context-providing audio track 1310 can be played from any variety of sources or content providers. For example, the present invention contemplates the sourcing from self-hosted libraries (whether on-device or remote), digital service providers (DSPs), or other licensed, non-licensed content providers, or any combination thereof. While most consumers are familiar with DSPs (e.g., Amazon Music, Apple Music, Deezer, Pandora, SoundCloud, or Tidal), there are alternative methods of hosting and streaming music that give users the ability to download media files locally to client devices 110, and the control to manage their own media selections without arbitrary removal and addition of content by DSPs. A number of streaming server software solutions exist that allow users to host and manage their own audio/video content for streaming, including but not limited to Airsonic, Ampache, Funkwhale, Libresonic, Madsonic, Mopidy, PlayOn, Plex, Serviio, Subsonic. The present invention broadly covers any method of digital media streaming methods, content sources, and content providers, whereby the media content may be sourced from at least one content source or provider, as identified by a unique identifier 1312.

Finally, the system and method according to the present invention may include the playback of the resulting video compilation 131 "alongside" an audio track 1310 (whether in part or in whole). The term "alongside" means that the video content and audio content are played together either (a) at the same time (synchronously or nearly synchronously, for practical purposes); or (b) with a time offset between them.

Current technology cannot guarantee perfect synchronization of two content streams to the nanosecond, and the present invention recognizes that real-world conditions might produce slight time offsets. A time offset is generally minimal and can be intentional or unintentional. Additionally, a remote service system 120 may programmatically employ a discretionary time offset for any number of reasons, usually as a means for optimizing synchronization of the audio and/or video playback. For example, a remote service system 120 may implement a time offset to correct for synchronization issues caused by bandwidth or latency issues relating to buffering of the content during playback. Or, an unintentional time offset may occur where there are differences between one digital recording of an audio track 1310 compared to another.

II. How to Associate a User's Video with an Audio Track Section

There are basically three ways, according to the system and method of the present invention, to associate a user's video content 132 with an audio track 1310 section: (a) The user selects, via the client 110, a start time and an end time of a section of a select audio track 1310 (the audiovisual set range 139 along the audio timeline 138); (b) At least one member of the solution stack 100 identifies an audio track 1310 and the corresponding start time and end time (audiovisual set range 139) of a section of that audio track 1310, that is embedded or otherwise associated with a user's uploaded video fragment 132; or (c) The remote service system 120 identifies at least one section of an audio track 1310 that matches a user's selected metadata criteria, and then determines a start time and end time (audiovisual set range 139) for that matching audio track 1310 section.

A. User Selects Start Time and End Time of Select Audio Track

First, according to the preferred embodiment, the user generates a video fragment 132 on the client 110, either by recording a video 132 using the video camera on the client device 110 or by selecting a saved video 132 from the client device 110, and then selects an audio track 1310 to play alongside the user's video 132. In the preferred embodiment, the user may select a start time and an end time for the video content as at 134 as well as a start time and an end time for the audio content as at 139. The user may, but does not necessarily, select the audio track range 139 (the start time and end time of the audio track 1310) 139 while the audio track 1310 plays alongside the playback of the user's video 132 on the client 110.

The client 110 stores metadata 135 related to user selections for the video content 132 and metadata 1311 for the audio content 137, including but not limited to track timeline selections (start time, end time), so that it may be transmitted to the remote service system 120 alongside the video content 132. Once the client 110 transmits ("uploads") the video, with metadata 135 reflecting the user's sections, to the remote service system 120, the remote service system 120 may store the video metadata 135 in a database 121 and the video content 132 may be stored in an object storage container system (in a "bucket" or "buckets") 122 or another type of file storage system.

Figure 2:
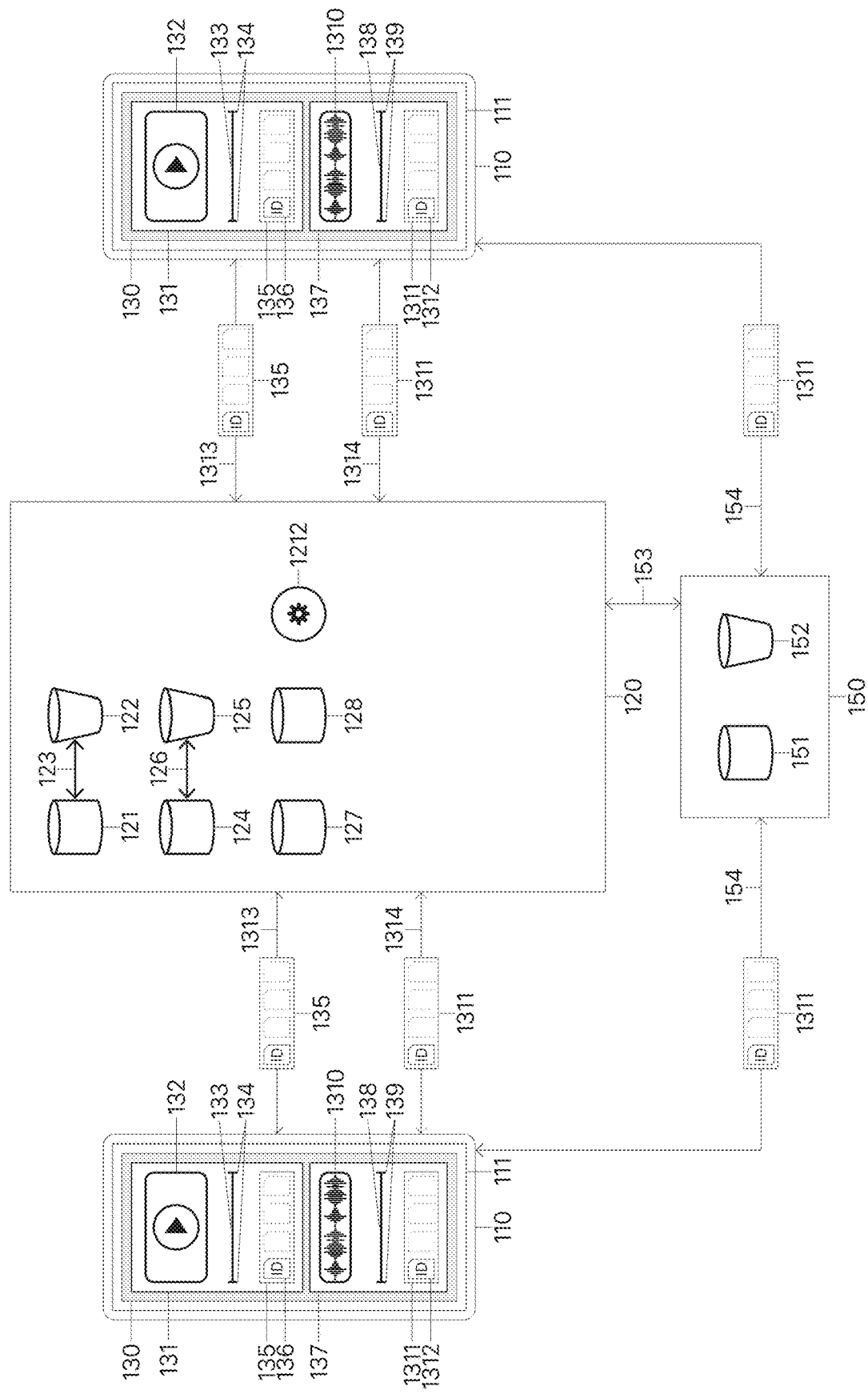
FIG. 2 is a flowchart diagram that illustrates the method by which at least one user-generated video is generated alongside at least one abstracted audio track via the client, and the client transmits unique identifiers for the video and audio content to the remote service system such that a resulting video compilation is played alongside the audio track, whereby the audio track is sourced from the remote service system or another audio source.

It should be noted that FIG. 2 is presented as a subset of the solution stack 100 illustrated in FIG. 1, with several subcomponents of the remote service system 120 obscured from view in FIG. 2 to aid with visual clarity in the following example. FIG. 2 represents a method for handling elements of an audiovisual set 130 in which at least one user-generated video 132 is generated alongside at least one abstracted audio track 1310, which is not embedded within a video file 132, via the client user interface 111. The client 110 preferably transmits 1313 to the remote service system 120 at least one member of an audiovisual set 130 related to video content as in 131, including video metadata 135, preferably at least one video unique identifier 136, or video files (e.g. fragments) 132 for the video content.

The client 110 also preferably transmits 1314 to the remote service system 120 at least one member of an audiovisual set 130 related to audio content as in 137, including audio metadata 1311, preferably at least one audio unique identifier 1312 for the audio track 1310. As defined in the "solution stack" 100 and "remote service system" 120 terms, the present invention contemplates any form or sequence of transmission to and from the client 110 and the remote service system 120. Therefore, the contents of the transmission 1314 of the audio-related subcomponents may be transmitted together, as part of, or in connection with the aforementioned transmission 1313 of video-related subcomponents instead of as a discrete, separate transmission.

Separate transmissions 1313, 1314 for video-related subcomponents and audio-related subcomponents, respectively, are depicted in FIG. 2 for the purpose of illustration.

Storage and retrieval of files and information related to audiovisual sets 130 may be managed by the remote service system 120 or by the client 110. Preferably, relationships between elements of any part of audiovisual sets 130 are maintained by the solution stack 100 through the use of any combination of video unique identifiers 136, audio unique identifiers 1312, database 121, 124 records, and object storage system 122, 125 objects. Video files 132 may be stored in one or more object storage systems 122. Video metadata 135, including video unique identifiers 136, may be stored in one or more databases 121.

The present figure illustrates a scenario in which audio content 137 is abstracted from video content files 131 (not embedded within, as audio tracks); therefore, this process does not result in the storage of audio waveform data 1310 in an object storage system 125. However, a list or "library" (preferably contained within an audio content database 124) of audio content 137, 125 may be accessible to a user in such a scenario for the purposes of playback alongside the video compilation 131. Audio metadata 1311, including audio unique identifiers 1312, may be stored in one or more audio content databases 124 and used to match the audio content 137 to known audio tracks 1310, with relationships preferably stored in at least one audio content database 124. Elements of the solution stack 100, but preferably the remote service system 120, may interact as at 153 with another content source 150 (e.g. third-party "audio provider") in order to obtain metadata that may be used in a process for matching the user-selected audio content 137 with at least one audio track 1310 known to at least one audio provider 150.

Figure 8:
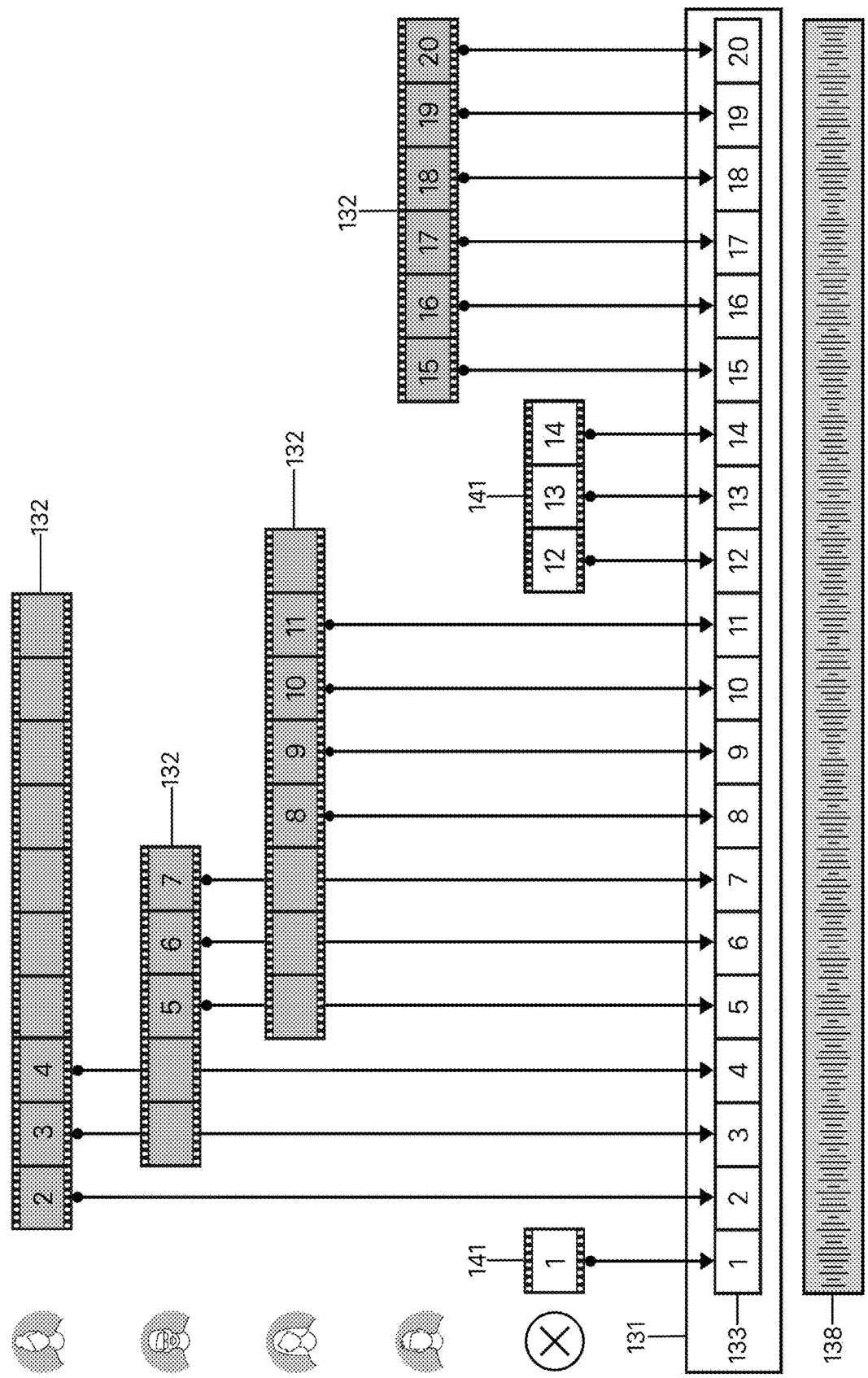
FIG. 8 is a diagram depicting video fragments and filler content that are compiled along a video timeline into a video compilation that plays alongside an audio track.

The remote service system 120 may compile a video 132 into a video compilation 131 using programmatic means ("process") 1212 as further described and referenced in FIGS. 8 and 12. A video compilation 131 comprising the user's selected video content 132 may thereafter be made available to users through a client 110 by the remote service system 120 or other elements within the solution stack 100.

The preferred embodiment of the video compilation 131 includes at least one of the following: at least one video fragment 132; a video timeline 133; audiovisual set range(s) 134 (start time(s) and end time(s)) along the video timeline 133); and video metadata 135 (including a video unique identifier 136, duration, and bitrate), with the video compilation 131 to play alongside at least one matched audio track 1310 that can be preferably sourced from at least one audio provider 150.

To represent the video compilation 131 within the solution stack 100, the remote service system 120 may generate at least one set of video unique identifiers 136 and video metadata 135 and, preferably, at least one set of audio unique identifiers 1312 and audio metadata 1311 that altogether represent an abstracted reference for the video compilation 131, which the client 110 may use for accessing at least one media file 132, 1310 as part of the video compilation 131.

The remote service system 120 may transmit 1313, 1314 elements of the audiovisual set 130, including the video compilation's unique identifier 136, metadata 135, and at least one video file or fragment 132. The remote service system 120 also may transmit 1314 at least one audio unique identifier 1312 and other metadata 1311, to the client 110. The remote service system 120 may transmit 1313, 1314 elements of the audiovisual set 130 in response to at least one request 1313, 1314 by a client 110 or as sent 1313, 1314 opportunistically to the client 110.

The client 110 may utilize the provided unique identifier 1312 and other metadata 1311 for the audio content, to form and transmit as at 154 a request to an audio provider 150 by including in the request at least one audio unique identifier 1312 for at least one audio track 1310. Preferably, the audio provider 150 may provide access to an audio library 151, 152 to which the user may have licensed access. The client 110 may then obtain 154 from the audio provider 150 at least one response for audio track metadata 1311 and audio content 137 (e.g. audio file). The audio provider 150 may utilize a database 151 and an object storage system 152 to manage the relationships of unique identifiers 1312 and metadata 1311 to audio track data 137.

It should be noted that the audio provider 150 may be either local or remote to the client 110. For example, the audio data file 1310 may be available in an already-downloaded storage area ("cache") provided by a DSP. A software development kit ("SDK") or application programmatic interface ("API") may then supply the file 1310 from a cache on the client device 110. In such a case, the audio provider 150 is local to the client 110.

The client 110 may then render at least one video compilation 131 comprising at least one user-generated video 132 and at least one audio track 1310. In rendering the video compilation 131, the client 110 may utilize any combination of video metadata 135, video file data 132, audio metadata 1311, or audio track content or file data 1310 to synchronize or otherwise align the playback of the video content 132 and the audio track content 1310.

Composite FIG. 3 illustrates an example user interface 111 of a mobile application, whereby a user may upload a video fragment 132 and thereafter designate a start time and an end time to correspond with a section of an audio track that will play alongside the video. The user performs the following steps: (1) The user selects an option to create content, as at 310 (FIG. 3A); (2) The user is presented with a camera screen (FIG. 3B) that allows the user to either record, by holding down a record button 320, a video with the video camera, or to upload an existing, pre-recorded video clip by browsing the user's saved content ("camera roll"), by selecting the camera roll icon 321 on that screen; (3) The user selects a video from the camera roll, as at 330 (FIG. 3C); (4) The user confirms the video selection, by, for example, selecting "Choose" at 340 (FIG. 3D); (5) The user is presented with various options, represented by action buttons in the user interface 111, to adjust the speed of the audio track section 350, select another audio track 351, or remove the song from being associated with the video content 352; as well as options to adjust the start time of the video content 354 using the video scrubber tool 356 or adjust the start time of the the audio track 355 using the audio scrubber tool 353 (FIG. 3E); and (6) After making any adjustments to the song selection (FIG. 3F) and/or the speed of playback (FIG. 3G), and selecting the start times for both the video and the audio track section, the user confirms the post, as at 380 (FIG. 3H). The remote service system 120 identifies any video associated with a musical composition that is posted publicly as a potential submission to the "Song Story" video compilation 140.

Figure 3A:
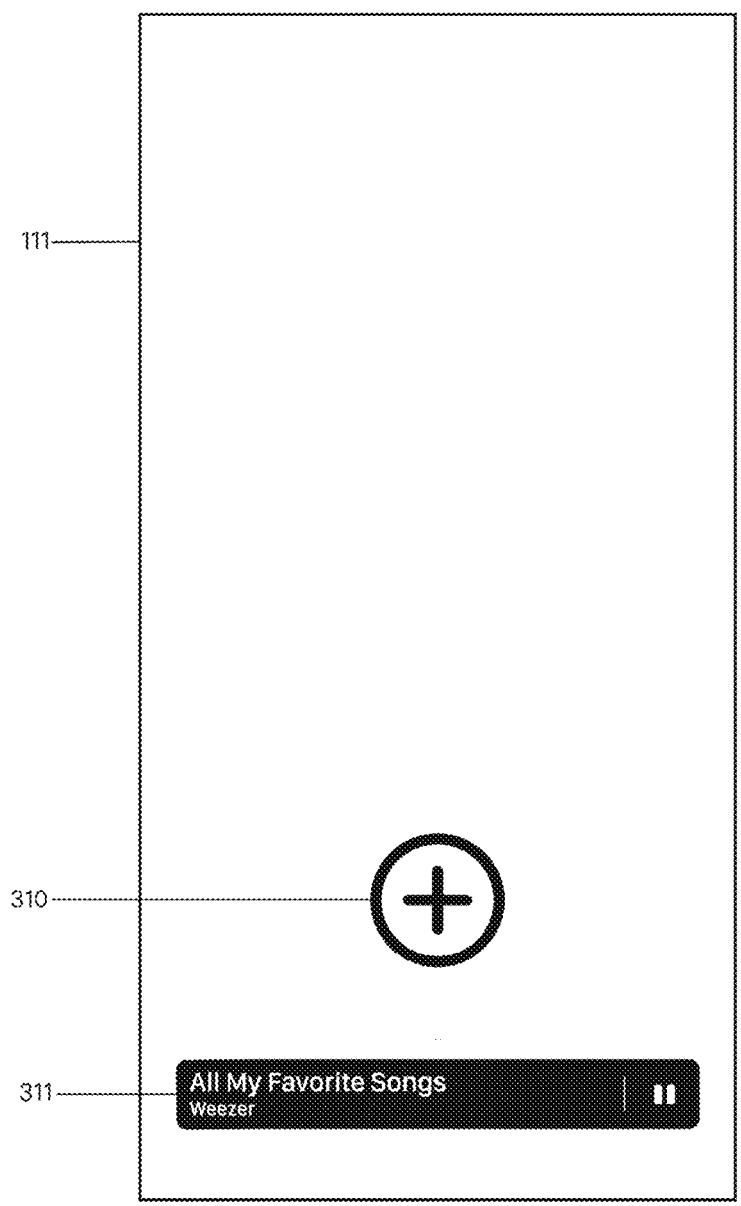
FIG. 3A is an example screen of an application showing how a user initiates a function to create content.
Figure 3B:
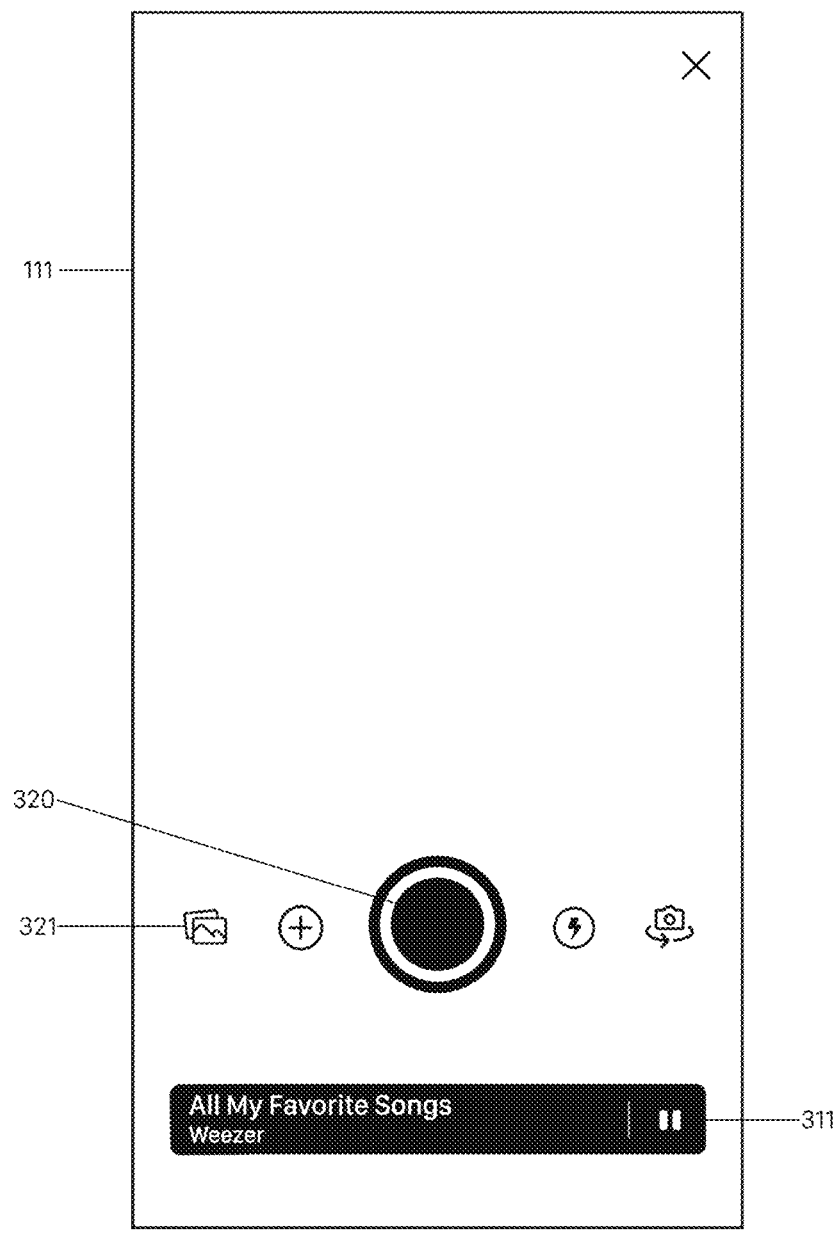
FIG. 3B is an example screen of an application showing how a user selects an option to upload content from the user's saved videos.
Figure 3C:
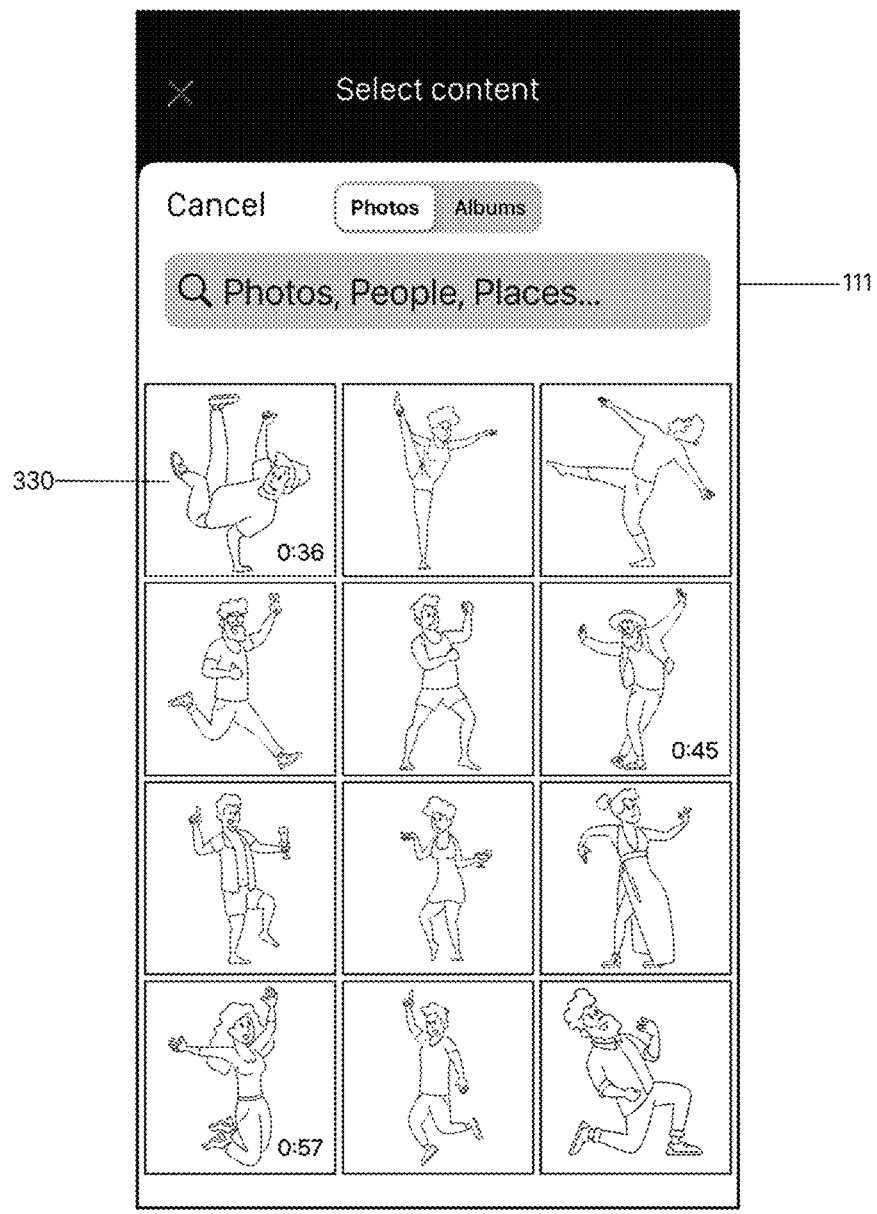
FIG. 3C is an example screen of an application showing how a user selects a video from the user's saved photos and videos.
Figure 3D:
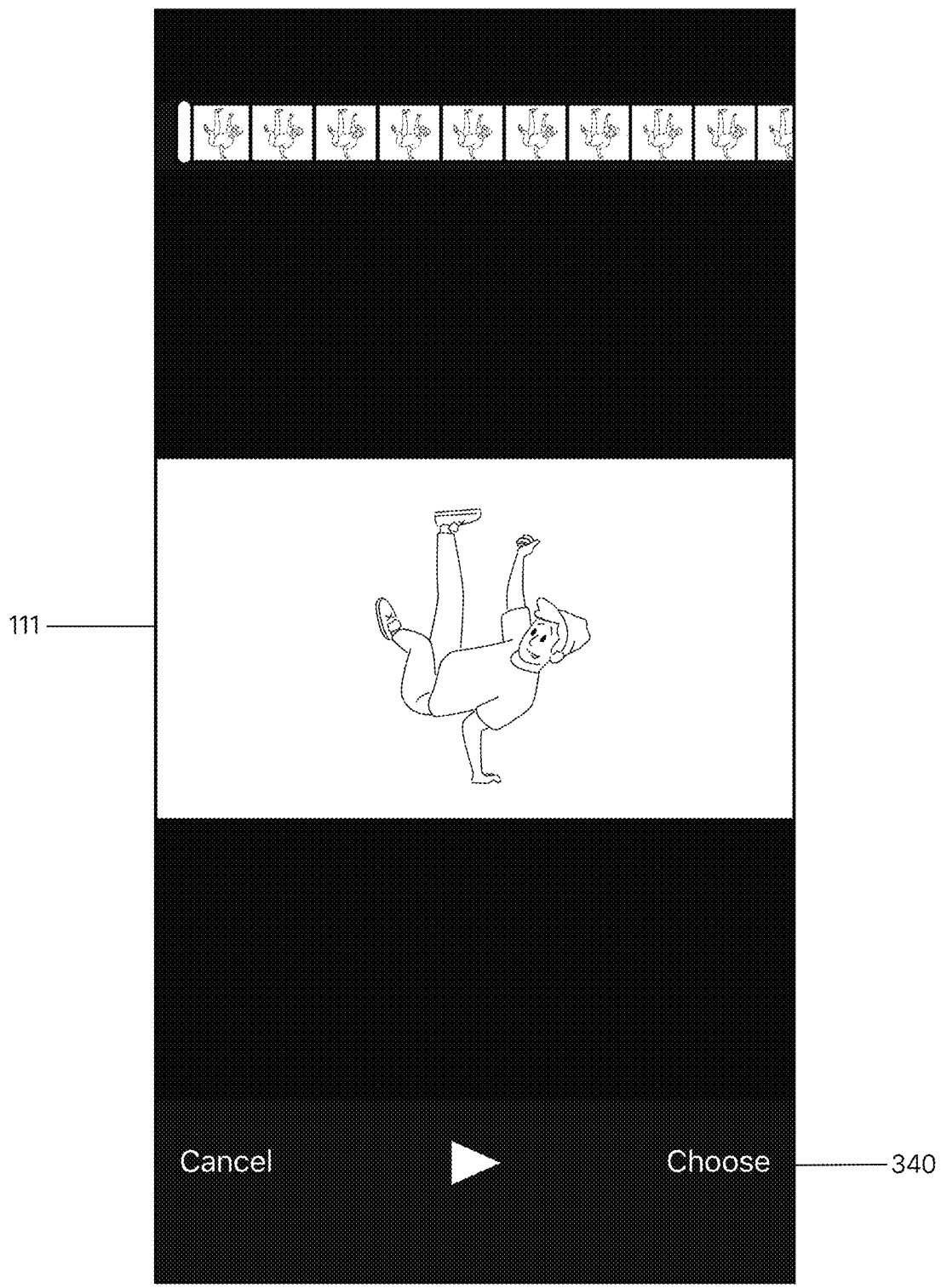
FIG. 3D is an example screen of an application showing how a user confirms a video selected from the user's saved photos and videos.
Figure 3E:
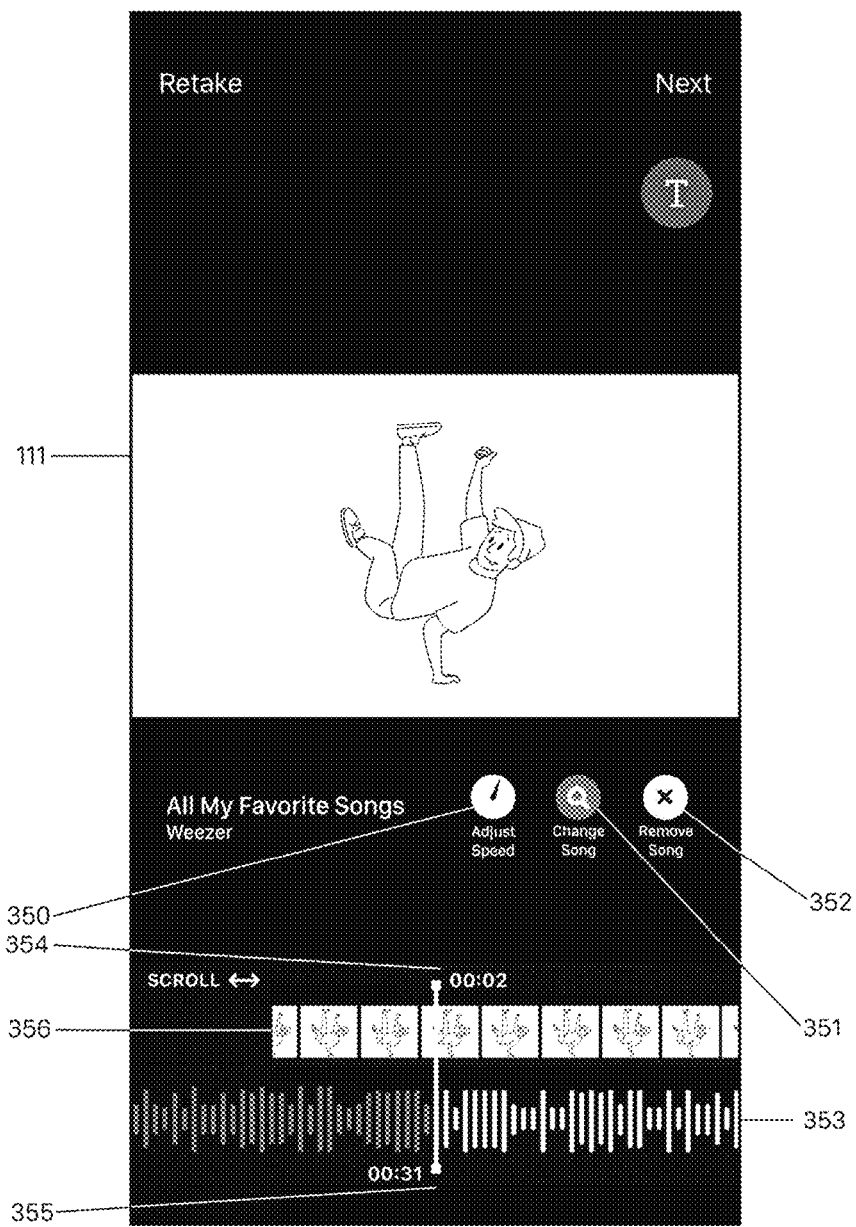
FIG. 3E is an example screen of an application showing how a user selects start times for the user's selected video and audio content using a scrubber tool, and selects other options related to the audio track associated with the video.
Figure 3F:
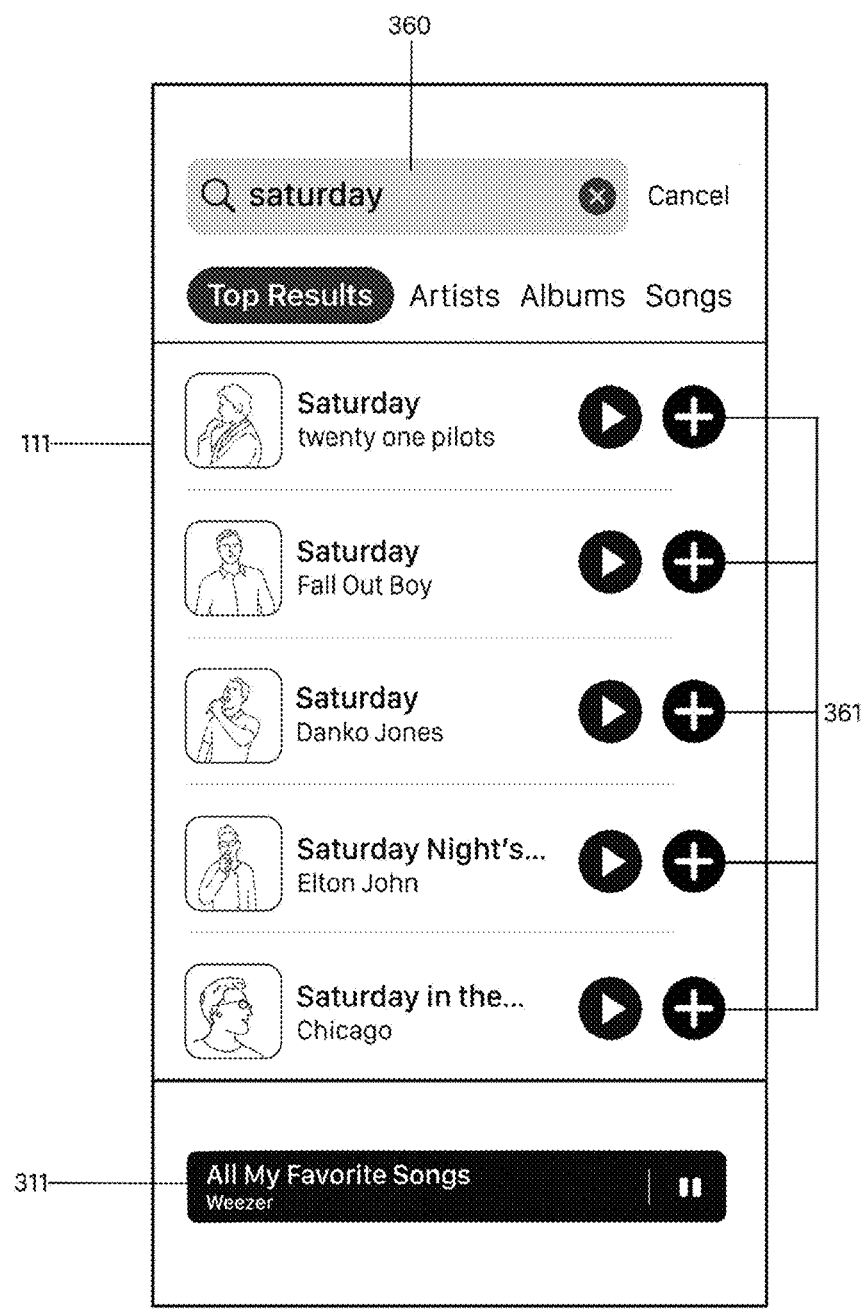
FIG. 3F is an example screen of an application showing how a user searches for a new audio track to associate with the user's selected video.

In this example, the mobile application includes a music player bar 311 at the bottom of the user's screen, and any song playing at the time the user adds the video content can serve as the context-providing audio track 1310 for that video clip (FIG. 3E). In the example as depicted, the user has loaded Weezer's "All My Favorite Songs" in the music player, so that track is displayed in the music player bar 311 and also serves as the default audio content to be associated with the user's video. A music player is not a necessary component to the embodiment, however, and a user can be prompted to add a context-providing audio track 1310 at other steps in the process. Certain applications may present a user with an option to add a context-providing audio track 1310 after the video fragment 132 is generated. In FIG. 3E, the user may select a new audio track 1310 by selecting the "Change Song" option 351 and searching for different audio tracks (FIG. 3F). The user enters search terms in the search box 360 and then selects an audio track 1310 title from the list of results by clicking any of the add buttons 361.

Figure 3G:
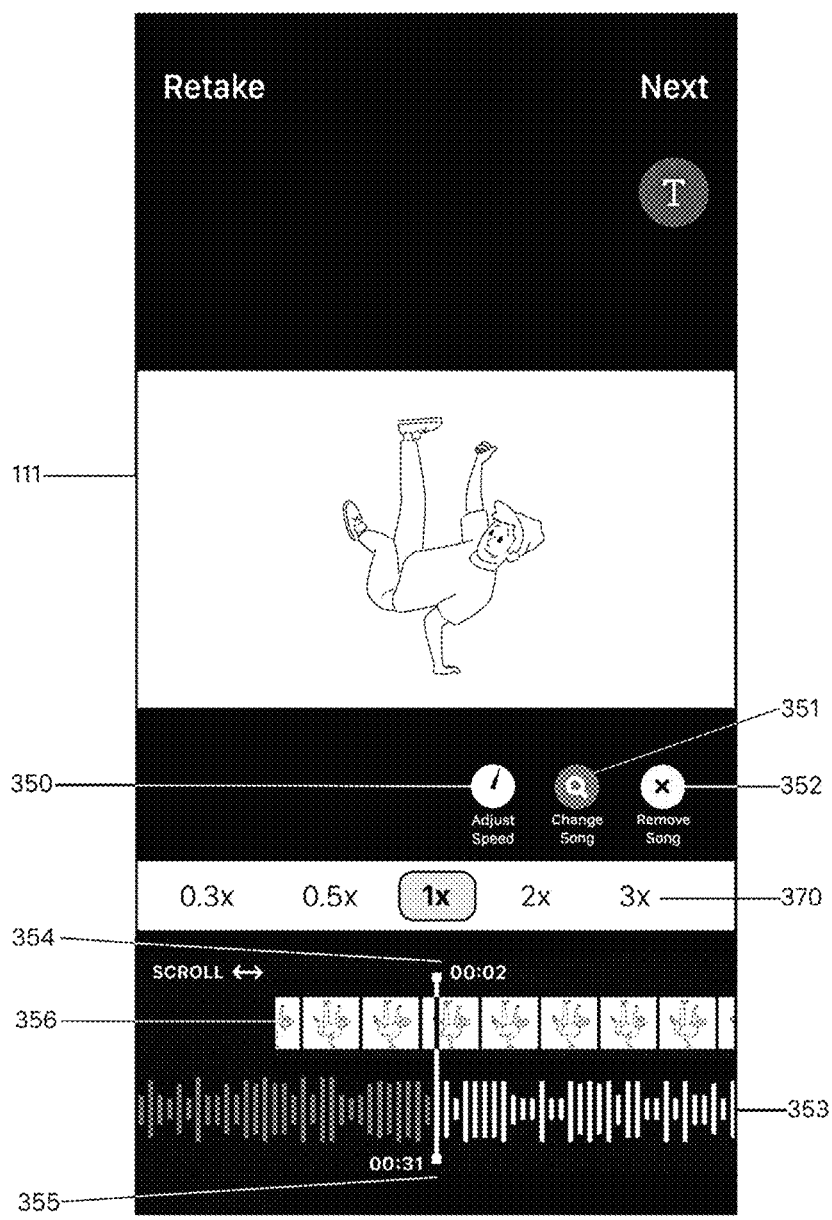
FIG. 3G is an example screen of an application showing how a user adjusts the playback speed for the user's selected audio track section.
Figure 3H:
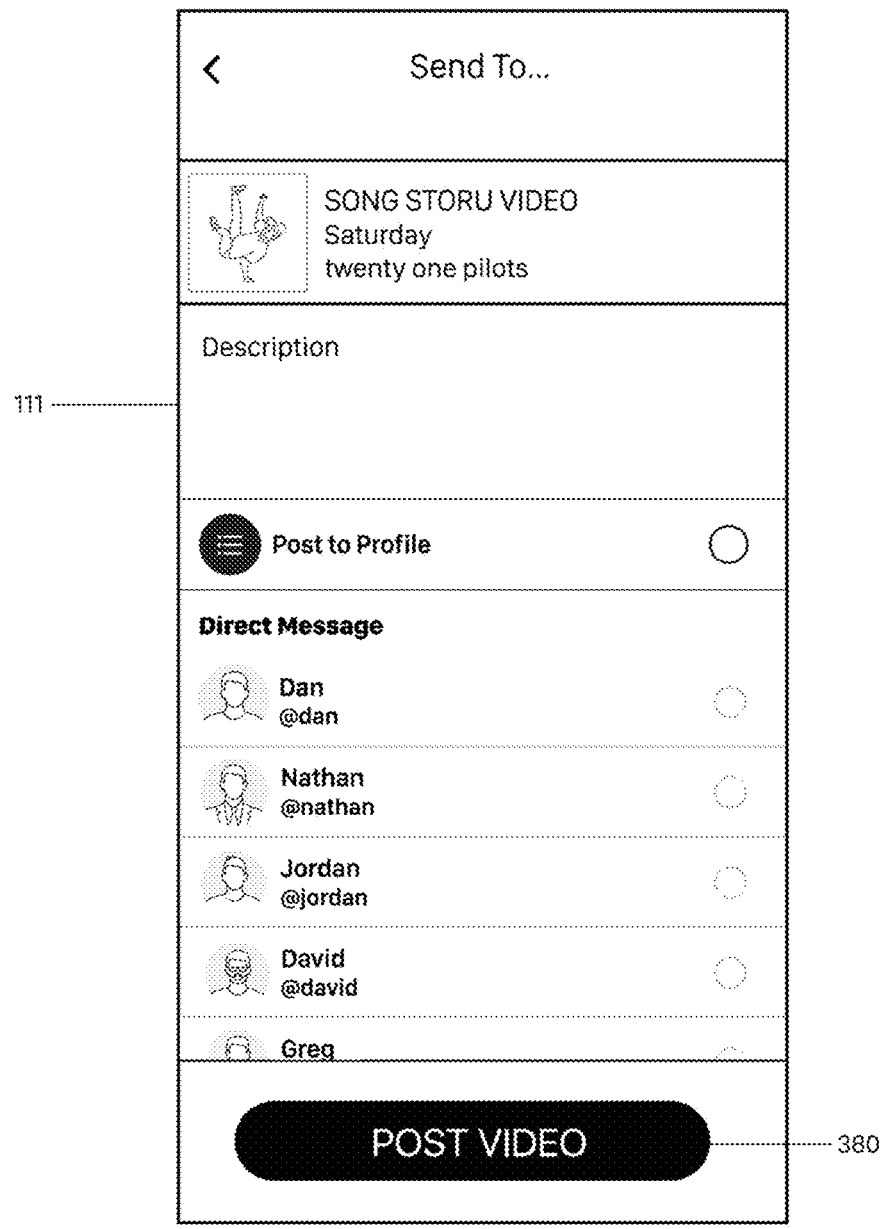
FIG. 3H is an example screen of an application showing how a user confirms the user's video and audio content selections that will comprise a compilation.

FIG. 3G further illustrates an example user interface 111, wherein a user can select, as at 350, an alternative speed of playback for the section of the audio track 1310 associated with a video fragment 132. When a user selects the option to change the speed of the song, as at 350, the user is presented with a speed option bar 370 that displays various alternative speeds of playback. The default option is set at 1× (100%), but the user can opt to play the song, for example, at 0.3× (30%) or 0.5× (50%) of the normal speed to create a slow-motion version of the audio track section, or at 2× (200%) or 3× (300%) of the normal speed to create a sped-up version.

While not depicted in FIG. 3G, the remote service system 120 may also provide an option for the video content 132 to be played at an alternative speed. When the user selects an alternative speed for audio playback associated with the video 132, the remote service system 120 can adjust that portion of the audio track 1310 to account for the user's selection when the video compilation 131 is played. In such an embodiment, the entire compilation 131 is played back at normal speed except during any video fragments 132 where an alternative speed of playback was selected, at which points the audio track 1310 is adjusted to match the user's selected playback speed.

As illustrated in FIG. 3E, the remote service system 120 in this embodiment presents the user with a digital video scrubbing tool 356 and digital audio scrubbing tool 353 (sometimes collectively and individually referred to as a "scrubber" herein). As depicted in FIG. 3E, the two scrubber tools 356, 353 are presented together with one bar, so as to align the start time 354 for the video content with the start time 355 for the audio content. The act of "scrubbing" refers to an interaction in which a user drags a cursor or playhead across a segment of a video timeline or an audio waveform to consume either video or audio, respectively. Thus, scrubbing provides a means for a user to quickly navigate a media track, and is a common feature of media editing software. In the example provided in FIG. 3E, the user can scroll back and forth across the video scrubber tool 356 (which may be thought of, for purposes of the user interface 111, as a graphical representation for the video timeline 133) and/or the audio scrubber tool 353 (a graphical representation for the audio timeline 138). By adjusting the video scrubber 356 and audio scrubber 353, the user can align a start time 354 for the short-form video with the start time 355 for the audio track section. The start times for the video and audio content are graphically represented 354, 355 in this example user interface 111 at the ends of the scrubber bar. The user's selections create an audiovisual set range 134 along the video timeline 133 and an audiovisual set range 139 along the audio timeline 138. Thus, the user can select, for example, the video to begin playing at 0:02 seconds from the start of the video, as depicted at 354, and a corresponding song to begin playing at 0:31 from the start of the song, as depicted at 355, with both playing alongside one another at 0:00 of the resulting audiovisual set range 1301.

While not depicted in FIG. 3E, the end time for the video and/or audio content can also be determined based on the user's manual selection for an end time of the video, using the scrubber tool 356 or otherwise, and the end time for the audio track section is programmatically determined based on the duration of the video. That is, a user can edit the video the stop playing at, for example, 0:62 from the start of the raw video; and the client 110 or the remote service system 120 calculates the end time for the corresponding audio track content to stop playing at 0:31 plus 0:60, or 0:91 from the start of the song, such that the total duration of the edited video is 60 seconds long.

Various other methods for selecting a start time and end time for a video and/or an audio track section may be employed, and the present invention is not limited to the use of scrubber tools 353, 356. In another example embodiment, a user may manually input a start time and end time for the video (e.g., 0:30 and 0:60) and a start time for the audio track section (e.g. 0:45), and the client 110 or remote service system 120 determines the end time of the audio track section (e.g. 1:15).

Figure 4:
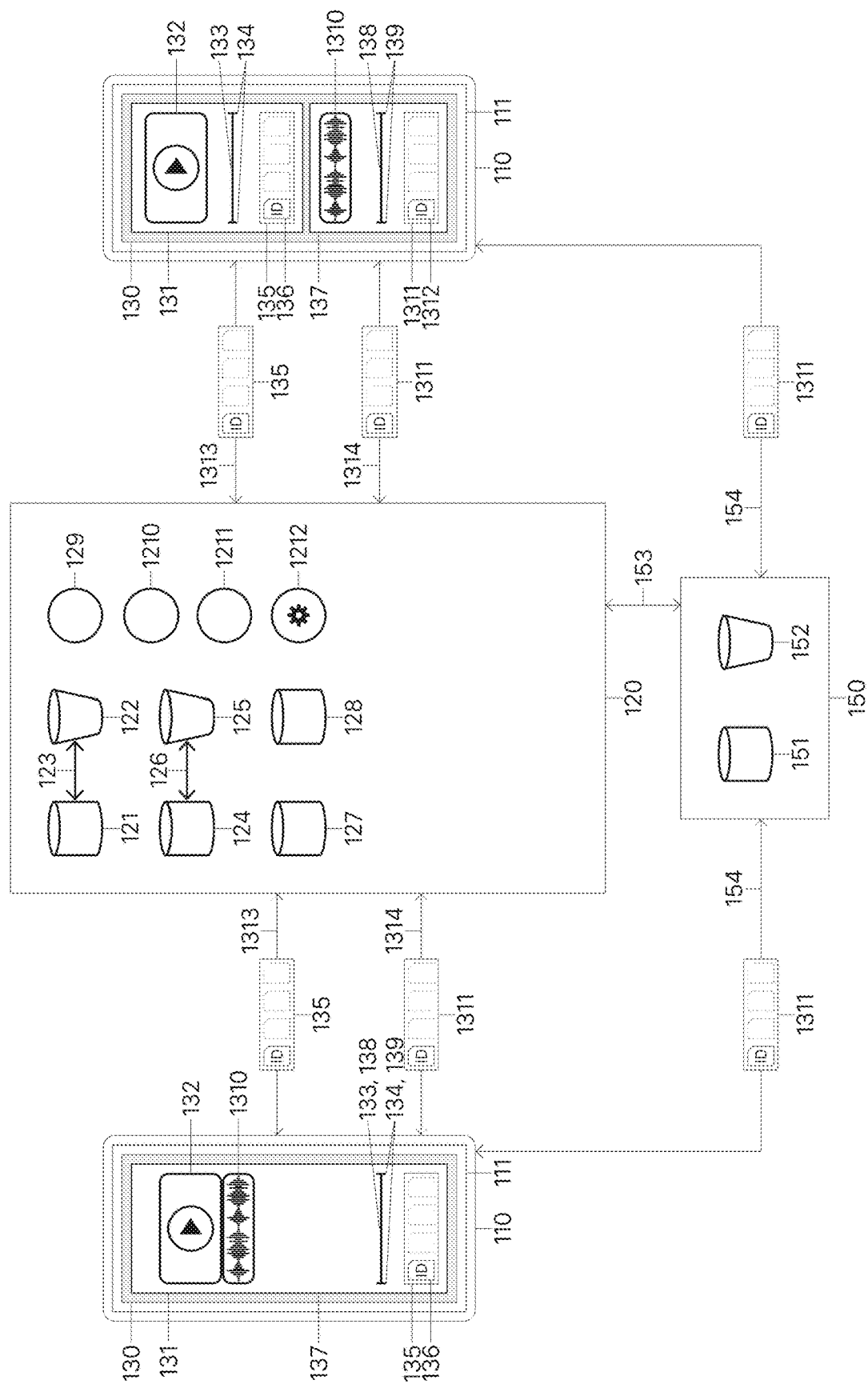
FIG. 4 is a flowchart diagram of an audio identification system contained within a remote service system, depicting the generation of at least one user-generated video with embedded audio content, and the audio content thereafter identified with a unique identifier such that a resulting video compilation containing that user-generated video plays alongside at least one abstracted audio track sourced from the remote service system or another audio source.

B. Solution Stack Identified Audio Track and a Start Time and End Time of the Audio Track Section Another method for associating a user's video 132 with an audio track section 1310 is illustrated in FIG. 4. In such an embodiment, the remote service system 120 may operate to identify an audio track 1310 that will be associated with a user's uploaded video 132. Such an embodiment is required when a user uploads a video that contains a section of an audio track 1310 that is embedded or otherwise associated with it. For example, a user may upload a pre-recorded video that features a song playing from a radio in the background. In such case, the remote service system 120 may (a) extract the audio content of the video; (b) employ at least one audio recognition or audio identification algorithm to identify at least one audio track; (c) associate the audio tracks with a unique identifier; and/or (d) determine the start time and end time for any sections of any audio tracks featured in the video.

At least one member of the solution stack 100 may employ any variety of algorithms for identifying or recognizing the audio track content associated with the video. Alternatively, the remote service system 120 may utilize an external service or application that employs an algorithm for performing audio identification and/or audio recognition.

Once the remote service system 120 identifies the section of the audio track 1310 featured in the user's video, the system determines the start time and end time of that section corresponding with the start time and end time of the video. The original audio track of the user's video, as initially uploaded or generated by the client 110, is preferably removed upon its inclusion in the video compilation 131, and the playback of the audio content 137 is instead preferably sourced to each respective client 110 from at least one content provider, as discussed in more detail in United States Patent Application Publication No. 2014/0164563, authored by Leekley et al. and United States Patent Application Publication No. 2017/0041280, authored by Savenok et al. as prefaced hereinabove.

FIG. 4 represents a process in which user-generated video 132 and audio data 1310 that may be embedded within a video file 132 are presented to the solution stack 100 for matching of audio data, which may be known or recognizable to another member of the solution stack 100 or to another external component, database, or service.

The video fragment 132 may be generated by the user, either by recording a video using the video camera on a client 110 or by selecting a video fragment 132 previously saved to a client device 110. The video fragment 132 which may include audio data in at least one embedded audio track, is transmitted 1313 to a remote service system 120 along with other video metadata 135. Audio metadata 1311, including any audio unique identifiers 1312 created for or obtained from the audio track 1310, may be stored as part of or alongside the video metadata 135 given that the audio track 1310 is embedded in the video file 132. Alternatively, audio metadata 1311 may be transmitted separately 1314 from the video metadata 135, especially in a configuration where a client 110 may analyze embedded audio data 1310 and potentially generate audio metadata 1311 before, during, or after transmitting 1313 video-based audiovisual set 130 data to the remote service system 120.

Video files 132 provided by at least one client 110 may be stored within and managed by the remote service system 120. The remote service system 120 may utilize a video database 121 and a video object storage system 122 to manage 123 relationships of video unique identifiers 136 and/or video metadata 135 to video files 132 as well as relationships to other audio data 1310 or audio metadata 1311, which may be stored in the same video database 121 or object storage system 122 or a separate audio database 124 or a separate audio object storage system 125 as may also be managed 126 by or in conjunction with other components of the remote service system 120.

The solution stack 100 may employ various forms of audio storage, analysis, or identification techniques. Audio data 1310 extracted from video files 132 provided by at least one client 110 may be stored within and managed by the remote service system 120, which, as referenced above, may utilize an audio database 124 and an audio object storage system 125 to manage 126 the relationships of audio unique identifiers 1312 and/or audio metadata 1311 to audio content or files 137. Optionally, as referenced above, the client 110 may provide a process to analyze audio data 1310 (e.g. waveform analysis) and transmit 1314 results of analysis and/or audio metadata 1311, and/or audio data 1310 to the remote service system 120.

The present invention preferably includes at least one methodology for identifying audio content (that is, recognizing audio content and matching audio content against known audio files). These methods include but not are not limited to file signature matching (hash function) 129, metadata-based matching 1210, and fingerprint (waveform) matching 1211.

The remote service system 120 includes at least one methodology for identifying audio content 137, including but not limited to file signature matching (hash function) 129, metadata-based matching 1210, and fingerprint (waveform) matching 1211. The process of identification may succeed or fail to properly match audio data extracted from an audio track 1310 of a video file 132. An audio unique identifier 1312 may be assigned to audio data 1310 and stored within an audio database 125 so that it may be referenced in conjunction with or apart from video data 132.

If the audio identification components of the remote service system 120, including but not limited to 121, 122, 124, 129, 1210, 1211, successfully match audio content 137 to at least one known audio track 1310, it may assign at least one relationship between the audio content 137 and the known audio track(s) 1310. Metadata emanating from audio processing or analysis, may be stored in an audio database 124 or audio object storage system 125. Before, during, or after transmission 1313 of a video compilation 131 to a client 110, the solution stack 100 may employ a process 1212 on the video file 132 to remove or otherwise filter or modify audio data 1311, which was included in the user-generated content.

A library of audio track 1310 files accessible to the user through a client 110 or to the remote service system 120 may have been previously stored by the remote service system 120 in an audio object storage system 125 with the remote service system 120 managing 126 the relationships thereof, especially through the use of audio unique identifiers 1312.

As a response to a request by a client 110 or as sent 1313 opportunistically to the client 110, the remote service system 120 may transmit 1313 the video compilation's 131 unique identifier(s) 136, 1312 and other elements of the audiovisual set 130, including metadata 135, 1311, and video file(s) or fragment(s) 132. The remote service system 120 also may transmit 1313 at least one audio unique identifier 1312 and audio metadata 1311 to the client 110.

The client 110 may utilize the provided audio unique identifier(s) 1312 and audio metadata 1311 to form and transmit as at 154 a request to an audio provider 150 by including in the request at least one audio unique identifier 1312 for at least one audio track 1310. Preferably, the audio provider 150 may provide access to an audio library to which the user may have licensed access. The client 110 may then obtain 154 from the audio provider 150 its response(s) for audio track metadata 1311 and audio content 1310 (e.g. audio file). The present invention contemplates that an audio provider 150 may utilize a database 151 and an object storage system 152 to manage the relationships of unique identifiers 1312 and metadata 1311 to audio track content and files 1310.

It should be noted that the audio provider 150 may be either local or remote to the client 110. For example, the audio data file 1310 may be available in an already-downloaded storage area ("cache") provided by a DSP. Other systems or software available to the client 110, such as an SDK, may then supply the file from a cache on the client 110. In such a case, the audio provider 150 may be considered to be local to the client 110.

The client 110 may then render in the user interface 111 at least one video compilation 131 comprising at least one user-generated video 132 or audio track 1310. In rendering the video compilation 131, the client 110 may utilize any member of the audiovisual set 130, including video metadata 135, video file data 132, audio metadata 1311 and/or audio data 1310, or other synchronization data transmitted 1313, 1314 by the remote service system 120 to synchronize or otherwise align the playback of the video content 132 and the audio track content 137.

Figure 5:
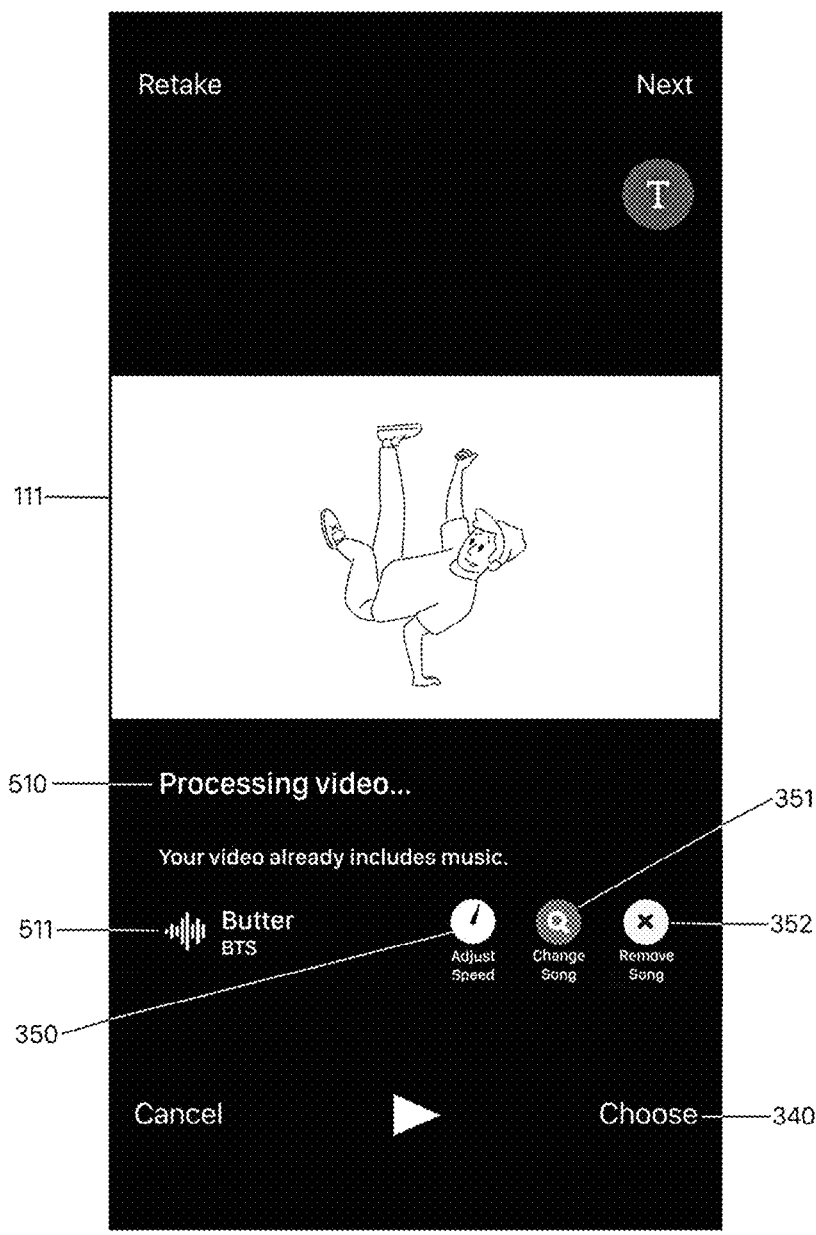
FIG. 5 is an example screen of an application showing how a user is notified that the user's selected video has audio content that matches an identified audio track.

FIG. 5 illustrates an example user interface 111 of a mobile application, whereby a user may upload a video that contains audio content, and at least one member of the solution stack 100 thereafter identifies at least one audio track and section of the audio track associated with the uploaded video. To generate content, the user first performs the same first four steps as depicted in the first four screens of Composite FIG. 3: (1) The user selects an option to create content, as at 310 (FIG. 3A); (2) The user is presented with a camera screen (FIG. 3B that allows the user to either record a video, by pressing the record button 320 and utilizing the video camera on the mobile device or to select an option for uploading an existing, pre-recorded video clip 132 by selecting the camera roll icon 321; (3) The user selects a video 132 from the camera roll, as at 330 (FIG. 3C); and (4) The user confirms the video selection 340.

Next, the remote service system 120 sends the client 110 a notification that it is processing the video, as at 510, and then at least one member of the solution stack 100 identifies the song and artist and displays the information to the client 110, as at 511. In the example user interface 111, the waveform icon 511 may appear while the solution stack 100 runs any audio recognition and audio identification programs.

When the solution stack 100 identifies the audio track 1310 featured in the uploaded video, the remote service system 120 sends a notification to the client 110 displaying the song name and artist name (e.g., "Butter" by BTS) as depicted at 511. If the user confirms that the uploaded video should be associated with the identified audio track 1310 by, for example, by selecting a "Choose" text link as at 340, then the user is presented with the video and audio scrubber tools 356, 353, as depicted in FIG. 3E, to make adjustments as needed. The audio scrubber tool 353 is pre-set to the start time of the audio track section identified by the solution stack 100. Thus, if the user's uploaded video 132 contains a section of a song beginning at 0:31, the audio scrubber 353 will be presented, initially, with a start time aligned to 0:31, as at 355.

Figure 9:
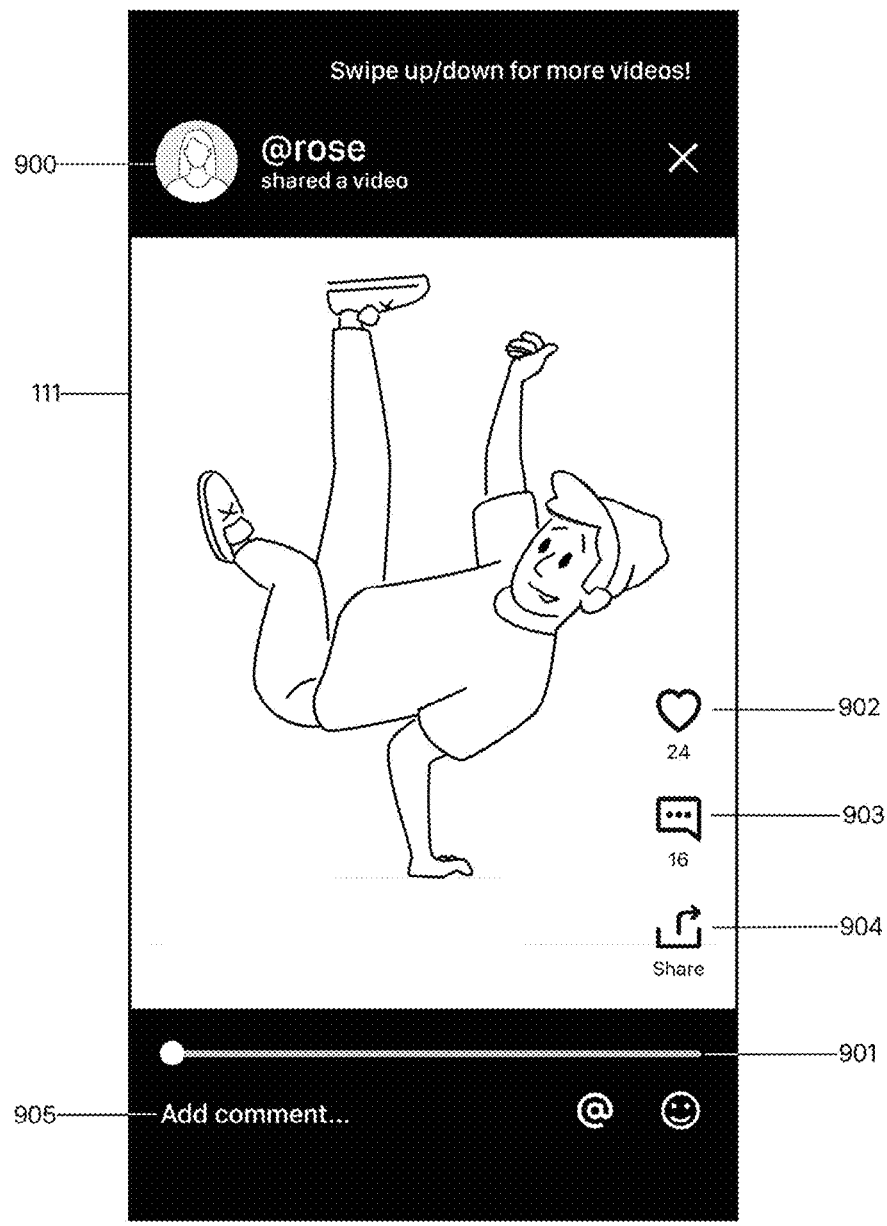
FIG. 9 is an example screen of an application showing a video compilation as a social post for users to view and provide social inputs.

It is important to note that the audio scrubber tool 353 is presented in this example because once the audio track 1310 is identified, the remote service system 120 will remove the original audio content such that the video fragment 132 will thereafter be associated with an abstracted audio track 1310 that will be played from a preferred source, both when the audiovisual set 130 (that is, the video fragment 132 with a section of the associated audio track 1310) is presented as a social post, as depicted at FIG. 9, and when it is played as part of the resulting video compilation 131. In other words, the user's video fragment 132 will be associated with a new audio track 1310; and thus, the user is able to make adjustments to the audio track range 139 before it is posted, as depicted by one end of the scrubber bar as at 355, using the audio scrubber tool 353.

When the audio track 1310 is identified, the user is also presented, in this example, with an option to remove the song altogether, as depicted in the user interface 111 by a "Remove Song" button at 352. Removing the song from the video removes the video from inclusion in the video compilation 131 associated with the identified audio track 1310. Alternatively, the user can also opt to change the song, as presented by a "Change Song" button at 351 and described in greater specificity with regard to FIG. 3F. That is, the user can associate the uploaded video with an audio track that is different from the identified audio track.

1. Audio Identification Methodologies

A variety of audio identification and audio recognition methodologies can be implemented in the present invention, independently or in conjunction with one another, including but not limited to: (1) File signature matching (hash function); (2) Metadata-based matching; and (3) Fingerprint (waveform) matching.

a. File Signature Matching (Hash Function)

If the audio content 137 of the user's uploaded video is presented to the solution stack 100 in the form of a separate audio file or track 1310, at least one member of the solution stack 100 may generate a unique file signature for the audio file by applying at least one algorithm or hash function (e.g., "Secure Hash Algorithm 2" or "SHA-256") to process the file and generate an alphanumeric string. The solution stack 100 may then compare the string of that audio file to that of other audio files known to the solution stack 100. Based on the result of this comparison, audio content 137 may be matched or unmatched to a known audio track 1310.

b. Metadata-Based Matching

At least one member of the solution stack 100 can parse the embedded text information ("metadata") associated with an audio file 1310 to determine the identity of the audio track 1310. For example, a media player may have an associated database, and the files contained within that database may have been tagged with descriptive text such as the song title. If an audio file 1310 in that database is opened with a text editor, for example, the header of each file can be displayed and searched. Various metadata fields (sometimes called "frames") have names like Artist, Song, Date, or Genre, to name a few. In WAV files, these terms are represented by four-character codes, e.g., IART for artist, ICRD for creation date. There is no single official metadata standard to which all audio software and hardware makers adhere, although there exists a popular informal container called ID3, which is most often associated with MP3s. In any event, various software solutions can be employed for viewing and parsing metadata. The solution stack 100 may then compare the metadata to that of other audio metadata known to the solution stack 100. Based on the result of this comparison, audio content 137 may be matched or unmatched to a known audio track 1310.

c. Fingerprint (Waveform) Matching

An audio fingerprint can be deterministically generated from audio content and then matched against similar items in a database that contains known audio content such as songs, musical compositions, or sound effects. Many audio fingerprinting techniques employ a time-frequency analysis of an audio signal to retrieve a pattern which is unique to the signal. An algorithm may take into account the timing and/or amplitude of the frequencies over a period of time within a song or musical composition. Certain methodologies may only take in the highest energy content, referred to as "peaks", within an audio content segment. That is, the fingerprints captured may only take in the highest frequency points within a given time frame and then the peak amplitude spots within those frequencies, thereby filtering out certain unnecessary parts of an audio track content segment like background noise and clearing up distortion.

Certain exemplary audio identification systems and methods are described in U.S. Pat. No. 8,589,171, authored by Savenok et al, U.S. Pat. No. 8,478,719, authored by Savenok et al., and U.S. Pat. No. 8,688,631, authored by Savenok et al., and are referenced herein as examples but are not limiting of the present invention. Other methodologies or systems for audio identification or audio recognition not described herein may also exist and can be incorporated by the remote service system 120 contemplated in this invention.

Figure 6:
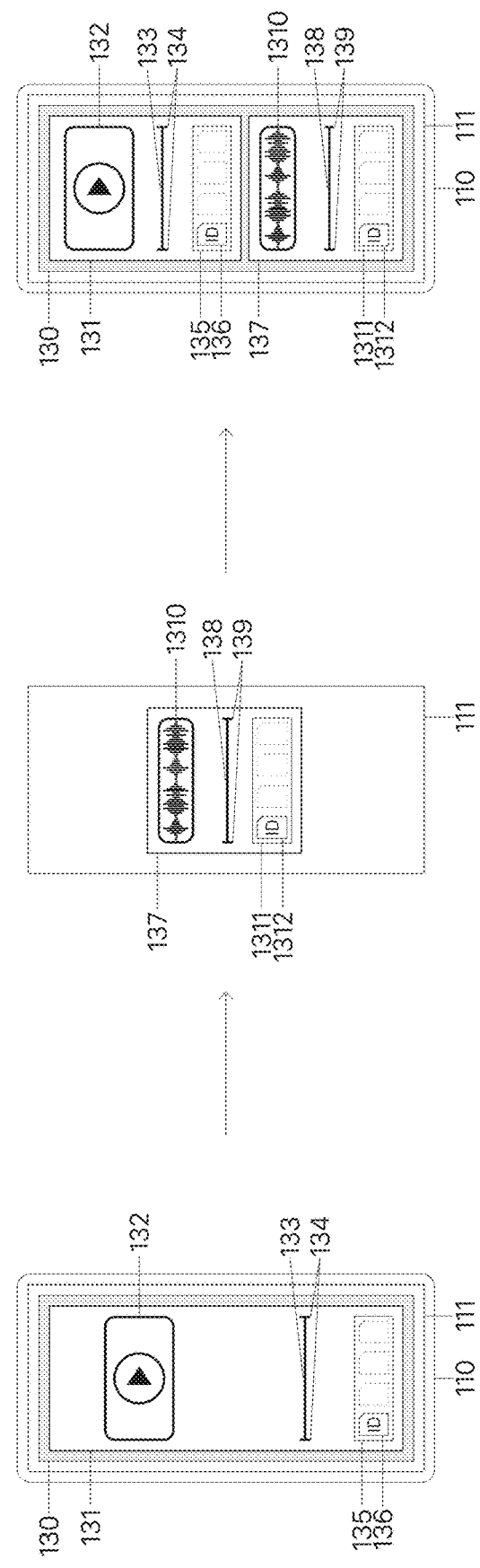
FIG. 6 is a flowchart diagram showing a process for generating a video fragment via a user interface, with the video fragment to be associated with an audio track, and the audio and video selections transmitted to the remote service system for compilation and playback to the client.

C. Solution Stack Associated the User's Video with an Audio Track Section Based on User's Selected Metadata Finally, a third method for associating a user's video 132 with an audio track 1310 section is illustrated in FIG. 6. In this embodiment, the system and method described herein is operable to allow a user to select metadata criteria to determine an audio track 1310 section that will be played alongside the video 132. That is, the user can create, generate, capture, upload, post, or other transmit a video fragment 132 at the client 110 without selecting a start time or end time for the audio track 1310 section to be associated with the video 132 and/or without having an audio track 1310 section already embedded or associated with the video 132. Rather, the user can, for example, designate that the video fragment 132 be inserted in a particular section of a musical composition (e.g., intro, first verse, second verse, pre-chorus, chorus, bridge, outro); or in a section featuring certain instruments (e.g., drums, electric guitars); or in a section featuring certain words or phrases (e.g. "Hey Jude"). The user may transmit their selections, including metadata 135 and unique identifiers 135 for video content and metadata 1311 and unique identifiers 1312 for audio content, to the remote service system 120 for processing.

The remote service system 120 then matches the user's video content with any section of the audio track 1310 that meets the user's selected criteria, based on the audio track metadata, and further determines a start time and end time (the audiovisual set range 139 along the audio timeline 138) of a matching section of the audio track 1310. Thus, the remote service system 120 operates to match each video fragment 132 with a section of the audio track 1310 based on the user's selected metadata.

FIG. 6 represents a process in which at least one user-generated video 132 is generated or selected in a user interface 111 by a user, at least one audio track 1310 is associated with the video content 132 by the user, and the selections are transmitted to the effect that the video content 132 may be played alongside the audio content, preferably as a video compilation 131 entity. The audio waveform data of the audio track 1310 that is selected by the user is not embedded within the video file 132 but is instead referenced preferably by at least one audio unique identifier 1312.

The user interacts with an interface 111 in order to select at least one user-generated video 132. In another interface on the client 110, which is encountered before, after, or in conjunction with the selection of user-generated video 132, the user selects at least one audio track 1310 which will accompany the video content 132. In order to offer a user with choices from a library of audio tracks or other audio data, the client 110 may request from a remote service system 120 a list based on parameters predetermined, determined in real time, or determined by input of the user, for example a search query. The remote service system 120 may respond to the client 110 with zero or any number of results, which may also include at least one unique identifier 1312 for referencing audio data content 1310. The request and a response to it by the remote service system 120 may be optional if the client 110 has a local library of audio tracks 1310 or other data from which the user may select.

Upon selection of at least one video selection 132 or audio selection 1310, the client 110 may transmit at least one unique identifier 136, metadata 135, or video files (e.g., fragments) 132 for the video content, and may transmit at least one unique identifier 1312 for the selected audio track 1310, to the remote service system 120. Video unique identifiers 136 and video metadata 135 may be stored in one or more video content databases 121 and video files 132 are stored in one or more video object storage systems 122 with the remote service system 120 managing the relationships thereof, especially through the use of unique identifiers 136. Audio unique identifiers 1312 and audio metadata 1311 may be stored in audio content databases 124. A library of audio track files accessible to the user or to the remote service system 120 may have been previously stored by the remote service system 120 in an audio object storage system 125 with the remote service system 120 managing the relationships thereof, especially through the use of unique identifiers.

The remote service system 120 may compile each user-generated video 132 into a video compilation 131 using programmatic means as further described and referenced in FIGS. 8 and 12. A video compilation 131 comprising the user's selected video content 132 may thereafter be made available to the client 110 by the remote service system 120. The preferred embodiment of the video compilation 131 includes the user's selected video content 132 and at least one successfully matched audio track 1310 that can be preferably sourced from at least one audio provider.

The remote service system 120 may generate at least one set of video unique identifiers 136 and video metadata 135 and, preferably, at least one set of audio unique identifiers 1312 and audio metadata 1311 that altogether represent an abstracted reference for the video compilation 131, which the client 110 may use for accessing at least one media file as part of the video compilation 131.

As a response to a request by a client 110 or as sent opportunistically to the client 110, the remote service system 120 may transmit the video compilation's unique identifier(s) 136, metadata 135, and video file(s) or fragment(s) 132. The remote service system 120 also may transmit the audio track's unique identifier(s) 1312) and other metadata 1311), to the client 110).

The client 110 may utilize the provided audio track's unique identifier(s) 1312 and other metadata 1311 to form and transmit a request to an audio provider 150 by including in the request at least one unique identifier 1312 for at least one audio track 1310. Preferably, the audio provider 150 may provide access to an audio library to which the user may have licensed access. The client 110 may then obtain from the audio provider its response(s) for audio track metadata 1311 and audio content 137 (e.g. audio file). The audio provider 150 may utilize a database 151 and an object storage system 152 to manage the relationships of unique identifiers 1312 and metadata 1311 to audio track content 137.

It should be noted that the audio provider 150 may be either local or remote to the client 110. For example, the audio data file 1310 may be available in an already-downloaded storage area ("cache") provided by a DSP. Other systems or software available to the client 110, such as an SDK, may then supply the file from a cache on the client 110. In such a case, the audio provider 150 may be considered to be local to the client 110.

The client 110 may then render at least one video compilation 131 comprising at least one user-generated video 132 or audio track 1310. In rendering the video compilation 131, the client 110 may utilize any video metadata 135, video file data 132, audio metadata 1311, and/or audio track content 137 or data 1310 to synchronize or otherwise align the playback of the video content 132 and the audio track content 137.

Figure 7:
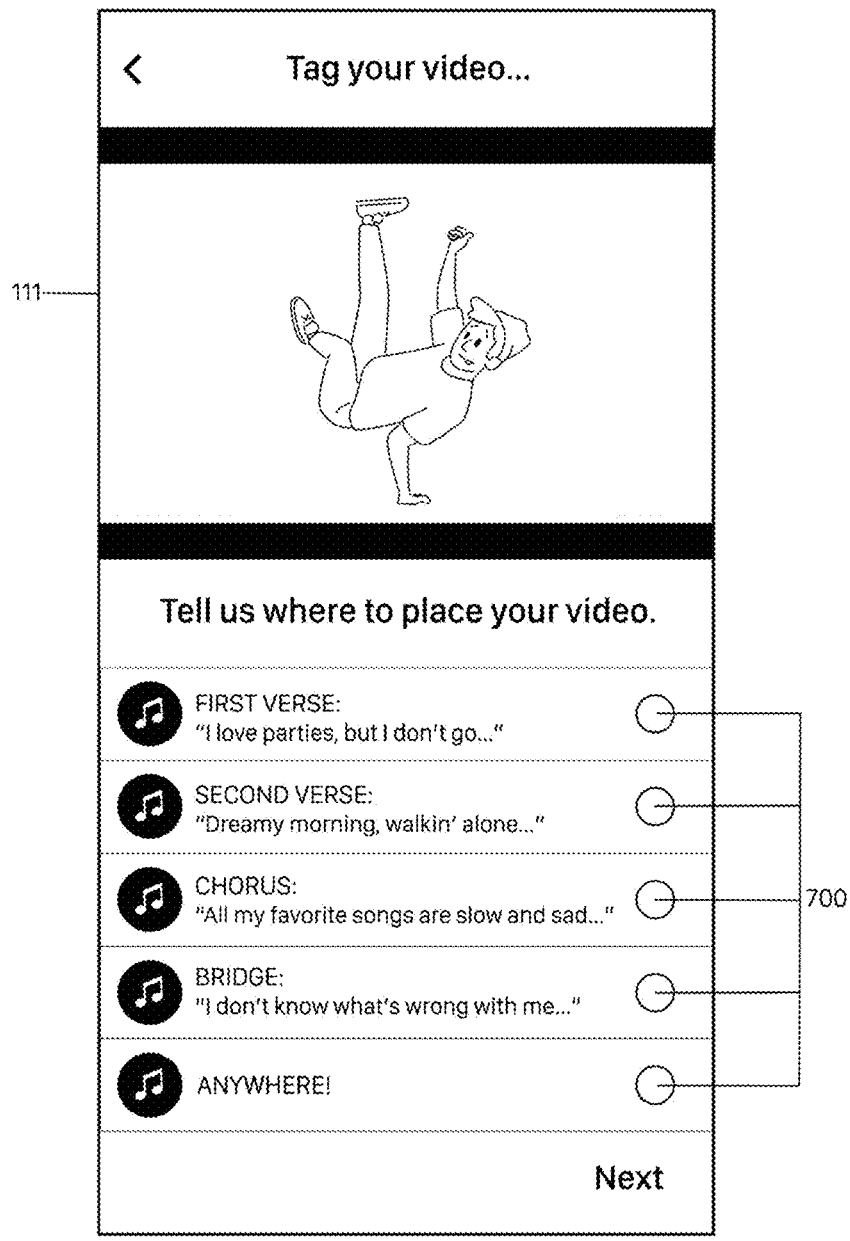
FIG. 7 is an example screen of an application showing how a user makes a metadata-based selection for associating the user's selected video with a section of a select audio track.

FIG. 7 illustrates an example user interface 111 of a mobile application, whereby a user may upload a video and then select a section of a song to associate with the video in a process that may embody steps described in FIG. 6. The user interface 111 demonstrates a unique context for the solution and is presented as part of a "Song Story" challenge, whereby users are invited to submit videos 132 for a particular audio track 1310. In this example, a user may submit content using the following steps: (1) The user selects an option to post a video, by clicking a "Post Video" button as depicted at 1002 in FIG. 10; (2) The user is presented with a camera screen as shown in FIG. 3B, that allows the user to either record, by holding down a record button 320, a video 132 with the video camera, or to upload an existing, pre-recorded video clip 132 by browsing the user's saved content ("camera roll"), by selecting the camera roll icon 321 on that screen; (3) The user selects a video 132 from the camera roll, as at 330 in FIG. 3C; (4) The user confirms the video selection 132, by, for example, selecting "Choose" at 340 in FIG. 3D. At that point, the user is presented with options to associate the uploaded video 132 with a particular section of the audio track 1310 (in this example, the first verse, pre-chorus, chorus, second verse, or anywhere in the song), and the user indicates a selection by checking any of the input boxes, as depicted at 700 in FIG. 7.

III. How to Select User Videos for Inclusion in a Compilation

Turning now to the various embodiments relating to the selection of user-generated video 132 that will be inserted into a video compilation 131, when multiple videos 132 associated with the same, similar, or overlapping sections of an audio track 1310 are generated, the remote service system 120 must determine which user videos 132 may be incorporated into the video compilation 131.

FIGS. 8 and 12 provide graphical representations of a video selection system and method 1200 by which video fragments 132 are inserted into a video compilation 131, along with filler content 141 as determined by the remote service system 120. It may be instructive to refer to FIG. 8 in concert with FIGS. 1C and 12, as these illustrations contain overlapping concepts and components as a means to provide various ways to understand the present invention.

In FIG. 8, a video compilation 131 comprises twenty frames of video content 132, with each frame numbered sequentially along the video timeline 133. This figure provides an example where there are four different users that have generated video fragments 132. Each fragment contains at least one frame of video content 132 which the remote service system 120 has programmatically selected for a video compilation 131.

As depicted in FIG. 12, the remote service system 120 preferably but does not necessarily employs a process 1212 that considers analytics data 1201 or social data 1202 to generate a list of results 1213 for ranking video fragments 132 for inclusion in a video compilation 131, and/or for determining which sections of a context-providing audio track 1310 with which to associate the included video fragments 132.

Returning to FIG. 8, each video fragment 132 is placed along the video timeline 133 in sequential order. The frames that have been selected for the video compilation 131 are designated by numbers that correspond with the video timeline 133. For example, the first three frames of a first user's video fragment 132 are to be inserted as frames 2, 3, and 4 along the video timeline 133. Three frames of a second user's video fragment 132 are to be inserted as frames 5, 6, and 7 along the video timeline 133. Four frames within a middle portion of a third user's video fragment 132 are to be inserted as frames 8, 9, 10, and 11 along the video timeline 133. Finally, the figure shows that the entirety of a fourth user's video fragment 132 is inserted as frames 15 through 20 along the video timeline 133.

In the example shown as FIG. 8, the remote service system 120 has identified a gap between the video fragments of the third and fourth user, specifically at frames 12, 13, and 14 along the video timeline 133. Thus, the remote service system 120 adds filler content 141 to constitute frames 12, 13, and 14. Note also that the remote service system 120 in this example has also inserted filler content 141 at frame 1 of the video compilation 131. In this diagram, the filler content 141 is empty content, represented as white frames in contrast to grayscale frames indicating visual content. Alternatively, the remote service system 120 operates to add any variety of content including text, visual media, video content, or any combination thereof; that is, the filler content 141 can be empty frames (as preferred for seamless delivery of video content, and further described with respect to FIG. 12) or frames that include some content.

The figure also shows the audio timeline 138 for the audio track 1310 or audio track 1310 section that is to play alongside the video compilation 131. It should be noted that FIG. 8 is merely a simplified representation of certain aspects of the system and methods of the present invention, and specifically, that a video compilation 131 may contain not only the video timeline 131 and video fragments 132, but preferably comprises additional parts such as an audiovisual set range(s) 134 (start time(s) and end time(s)) along the video timeline 133 and video metadata 135 (including a video unique identifier 136, duration, and bitrate).

FIG. 9 illustrates a user interface 111 for an example embodiment whereby the remote service system 120 operates to present in a social feed or as a social post the video 132 in combination with the associated audio track section 1310 (collectively referred to herein as an "audiovisual set" 130), for consumption by other users. The post identifies the creator of the video 132, as at 900, and presents a video playback scrubber bar 901 for the viewer to rewind, pause, or forward the video. The client 110 enables users to view and otherwise interact socially with the audiovisual set 130. For example, peripheral users may download, like, vote for, flag, share, and/or comment on the audiovisual set 130 as presented by the remote service system 120. In this example, a viewer can click a like button 902, view other users' comments 903, share the video 904, and/or submit a comment 905. The screen, as presented, displays the number of likes 902 and comments 903 received on the video. Various other user interfaces 111 can display other metadata or social information related to the video (including but not limited to the date of the post, total duration of the post, title of the associated audio track, any user-created hashtags, or a user-created description for the post).

Thus, FIG. 9 is an example user interface 111 that corresponds with video selection system 1200 that includes a process 1212 to generate a list of results for ranking video fragments, as depicted in FIG. 12. That is, the remote service system 120 may operate to register inputs related to the social interactions ("social data" 1202) received on each audiovisual set 130, whether on the video or audio portion, in a storage database 128 via the remote service system 120. Social data 1202 may also be generated and/or collected by an entity outside the solution stack 100 and ingested by the remote service system 120 for processing. The remote service system 120 then preferably uses the registered social feedback from peripheral users to determine which videos 132 to play when there is a conflict in start times (e.g., multiple videos 132 with overlapping start times or durations). The remote service system 120 can use the number of views, downloads, likes, votes, flags, shares, comments, or other social interactions on each video to determine/rank content popularity, and thereby further select the videos 132 that outrank other content for placement into any given section of a video compilation 131.

Users can register a wide variety of social interactions on both the video and audio portions of the audiovisual set 130. For example, while viewing a short-form video 132 that plays alongside a section of a song 1310, a user may be presented with an option to listen to the entire song 1310, download the song 1310, create their own video 132 to associate with the song 1310, watch other videos 132 associated with the same song 1310, view information about the song 1310, or share the song 1310. Any of these social inputs would provide information about the audio track 1310, not the video content 132. Additionally, while viewing a short-form video 132, a user can be presented with an option to like the creator, follow the creator, or view the creator's other video posts. These social interactions are instructive about the popularity of the video content 132 rather than the audio track 1310.

Further, a remote service system 120 can use social interactions on the audiovisual set 130 that, while relevant to both the audio or video content, are more likely instructive on the popularity of one type of content and not the other, to learn and register social inputs about the audio or video content. For example, while viewing a short-form video 132 paired with an audio track 1310 (that is, the audiovisual set 130 presented as a social post), a user can be presented with an option to select an approval input (e.g., a like, "thumbs up", or heart button) at any portion of the audiovisual set 130 as it plays to that user. If a five-second subsection of a user-generated short-form video 132 receives a high number of shares, replays, likes, or other positive social feedback, such information shows both the compelling nature of the video content during that five-second section and also the popularity of that 5-second section as compared to other sections within the same audio track. The solution stack 100 can utilize a ranking process 1212 such social information to give that five-second subsection of video content a higher priority for inclusion in a video compilation 131, as well as determine which sections of an audio track 1310 should feature user-generated content 132 (versus non-user-generated additional filler content 141).

In summary, the number or quality of social interactions on any of the media content portion of an audiovisual set 130 presented as a social post can be used as a proxy for determining the compelling nature of the content as compared to other content, and then utilized for programmatically determining how to rank videos to be included in a video compilation 131. A preferred video selection system 1200 that utilizes analytics data 1201 and social media data 1202 and applies a process 1212 for ranking video fragments based on such data is depicted and further described in FIG. 12.

Figure 10:
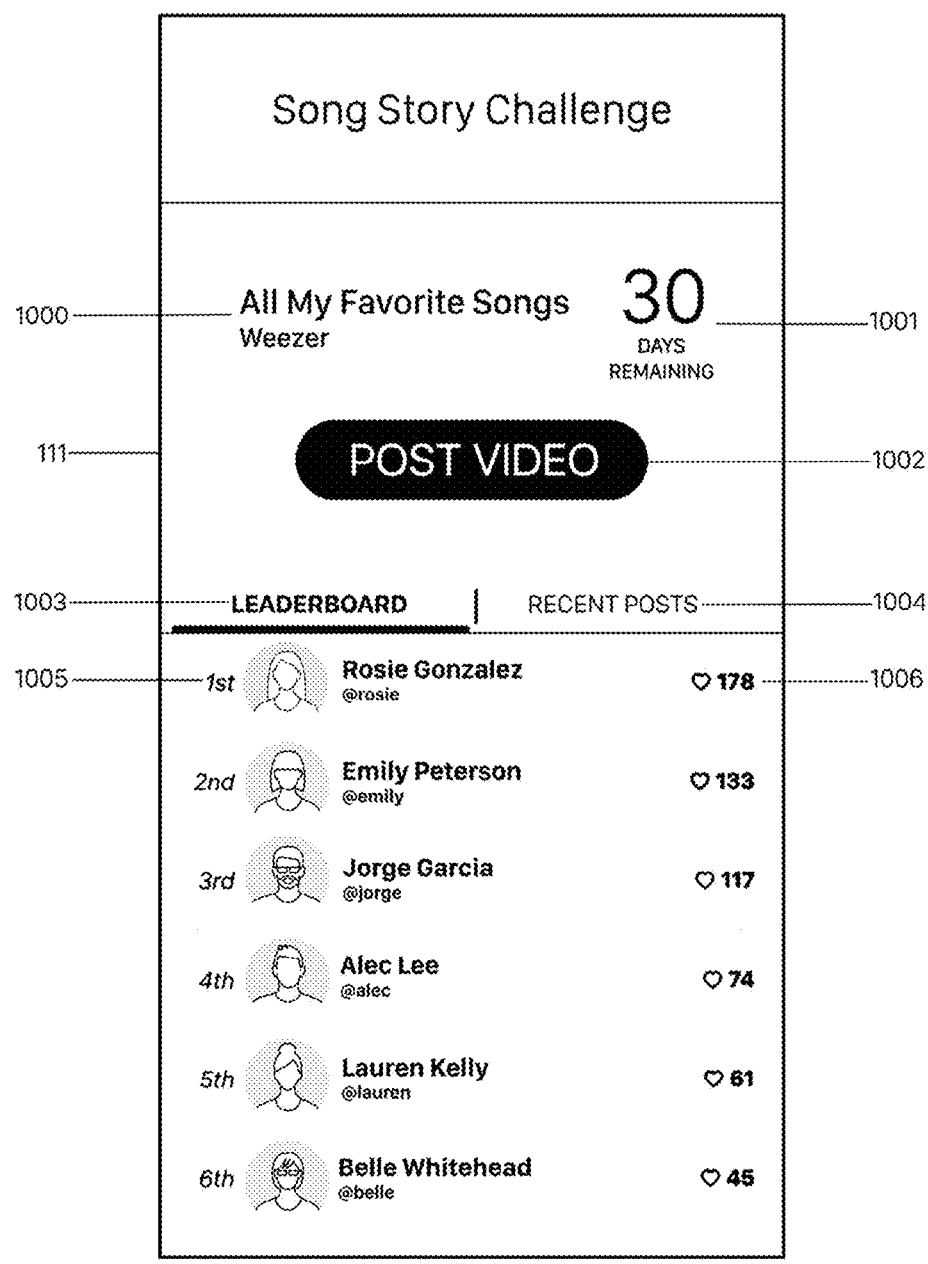
FIG. 10 is an example screen of an application that presents users' videos in a list format, whereby users can view and otherwise interact with at least one video.

FIG. 10 illustrates an example user interface 111 of an application, whereby users participate in a unique context for the invention referred to herein as a "Song Story" video challenge. That is, users compete against one another by submitting videos for inclusion in a final video compilation of compilations 140 (the "Song Story") associated with a select musical composition or song. In the example screen, the audio track 1310 which is the subject of the "Song Story" challenge is presented to the user ("challenge song") 1000, e.g. Weezer's "All My Favorite Songs." Users are presented with the number of remaining days in the challenge 1001, e.g., 30 days, to submit videos to be included in an official "Song Story" challenge song 1000.

The client 110 and/or remote service system 120 is operable to present one or more video fragments 132 associated with an audio track 1310 (i.e., an audiovisual set 130) in a list format, or a "leaderboard", as depicted and referenced at 1003, for allowing users to view and react to the audiovisual sets 130. In this example, the leaderboard presents all videos 132 submitted by users, with the highest-ranked entries presented in order. That is, the first place user is displayed at the top of the list 1005 with the total number of likes 1006, and so on. A user can also sort and view video entries based on the date of submission, as at 1004, rate of trending popularity, or other criteria. A user can scroll through the leaderboard 1003 to view any entry, and by selecting an entry, by tapping on any entry as at 1005, the user is presented with a social post for the audiovisual set 130 (that is, the video fragment 132 playing alongside an associated audio track section 1310) (the social post is depicted in an example user interface 111 in FIG. 9). The users' social reactions (e.g., views, downloads, likes, votes, flags, comments) may be used by at least one member of the solution stack 100 for ranking video compilations, videos, sections of videos, audio tracks, and/or audio track sections. In this example, the leaderboard 1003 ranks entries based on the number of likes, as at 1006.

Additionally, the present invention also contemplates example embodiments whereby a user can watch dynamic (ever-changing) "Song Story" compilations generated randomly or based on specific criteria by the remote service system 120. That is, the remote service system 120 can present "unofficial" video compilations 131 for users to view prior to the close of the challenge. Each viewing of an unofficial video compilation 131 is different for every user and can change in real time based on any variety of programmatic algorithms. For example, the videos included in any given unofficial compilation can change based on real-time social interactions with the audiovisual sets 130 featured on the leaderboard 1003.

The user can interact with the audiovisual set 130 which is presented as a social post, by, for example, indicating a vote for the content, clicking a like button, adding a comment to the post, or sharing the post (FIG. 9). As users provide positive social interaction (e.g., a vote, like, comment) on audiovisual sets 130 during the challenge period, the remote service system 120 can preferably adjust the ranking of the submitted videos 132 as they are presented in the unofficial compilations 131. At the close of the challenge, the final "official" video is compiled using only the highest ranked videos 132.

IV. Implementation of a Currency System

Additionally, a currency system can be implemented within an optional "Song Story" challenge. That is, the solution stack 100 may be operable to comprise or interact with a currency system for transferring units of value to/from users based on their activity and interaction with videos 132, audio tracks 1310, audio track 1310 sections, or related metadata. A currency system can be self-contained to the application—meaning, the units of value can only be earned and spent in the application; or the units of value can be cashed out for "real-world" rewards, prizes, or money. Similarly, a currency system can allow users to transfer units of value to other users of the same application, or can allow users to gift or donate units of value to external parties such as charitable organizations.

There are a variety of ways for users to earn currency within an application, as contemplated for the present invention. For example, users can earn units of value (e.g., gems, coins, points, or tokens—whatever term is employed in an application) by viewing stand-alone ads; viewing a requisite number of user-generated short-form music videos 130; viewing certain short-form music videos 130 with advertising such as non-skippable, pre-roll or mid-roll video ads appended to them; or uploading video entries 132 to a "Song Story" challenge.

The remote service system 120 may operate to allow users to spend earned virtual currency on a variety of goods or services available in the application, including, for example, additional votes on any music videos 130 submitted for a "Song Story" compilation. That is, an application can allow a user to boost the number of votes for a particular submitted video, thereby accelerating the ranking for that video to be included in a resulting video compilation 131.

Figure 11A:
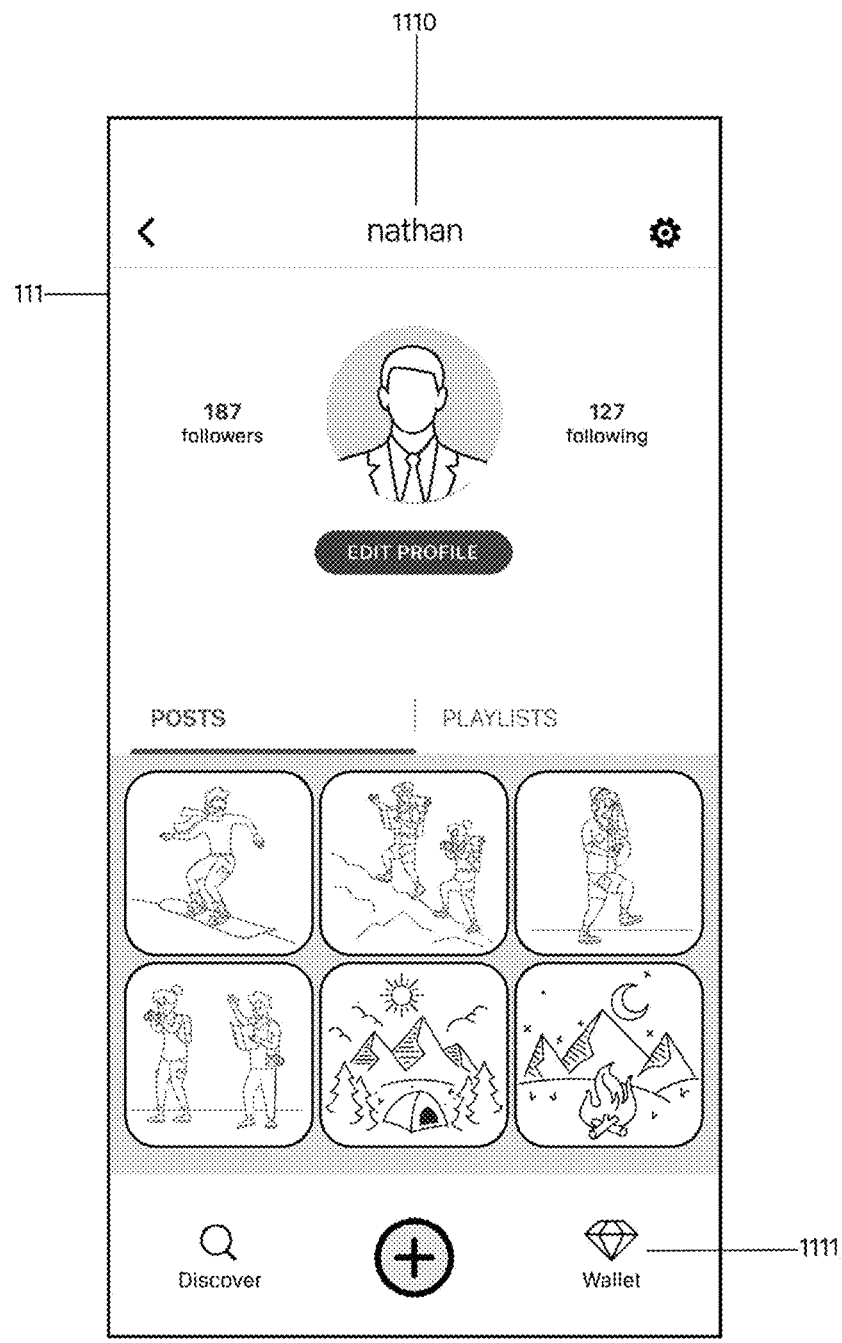
FIG. 11A is an example screen of an application showing a user's profile page where a user can open a virtual wallet.
Figure 11B:
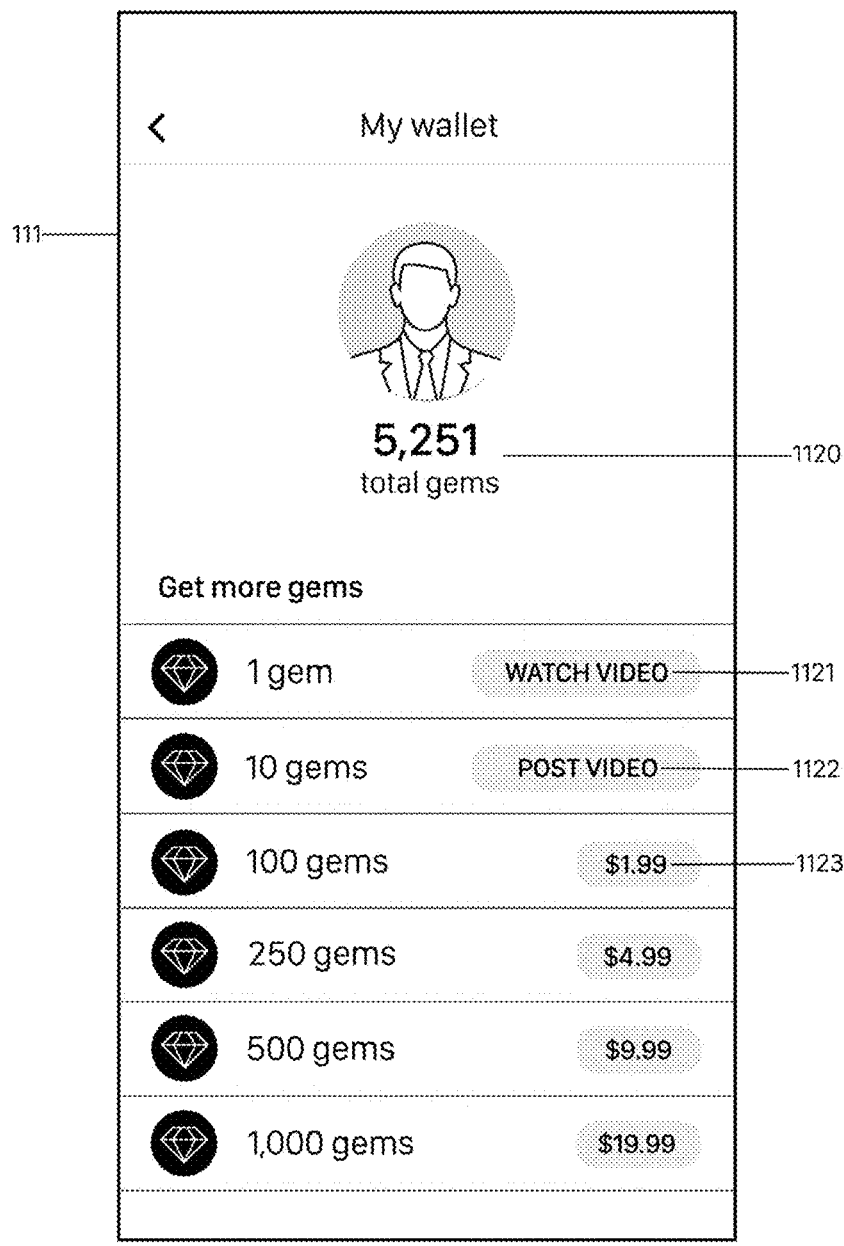
FIG. 11B is an example screen of an application showing a user's virtual wallet where the user can view the user's balance and get more units of value by watching videos, posting videos, or purchasing more units of value.

Composite FIG. 11 illustrates an example user interface of an application, whereby users can earn and spend virtual currency in a "Song Story" challenge. FIG. 11A presents an example profile screen of a user, on which the user is identified at 1110, whereby the user can navigate to a virtual wallet, as at 1111. The wallet 1111, depicted in greater detail at FIG. 11B, shows the user's total number of units of value ("gems" in this example application), as at 1120. The remote service system 120 also presents options to the user to get more gems by watching a video 1121, posting a video 1122, or purchasing gems 1123. That is, a user can earn one gem for watching one short-form video 1121 or ten gems for posting their own short-form video 1122.

Figure 11C:
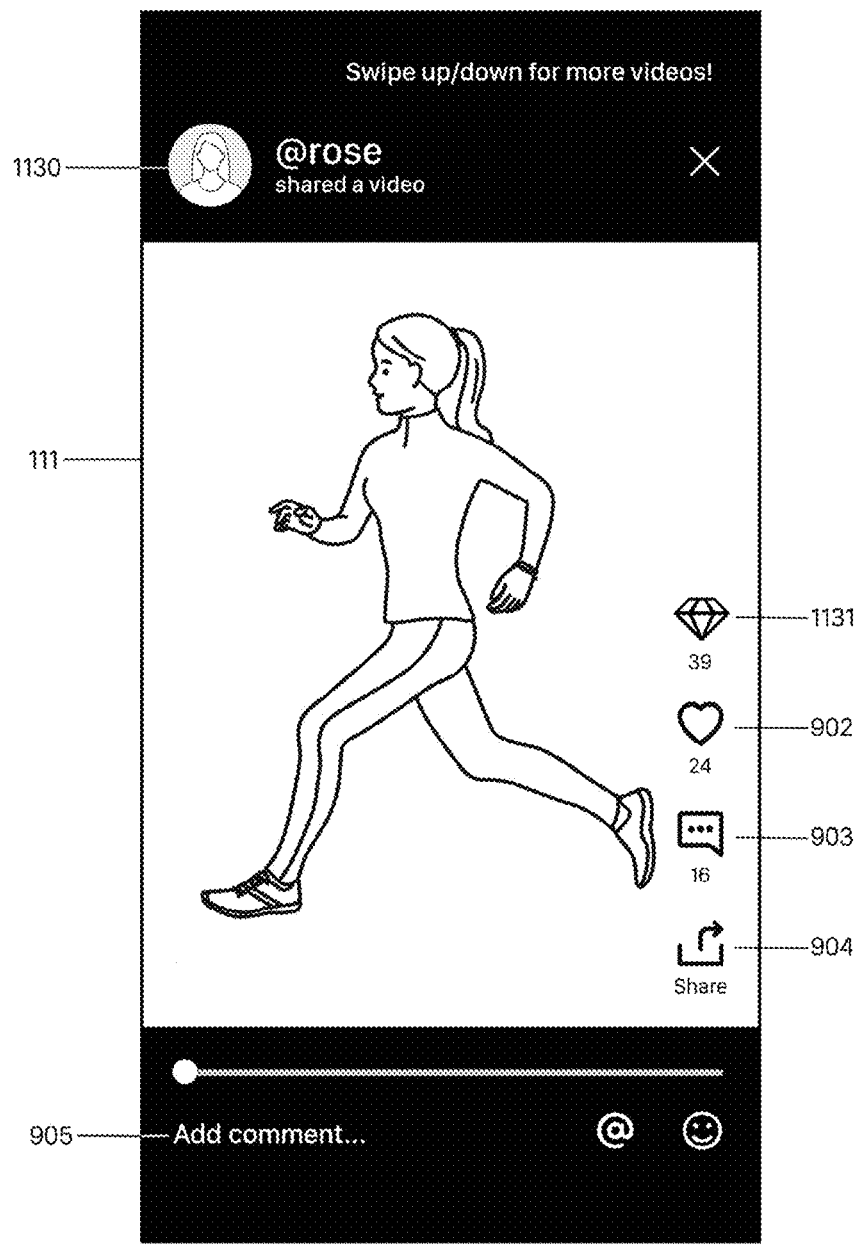
FIG. 11C is an example screen of an application showing a social post where a user can transfer units of value to the creator of the social post.

Further, in this example, the user can reward another user's video post with gems, as depicted in FIG. 11C. The creator of the audiovisual set 130 is shown at 1130. By clicking on the gem icon on a social post, as at 1131, the user may be presented with the option of sending any number of gems to the creator of the video 132. The transfer of gems may be a means to "tip" the creator for having shared compelling content and/or to boost the ranking of that video entry 130 in a "Song Story" challenge. That is, if a currency system is implemented, an application can base, in whole or in part, the ranking system for videos on the number of gems received on each video entry 130. One can then reimagine FIG. 10 to show video entries 130 ranked by the number of gems rather than by the number of likes 1006. Alternatively, one embodiment can allow users to purchase more likes using the platform's currency system.

V. Insertion of Filler Content; Duration of Video Compilation

Referencing FIG. 12, the remote service system 120 may further operate to fill any sections of the video compilation 131 with additional ("filler") content 141 for allowing the video compilation 131 to play seamlessly between positioned video fragments 132. This process is part of a larger video selection system 1200. First, the remote service system 120 receives various video fragments 132 for overlapping sections along an audio timeline 138 of an audio track 1310. In the example depicted in FIG. 12, there are five different sections of the audio timeline 138 that have associated video fragments 132. The remote service system 120 then applies a subprocess 1212 (including any number of algorithms, functions, methodologies, or programs) using data sources available to the solution stack 100. Data types may include analytics data 1201 or social inputs 1202 related to audiovisual sets 130, which have been presented for user consumption, stored in database 127 for analytics or database 128 for social media interactions. The remote service system 120 utilizes any number or variety of analytics data 1201 or social data 1202 to generate rankings 1213, as also depicted in FIG. 1, for selecting at least one video fragment 132 from among multiple video fragments 132 or video compilations 131 associated with each select audio track 1310 section, to be inserted into a video compilation 131.

Further, either the client 110 or the remote service system 120 according to the present invention may preferably pad raw user-generated video content with filler content, as at 141, said additional content being appended at either the beginning and/or the end of the video fragments 132. The filler content 141 can be empty content, text, visual media, video content, or any combination thereof.

Thus, there are two primary concerns addressed by inserting or appending additional content into a video compilation. First, filler content 141 may need to be appended to the start or end of a video fragment 132 to resolve technical, time-based issues (that is, for ensuring that the filler-added video fragments 132 start and end at precise time markers for enhancing stream delivery). The need for such measures may arise from a process observed in FIG. 8 wherein the sum of durations of video fragments 132 does not equal the sum of durations of audio track 1310 sections selected for playback. Second, additional content 141 may be inserted into or appended to a compilation 131 for discretionary reasons, for example those represented by a user-based selection process in FIG. 6 for video content and/or audio content.

The client 110 generates at least one video fragment 132, and such video is either preferably converted (a) on the client side into a sequence of video chunks with at least one multimedia playlist (e.g. M3U file: .m3u; .m3u8) per a Hypertext Transfer Protocol (HTTP)-based streaming protocol such as HTTP Live Streaming ("HLS") or into video chunks per a non-HTTP-based streaming protocol; or (b) as a chunk processed by a remote service system 120, a media processor, or a process or service operable to perform this function on behalf of the client 110.

The present invention contemplates the use of any variety of streaming protocols including but not limited to traditional streaming protocols such as Real-Time Messaging Protocol (RTMP), Real-Time Streaming Protocol)/Real-Time Transport Protocol) (RTSP/RSP); HTTP-Based Adaptive Protocols such as HTTP Live Streaming (HLS), Low-Latency HLS, Moving Picture Expert Group Dynamic Adaptive Streaming over HTTP (MPEG-DASH), Common Media Application Format for DASH (Low-Latency CMAF for DASH), Microsoft Smooth Streaming, and Adobe HDS (HTTP Dynamic Streaming); and new technologies such as Secure Reliable Transport (SRT) and Web Real-Time Communications (WebRTC).

HLS is employed as an example only, as it is currently the most commonly used streaming protocol (HLS is the default media streaming protocol for all iOS devices, but it can be used on Android and web browsers as well). HLS is an adaptive bitrate streaming protocol which uses HTTP for the communication between the server and the client 110.

"Currently, the M3U file format is an industry standard for multimedia playlist files, with popular file extensions being .m3u and .m3u8. Originally created to organize MP3 files, M3U is a plain text file format that is used, as extended for HLS, to define media streams. That is, HLS uses .m3u8 ("M3U8") files to describe media streams. Specifically, in HLS, there are two kinds of .m3u8 files: (1) a media playlist containing URLs of the files needed for streaming (i.e., chunks of the original video to be played); and (2) a master playlist containing URLs to media playlists which, in turn, contain variants of the same video prepared for different bandwidths. Various implementations of M3U files can result in the creation of both static and dynamic .m3u8 files."

Each video fragment 132 of the video content is associated with a section of the audio track 1310 with a unique identifier 1312, so as to allow the remote service system 120 to determine at what section of the video compilation 131 each video fragment 132 will appear. The playback start time will determine at what time in the video compilation 131 the video 132 will appear. If there are portions of the video compilation 131 that have no user-generated video content 132, then the remote service system 120 fills those empty portions with additional content 141 to allow the video compilation 131 to play seamlessly between positioned content.

This simplifies the process of synchronizing aggregated composition content with playback of the audio track content 1310, because the aggregated composition content is positioned within the video compilation stream at the exact position it should appear in playback of the audio track 1310. This allows the client 110 to synchronize the two pieces of content (the audio track 1310 and the video compilation 131) by ensuring they are at the same playback position, and by using a dynamic playback rate algorithm to ensure that they stay at the same playback position.

It is instructive here to consider certain finer details in the process of generating the video content. The video fragment 132 may be generated in a manner that can result in gaps between video content in the video compilation 131. The reason for this is that the content-associated start time can be positioned at any millisecond of an audio track 1310. The problem with this is that in order for the video compilation 131 to play back consistently and synchronize properly, every frame of the stream must be properly positioned. This means that empty content fragments can end up being prohibitively small, as small as a single frame.

The presence of empty content fragments might significantly affect the ability of the content player to reproduce the video stream (whether by HLS or other streaming protocol) without staggering or consistent buffering. To avoid this problem, either the client 110 or the remote service system 120 pads the raw user-generated video content 132 with filler content 141 at the beginning and end of the raw user-generated video content 132 to ensure that the modified or filler-added user-generated video content starts and ends at an exact second. This ensures that any empty fragment 141 that the remote service system 120 needs to insert will not need to be smaller than a second in length, which enables significantly smoother streaming for the client 110.

Alternatively, additional content 141 may be inserted into or appended to a compilation 131 for discretionary reasons. For example, the remote service system 120 may add content 141 in the form of text, visual media, videos, or any combination thereof, layered atop or inserted between sections of the video compilation 131, for the purpose of providing advertising or other related content to a viewer. A remote service system 120 may insert content that is associated with a particular audio track 1310, such as trivia or commentary about a song or its related album or artist. The present invention can also be practiced to insert filler content that is not associated with an audio track 1310, such as a video advertisement selected randomly or based on a user's metadata (e.g., geographic location, demographic characteristics, activity history).

VI. Video Compilation of Video Compilations

Figure 14:
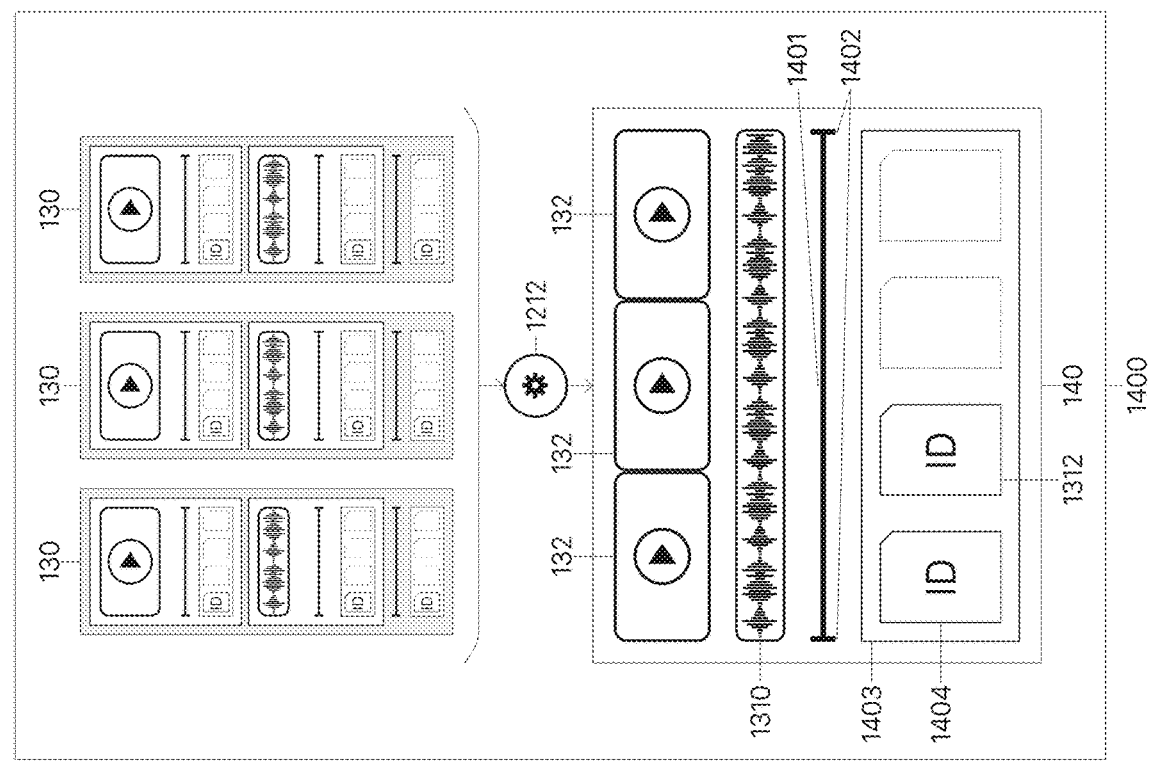
FIG. 14 is a flowchart diagram of the systemic components according to the present invention, depicting the remote service system programmatically selecting videos for inclusion in at least one video compilation that plays alongside at least one audio track.

FIG. 14 describes a system 1400 for creating a "compilation of compilations" (sometimes referred to as a "Song Story") 140, that is, compiling video content that may have been contained within at least one audiovisual set 130 (which is also more specifically depicted in FIGS. 1D and 1E), including at least another video compilation 131 associated with audio content 137.

The compilation of compilations 140 may preferably be generated programmatically, but may also be generated by a user, and it comprises video fragments 132 preferably from multiple users that are played alongside at least one audio track 1310. The resulting compilation of compilations 140 is then accessible to users through a client 110 user interface 111 for playback of video content 131 and audio content 137, according to the elements within each compilation of compilation's 140 audiovisual set(s) 130 and the capabilities of the solution stack 100. Like an audiovisual set 130, the compilation of compilations 140 may incorporate video fragments 132 from a variety of sources. Therefore, the compilation of compilations 140 may be characterized as a type of an audiovisual set 130. A distinguishing, but not limiting, characteristic of the former is the context of use in which the compilation of compilations 140 preferably incorporates video content 132 that has previously been associated with an audio track 130 in an audiovisual set 130.

The process depicted in FIG. 14 references concepts depicted in FIGS. 8 and 12 for the handling of video content from any source available to the solution stack 100, namely a video fragment selection system 1200 that includes a process 1212 for determining placement of video fragments 132 in a resulting video compilation 131. FIGS. 8 and 12 also depict the placement of additional content ("filler") 141, the necessity of which may be determined by a process 1212 for selecting video fragments 132 for inclusion in a compilation 131.

Returning to FIG. 14, to generate a compilation of compilations 140, the remote service system 120 may programmatically select 1212 video content 132 referenced within at least one video compilation 131, but preferably from among multiple video content 132 referenced within multiple video compilations 131.

The preferred embodiment of a compilation of compilations 140 may be described as "a dynamic music video for a song", with "music video" referring to an audiovisual set 130 containing video content 132 associated with a song and "song" referring to an audio track 1310. Though this embodiment demonstrates only one audio track 1310 present within the compilation of compilations 140, the invention also envisions the inclusion of multiple audio tracks 1310 to which at least one video file 132 may be associated. For example, if more than one audio track are referenced in a compilation of compilations 140, sections of those tracks may be selected and referenced instead of the entire duration of each audio track 1310.

Figure 1E:
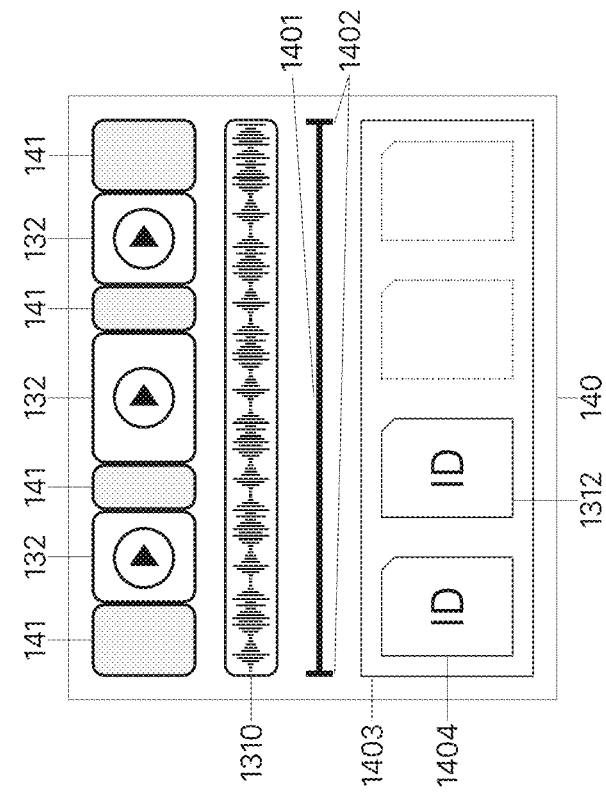
FIG. 1E is a diagram of a "compilation of compilations" which contains at least one video compilation that plays alongside an audio track, and one or more pieces of metadata including at least one unique identifier, where the video compilation is comprised of one or more video fragments and additional content ("filler").

Again referencing audio components of the compilation of compilations 140, the preferred embodiment includes audio data 1310 in an abstracted form, which is introduced in FIG. 1A and depicted in greater detail in FIGS. 1D and 1E. In this embodiment, audio waveform data 1310 is not embedded within the video file(s) 132 as an audio track 1310, and is preferably made available to users through the use of another audio provider 150. However, the invention contemplates a use case in which audio may be embedded within the video file 132 by necessity of a solution stack 100 or by another preferred technical implementation wherein the video content 132 and audio content 137 may be encoded within a single file (e.g. for portability and file transport).

Figure 14A:
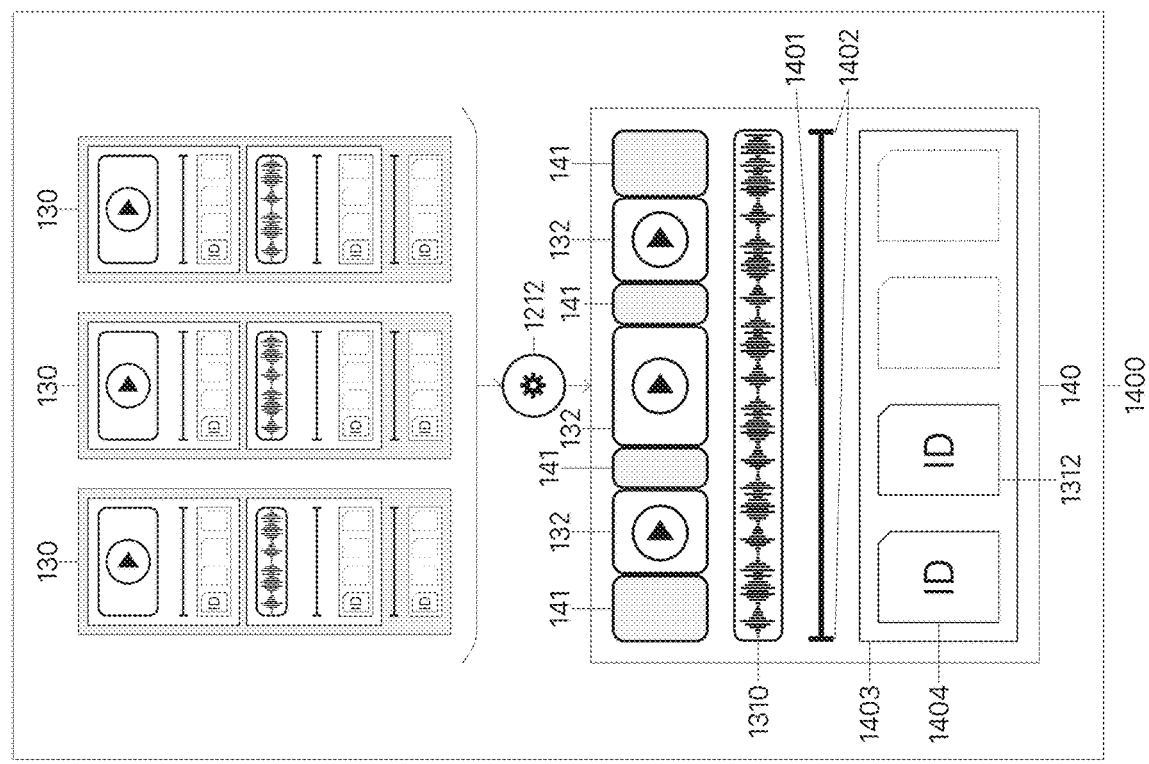
FIG. 14A is a flowchart diagram of the systemic components according to the present invention, depicting the remote service system programmatically selecting videos for inclusion in at least one video compilation that plays alongside at least one audio track.

Technical dependencies for a compilation of compilations 140 include various components of a solution stack 100 as depicted in FIGS. 1, 1D, and 1E. The preferred technical embodiment of a compilation of compilations 140 is a system and process 1400, which includes a timeline 1401, a set range 1402, metadata 1403, and a unique identifier 1404, among other components, as illustrated in FIGS. 14 and 14A. A compilation of compilations 140 also includes audiovisual set 130 components, including video compilations 131 and their subcomponents, as referenced in FIG. 1C.

The preferred embodiment for the technical system and process is as follows. As illustrated in FIGS. 14 and 14A, a compilation of compilations 140 is generated by a process 1212 in the remote service system 120 that selects audiovisual sets 130. Portions of audiovisual sets 130, which comprise the multimedia and metadata content of a compilation of compilations 140, are selected by systems and processes further depicted and described in FIG. 12. Similarly, additional content ("filler" content) may be added to a compilation of compilations 140 in accordance with processes described with regard to FIGS. 8 and 12.

A process 1212 to generate or update a compilation of compilations 140 may be invoked by a variety of events or conditions. For example, a process may be executed: as scheduled (e.g., "cron job" or event scheduler); at random; at the request by a client 110 or other process within the solution stack 100, including when a user plays an audio track 1310 or interacts with any other member of an audiovisual set 130, video compilation 131, or compilation of compilations 140; based on data about social trends 1202 as in a social database 128, including popularity scores or trending algorithms; based on analytics data 1201 as in an analytics database 127, including the status or result of measurable user engagement; or from any other data source outside the solution stack 110, such as an analytics provider or social media platform.

In the preferred embodiment, the compilation of compilations 140 may be expressed at the technical level in the form of an M3U8 playlist. The accompanying M3U8 playlist file may be a static file, which may also be updated as needed, or it may be dynamic, wherein a stream URL (e.g. HTTP Dynamic Streaming) may be included within the M3U8 file. Metadata may be included in the M3U8 playlist file from a variety of sources, including compilation of compilations metadata 1403 and other audiovisual set 130 components.

The essence of the preferred technical approach to a compilation of compilations 140 is contained within the relationships of video fragments 132 to audio tracks 1310. Considering that any member of an audiovisual set 130 is associated with any other member of the same set by metadata 1317, 135, 1311, a video fragment 132 is associated with at least one audio track 1310. That relationship, of a video fragment 132 to an audio track 1310, may be leveraged in the reverse: an audio track 1310 is associated with a video fragment 132 (preferably, many fragments). Thus, a compilation of compilations 140 is the result of a process that, respective to a given audio track 1310, selects from the associated video fragments 132, across many audiovisual sets 130, an array of video fragments 132 to play alongside an audio track 137. The derivative product, also known as a "Song Story", can be described as a music video-like compilation.

The present invention also contemplates a scenario in which a compilation of compilations 140 may be generated using video fragments 132 that were not previously associated with a given audio track 1310. That is, the remote service system 120 can operate to correlate one audio track 1310 with video fragments 132 that were associated with other audio tracks 1310 that may be adjacent to or otherwise peripherally related to the given audio track 1310 by using metadata or otherwise. For example, a compilation of compilations 140 for a given song 1310 may include video fragments 132 selected from audiovisual sets 130 that included songs 1310 from the same album or artist, or remixes or other versions of a song.

Additionally, relationships within a user's social media network may be evaluated in order to provide recommended video content 132 for a compilation of compilations 140. That is, the remote service system 120 may use any variety of social data 1202 about a particular user to generate a compilation of compilations 140 tailored to that user. The remote service system 120 can analyze the user's frequency and quality of interactions with other users in a social platform to create audiovisual content that the system predicts will be compelling for that user. For example, the remote service system 120 may operate to compile and present a compilation of compilations 140 featuring video fragments 132 created by the friends or followers from whom a user most frequently views video fragments 132.

In the preferred form, the compilation of compilations 140 component has subcomponents that resemble those of an audiovisual set 130 and that exist to make the compilation of compilations accessible to members of the solution stack 100. These correlations demonstrate how the present invention may be practiced in an iterative manner: By continually and dynamically repurposing UGC, the system and methods described herein provide a means for maximizing the derivative uses for UGC. The parallels between compilations of compilations 140 and audiovisual sets 130 include the following: (1) Like the audiovisual set-level timeline 1315, the compilation of compilations timeline 1401 maintains the sequence of events related to the playback of other timelines of media referenced within the compilation of compilations 140; (2) Like the audiovisual set-level set range 1316, the compilation of compilations set range 1402 manages the capture, storage, and playback of start times and end times on media timelines of media referenced within the compilation of compilations 140; (3) Like the audiovisual set-level metadata 1317, the compilation of compilations metadata contains information about media referenced within, and other information about, the compilation of compilations 140; and (4) Like the audiovisual set-level unique identifier 1318, the compilation of compilations unique identifier 1404 is affixed to a compilation of compilations 140 as the result of a method for discretely identifying a compilation of compilations 140 and for maintaining the relationships of compilations of compilations 140 to other components within the solution stack 100, including audiovisual sets 130, video fragments 132, audio content 137, metadata 1317, 135, 1311, analytics data 1201, preferably in an analytics database 127, or users, preferably in a social database 128.

A compilation of compilations 140 is made available by the solution stack 100 through the use of the same components to produce an audiovisual set 130, including at least one client 110, remote service system 120, analytics databases 127, social databases 128, video content databases 121, audio content databases 124, video object storage systems 122, and audio object storage systems 125. To support the transmission of a compilation of compilations 140, the process defined for the present invention utilizes bidirectional transmission 1313, 1314 of the video and audio components of a compilation of compilations 140, between members of a solution stack 100, as set forth in FIG. 1. Like the audiovisual set 130, a compilation of compilations 140 may be transmitted in one direction, as depicted at 1313, by the client 110 to the remote service system 120; and also transmitted, as depicted at 1314, from the remote service system 120 to the client 110. The client 110 and remote service system 120 transmit a compilation of compilations unique identifier 1404 and compilation of compilations metadata 1403 along with other data including at least the video compilation 131, and video metadata 135, and at least the compilation of compilations set range(s) 1402 and audio unique identifier 1312.

A compilation of compilations 140 may be requested and consumed by a member of the solution stack 100 in a variety of use cases. Preferably, a client 110 may request a compilation of compilations 140 that is related to an audio track 1310, which may be selected by the user in a user interface 111.

The client may indicate the audio track 1310 for which a compilation of compilations 140 is desired by transmitting a request including the audio track 1310 audio unique identifier 1312 to the remote service stack 120, which may then return a relevant compilation of compilations unique identifier 1404 or another embodiment of the compilation of compilations 140. Alternatively, the client 120 may transmit the compilation of compilations unique identifier 1404 of a desired compilation of compilations 140, if known.

The present invention also contemplates requests of a compilation of compilations 140 by a process or program, for example within a solution stack 100.

The remote service stack 120 may present a compilation of compilations 140, including an audio track 1310 and video content 132. The remote service system 120 may employ at least one algorithm to select among multiple user videos. Further, the remote service system 120 may employ a process 1212 to order (e.g. "rank"), select, and/or place videos based on analytics data 1201 or other metadata 128, including social media interaction data, social media relationships, preferences, history, or any other metadata about the user that generated or selected the videos, the videos 132, and/or the associated audio track 137. Video content 132 can be selected programmatically, for example, based on audio metadata 1311 such as the time of video generation or selection, thereby giving priority to videos that were uploaded earlier or later than other videos, or based on the popularity of the user, thus giving priority to users who have large numbers of followers on the platform.

The remote service system 120 may contain user videos 132 and compilations 131. Video unique identifiers 136 and video metadata 135 may be stored in one or more databases 121 and video files are stored in one or more object storage systems 122 with the remote service system 120 managing 123 the relationships thereof, especially through the use of unique identifiers 136. Audio unique identifiers 1312 and audio metadata 1311 may be stored in audio content databases 124. A library of audio track files accessible to the user or to the remote service system 120 may have been previously stored by the remote service system 120 in an audio object storage system 125 with the remote service system 120 managing 126 the relationships thereof, especially through the use of unique identifiers. Analytics data may be stored in at least one database 127 and made available for use by an algorithm. Other metadata related to users, such as social media attributes, relationships, preferences, interactions, or other information may be stored in at least one database and made available for use by an algorithm. For example, social data 1202 is stored in a social database 128.

The remote service system 120 employs a process 1212 for generating a list of content 1213, which may be held or stored in a ranked form such as an array. The list 1213 is then used as a manifest to assemble at least one video fragment 132 into a compilation 131 alongside at least one audio track 1310. The present invention contemplates scenarios in which audio content and/or video content may exceed the boundaries of one another, for example due to incongruent durations. The solution stack 100 may address this for the purpose of improving the user experience, for example, and a sample process for inserting additional ("filler") content 141 is further depicted and described in FIGS. 8 and 12.

Playback of a compilation of compilations 140 proceeds generally in the same manner as playback for any audiovisual set 130, and this is because a "compilation of compilations" is merely an audiovisual set 130 compiled from multiple audiovisual sets 130 associated with the same audio track 1310. That is, a compilation of compilations is derived by stitching together video fragments 132 from one or more audiovisual sets 130 into a new video compilation 131 that plays alongside the same context-providing audio track 1310, or a section thereof, and the result is a new audiovisual set 130. The system and method of the present invention relating to playback of an audiovisual set 130, and similarly, a compilation of compilations 140, is discussed in greater detail below.

VII. Playback of a Video Compilation Alongside Audio Track Content

To play an audiovisual set 130 (and a derivative compilation of compilations 140), each participating client 110 may send a request for the video compilation 131 by sending at least one unique identifier (e.g., for the video compilation 131, video 132, video range 134 (the audiovisual set range along the video timeline 133), audio track(s) 1310, audio track range 139, other content, or metadata) to the remote service system 120. The client 110 obtains a unique identifier 1312 for at least one audio track 1310 from the remote service system 120. The remote service system 120 then responds to the request by playing the video compilation 131 alongside the identifier-affiliated audio track 1310.

The audio track 1310 may but does not necessarily have be sourced to each respective client 110 via the systems made the subject of United States Patent Application Publication No. 2014/0164563, authored by Leekley et al. and United States Patent Application Publication No. 2017/0041280, authored by Savenok et al. as prefaced hereinabove. That is, the client 110 may use a unique identifier 1312 associated with the audio track 1310 and the playback start time to (a) route a request to a preferred source or preferred content provider's legally compliant access point; (b) obtain a copy of audio track 1310 (e.g. streaming or file transfer) and perform playback adjustments required to synchronize playback if needed (per, e.g., a dynamic playback rate algorithm using track timeline or waveform metadata); or (c) play the video fragment 132 alongside the associated audio track 1310 section. The remote service system 120 then stores this user's interaction data at the storage database as associated with the video 132 as further associated with a section of the audio track 1310 having a unique identifier 1312.

The remote service system 120 then utilizes the user data and user-generated video 132 (which has preferably been fragmented for HTTP streaming delivery as a video fragment playlist or compilation) for the specified audio track 1310, and the audio track unique identifier 1312 to compile an .m3u8 playlist or some other form of HTTP streamable playlist (e.g., Dynamic Adaptive Streaming over HTTP ("DASH")) for a specific audio track 1310 via the audio track's unique identifier 1312. This content may be generated on demand or via script on a timer.

The client 110 then requests to play the video compilation 131 by sending a unique identifier 1312 to the remote service system 120 (e.g., an identifier for a video compilation 131, video 132, video 132 section, audio tracks 1310, audio track 1310 section, other content, or metadata). The remote service system 120 may respond with (a) the video compilation 131 (or an identifier thereof) for the specified audio track 1310 or (b) another unique identifier associated with the presentation of video compilation(s) 131 and/or audio track(s) 1310. The client 110 plays the audio track 1310 and video compilation 131 alongside one another, at or from the same given playback position. Thus, playback of an audio track 1310 positioned to play at the beginning of an audio track 1310 may be observed and matched by the system according to the present invention, which enables the client 110 to play the video compilation 131 at or from an identical position to that of the audio track 1310. Playback of the video compilation(s) 131 and the selected audio track(s) 1310 are synchronized preferably using dynamic playback offsets and/or rates or by using other rate-governing algorithms or methods.

Referring again to FIG. 3G, an example embodiment of the present invention may allow a user to select an alternative speed of playback for the audio track 1310 section associated with a video 132, as at 370. When the user selects an alternative speed for audio playback associated with the video, the remote service system 120 can adjust that portion of the audio track 1310 to account for the user's selection when the compilation 131 is played. In such an embodiment, the playback speed for audio track 1310 is adjusted to account for a user's selected playback speed, for any sections for which an alternative speed was selected.

The duration of the video compilation 131 (e.g., an HLS or similar stream) may be equivalent to the entire duration of the associated audio track 1310, or may be shorter or longer than the duration of the audio track 1310. Various embodiments of the invention include different criteria for establishing the duration of the video compilation 131. For example, in one embodiment, the compilation 131 may feature only videos 132 associated with a certain portion of the musical composition 1310 (e.g. the song's chorus) and therefore be limited to the duration of that portion only.

In another embodiment, the compilation 131 may include both videos 132 and additional content 141 appended to the videos 132, such that the aggregate content exceeds the duration of an entire song 1310. For example, a video compilation 131 might include a short pause of the audio track 1310, mid-roll, at which time an advertisement or related information is played. Additionally, in another embodiment, sections of the song 1310 can be played at alternative speeds, for example, to highlight a particular user-generated video 132 in slow motion. Any of these variations can result in a video compilation 131 that has a duration that exceeds the duration of the audio track 1310.

At the end of this process, the system and methods described in the present invention produce a "Song Story" music video that features multiple video fragments 132 that play sequentially alongside the playback of what is, or appears to be, a continuous audio track 1310. In the preferred embodiment, the client in fact plays a singular audio track 1310 from a single content source 150 such as a DSP, although a brief mention can be made that the invention encompasses various other embodiments to include the stitching together of, for example, sections of one audio track 1310 sourced from more than one content provider 150; multiple audio tracks 1310; multiple versions of one audio track 1310; or multiple sections of one audio track 1310.

The resulting compilation of compilations 140 presents a user with a video mosaic assembled from the highest-valued UGC clips 132 of any length (not necessarily of uniform set ranges or duration), with the value of each featured clip having been determined by the collective opinion of a social platform. Each video clip 132 is followed by another top-rated clip 132, whether played continuously or interspersed with filler content to further engage a viewer. The result is a unique, highly engaging, crowd-sourced music video that tells a compelling story about a song: hence, the "Song Story".

VIII. Conclusion

While the above descriptions contain much specificity, this specificity should not be construed as limitations on the scope of the invention, but rather as an exemplification of the invention. For example, it is contemplated that the system and method according to the present invention basically functions to compile videos 132 into a video compilation 131 that plays alongside a context-providing audio track 1310.

Viewed systemically, the present invention may be said to essentially comprise at least one client 110 and a remote service system 120. Each client 110 is operable to generate, select, or upload at least one video fragment 132 and the remote service system 120 is operable to compile each video 132 into an audio set 130 and/or video compilation 131. The video compilation may be presented as a static or dynamic compilation that plays alongside the audio track content 1310. The audio track 1310 can be identified at a preferred source by a unique identifier 1312 that is abstract and resolvable for allowing a solution stack 100 member to, independently or in cooperation with at least one other solution stack 100 member, associate across one or more content sources.

Viewed from a methodological perspective, the present invention may be said to essentially comprise a series of steps including generating at least one video fragment 132 via at least one client 110; associating the at least one video 132 with a section of audio track content 1310 via the at least one client 110 and/or a remote service system 120; and compiling the at least one video 132 into the video compilation 131 via the at least one client 110 or remote service system 120 for playback progression at the same time as playback of the audio track content 1310. The audio track content 1310 is identified at a preferred source by a unique identifier 1312. The unique identifier 1312 is abstract and resolvable for allowing a solution stack 100 member to, independently or in cooperation with at least one other solution stack 100 member, associate across one or more content sources.

Other preferred features of the system and method include provision of audio track content 1310 determination whereby the audio track content 1310 is determined by a start time and an end time as preferably selected by a user on each client 110. The member(s) of the solution stack 100, as defined hereinabove, are operable to identify at least one audio track 1310 section associated with the at least one video 132 as referenced by respective unique identifiers. At least one member of the solution stack 100 is operable to place the video fragment 132 into a section of the audio track content 1310, based on metadata.

At least one member of the solution stack 100 may programmatically select the audio track content 1310 associated with a video fragment 132. At least one member of the solution stack 100 may programmatically select video fragments 132 from among multiple video fragment 132 associated with a select audio track 1310 section, to be inserted into the video compilation 131. At least one member of the solution stack 100 is operable to present at least one video fragment 132 for allowing users to interact with the videos 132 and/or any audio content 137 or metadata related to the videos.

In this last instance, at least one member of the solution stack 100 is operable to present one or more videos 132 in a list format or otherwise, for allowing users to create social inputs ("social data" 1202) that may be used by the client 110 and/or remote service system 120 for ranking video compilations 131, videos 132, sections of videos 132, audio tracks 1310, and/or audio track 1310 sections. Further, at least one member of the solution stack 100 is operable to comprise or interact with a currency system for transferring units of value to/from users based on their activity and interaction with videos 132, audio tracks 1310, audio track 1310 sections, or related metadata. At least one member of the solution stack 100 may also insert additional content 141 into sections of the video compilation 131.

The client 110 may send a request for the video compilation 131 by sending a unique identifier to the remote service system 120, and the remote service system 120 may respond to the client request with a video compilation 131 that may be played alongside the audio track content 1310. Each client 110 is operable to play the video compilation 131 and the audio track content 1310 at a given playback position. At least one member of the solution stack 100 is operable to play at least one video 132 and/or one audio track 1310 section at alternative speeds of playback.

Although the invention has been described by reference to certain preferred systemic embodiments and certain associated methodologies, it is not intended that the novel systemic embodiments and associated methods be limited thereby, but that modifications thereof are intended to be included as falling within the broad scope and spirit of the foregoing disclosures and the appended drawings.

What is claimed is:

1. A system operable within a computer network environment for compiling a video compilation from videos, the video compilation being played separately alongside audio track content, the system comprising:
   a solution stack, the solution stack comprising:
      at least one client to provide at least one video; and
      a remote service system to compile the at least one video into the video compilation, the video compilation being played alongside the audio track content;
   whereby the audio track content is separate from the video compilation and can be identified by a unique identifier that is abstract and resolvable for allowing a solution stack member to associate the at least one video with the audio track content from at least one content source content source as preferably sourced to the at least one client.

2. The system of claim 1 wherein the audio track content is determined by the selection of a start time and an end time, preferably selected programmatically or by a user of the at least one client.

3. The system of claim 1 wherein at least one solution stack member is operable to identify at least one audio track section embedded or otherwise associated with the at least one video.

4. The system of claim 1 wherein at least one solution stack member is operable to associate the video with at least one audio track section by way of a select association mechanism, the select association mechanism being selected from the group consisting of:
   association by the use of metadata; and
   association programmatically or by a user of the at least one client.

5. The system of claim 1 wherein at least one solution stack member programmatically selects videos from among multiple videos associated with a select audio track section, to be inserted into the video compilation.

6. The system of claim 1 wherein at least one solution stack member is operable to present at least one video alongside an audio track section, for allowing users to interact with the video, the audio track content, social media data, and/or other metadata related to the video.

7. The system of claim 6 wherein at least one solution stack member is operable to create social media data that may be used by at least one solution stack member for ranking video compilations, videos, sections of videos, audio tracks, and/or audio track sections.

8. The system of claim 6 wherein at least one solution stack member is operable to comprise or interact with a currency system for transferring units of value to/from users based on their activity and interaction with videos, audio tracks, audio track sections, or related metadata.

9. The system of claim 1 wherein at least one solution stack member inserts additional content into sections of the video compilation.

10. The system of claim 1 wherein the at least one client is operable to send a client request for the video compilation by sending a unique identifier to the remote service system, the remote service system responding to the client request with the video compilation that may be played alongside the audio track content.

11. The system of claim 1 wherein the at least one client is operable to play the video compilation alongside the audio track content at given playback positions.

12. The system of claim 1 wherein at least one solution stack member is operable to play at least one video and/or at least one audio track section at alternative speeds of playback.

13. A method operable within a computer network environment for compiling a video compilation from videos, the video compilation being played alongside separate audio track content, the method comprising the steps of:
   providing at least one video via at least one client;
   associating the at least one video with a section of audio track content via at least one solution stack member; and
   compiling the at least one video into the video compilation via the at least one solution stack member for playback alongside the audio track content,
   whereby the audio track content is separate from the video compilation and can be identified by a unique identifier that is abstract and resolvable for allowing a solution stack member to associate the at least one video with the audio track content from at least one content source as preferably sourced to the at least one client.

14. The method of claim 13 wherein the audio track content is determined by the selection of a start time and an end time, preferably selected programmatically or by a user of the at least one client.

15. The method of claim 13 wherein at least one solution stack member identifies at least one audio track section embedded or otherwise associated with the at least one video.

16. The method of claim 13 wherein at least one solution stack member associates the video with at least one audio track section by way of a select association mechanism, the select association mechanism being selected from the group consisting of:
- association by the use of metadata; and
- association programmatically or by the user of the at least one client.

17. The method of claim 13 wherein at least one solution stack member programmatically selects videos from among multiple videos associated with a select audio track section, to be inserted into the video compilation.

18. The method of claim 13 wherein at least one solution stack member presents at least one video alongside an audio track section, for allowing users to interact with the videos, the audio track content, social media data, and/or other metadata related to the video.

19. The method of claim 18 wherein at least one solution stack member creates social media data that may be used by at least one solution stack member for ranking video compilations, videos, sections of videos, audio tracks, and/or audio track sections.

20. The method of claim 18 wherein at least one solution stack member comprises or interacts with a currency system for transferring units of value to/from users based on their activity and interaction with videos, audio tracks, audio track sections, or related metadata.

21. The method of claim 13 wherein at least one solution stack member inserts additional content into sections of the video compilation.

22. The method of claim 13 wherein the at least one client may send a client request for the video compilation by sending a unique identifier to the remote service system, the remote service system responding to the client request with the video compilation that may be played alongside the audio track content.

23. The method of claim 13 wherein the at least one client plays the video compilation alongside the audio track content at given playback positions.

24. The method of claim 13 wherein at least one solution stack member plays at least one video and/or at least one audio track section at alternative speeds of playback.

* * * * *